(12) United States Patent
Brittain

(10) Patent No.: US 10,015,518 B2
(45) Date of Patent: Jul. 3, 2018

(54) SUPER RESOLUTION IMAGING OF CONVOLVED LIGHT

(71) Applicant: Christopher Joseph Brittain, San Jose, CA (US)

(72) Inventor: Christopher Joseph Brittain, San Jose, CA (US)

(*) Notice: Subject to any disclaimer, the term of this patent is extended or adjusted under 35 U.S.C. 154(b) by 575 days.

(21) Appl. No.: 14/618,154

(22) Filed: Feb. 10, 2015

(65) Prior Publication Data

US 2015/0262345 A1    Sep. 17, 2015

Related U.S. Application Data

(63) Continuation-in-part of application No. 14/204,122, filed on Mar. 11, 2014.

(51) Int. Cl.
| | | |
|---|---|---|
| *H04N 9/04* | (2006.01) | |
| *H04N 19/59* | (2014.01) | |
| *G01J 1/42* | (2006.01) | |
| G02B 27/58 | (2006.01) | |
| H04N 19/117 | (2014.01) | |

(52) U.S. Cl.
CPC ............ *H04N 19/59* (2014.11); *G01J 1/4228* (2013.01); *G01J 1/4257* (2013.01); *G02B 27/58* (2013.01); *H04N 19/117* (2014.11)

(58) Field of Classification Search
CPC ..... H04N 19/59; H04N 19/117; G01J 1/4228; G01J 1/4257; G02B 27/58
See application file for complete search history.

(56) References Cited

U.S. PATENT DOCUMENTS

2012/0183224 A1\* 7/2012 Kirsch ................ G06K 9/4619
382/195

\* cited by examiner

*Primary Examiner* — Christopher Findley

(57) ABSTRACT

A system and method for imaging is disclosed wherein light that is convolved by a blade is received by an imaging sensor. The received light may be convolved by a blade moving laterally across the image plane. The received light may be recorded as light data. The light data may be processed by rotations, collapses, normalizations, and applying one or more derivative filters to generate enhanced result images.

39 Claims, 54 Drawing Sheets

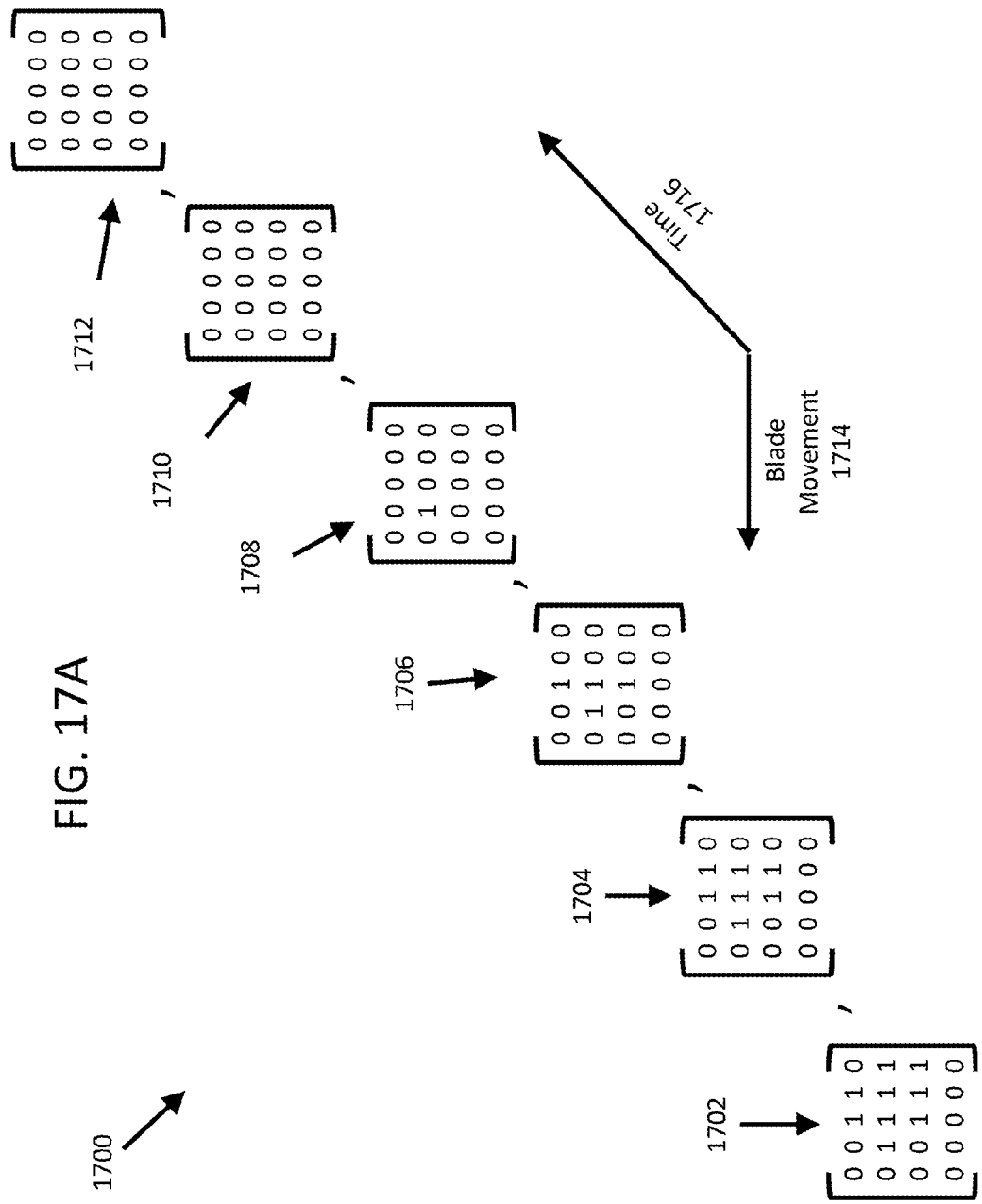

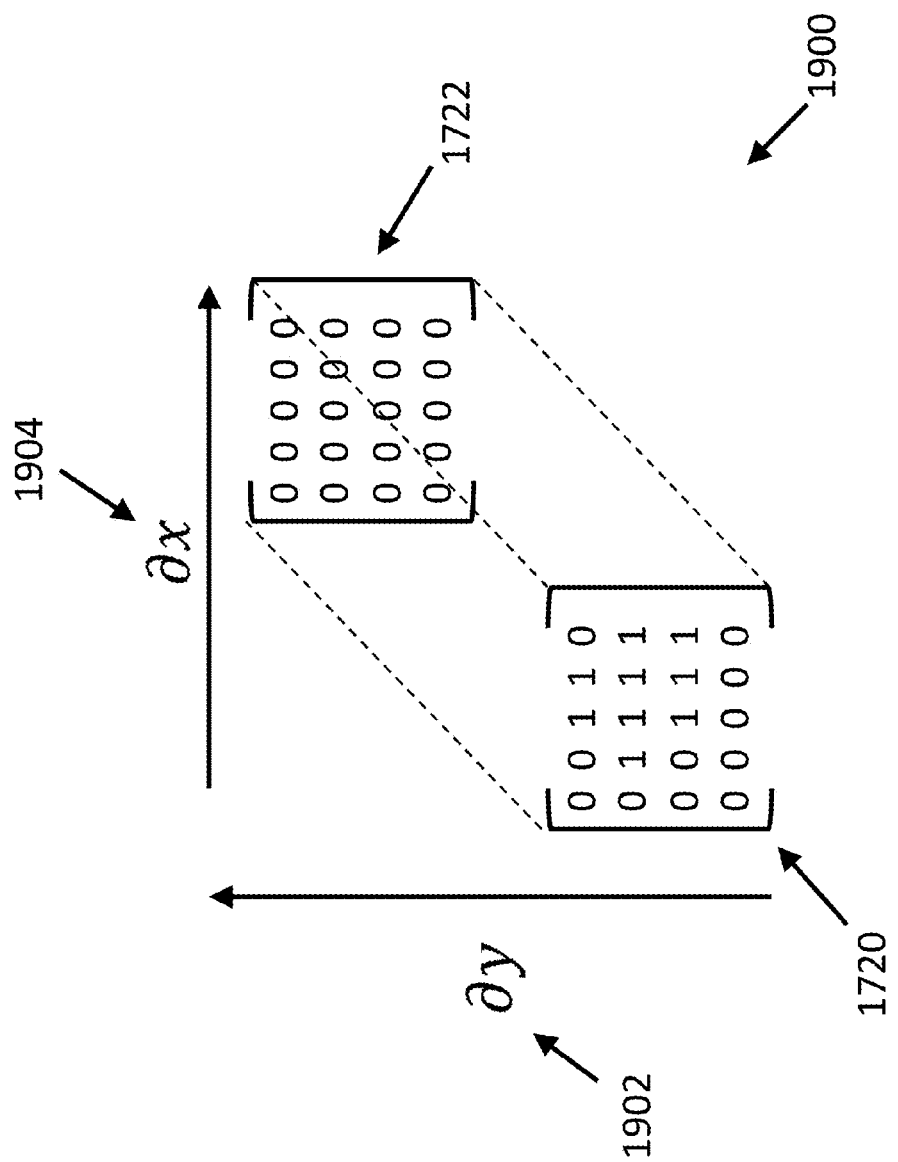

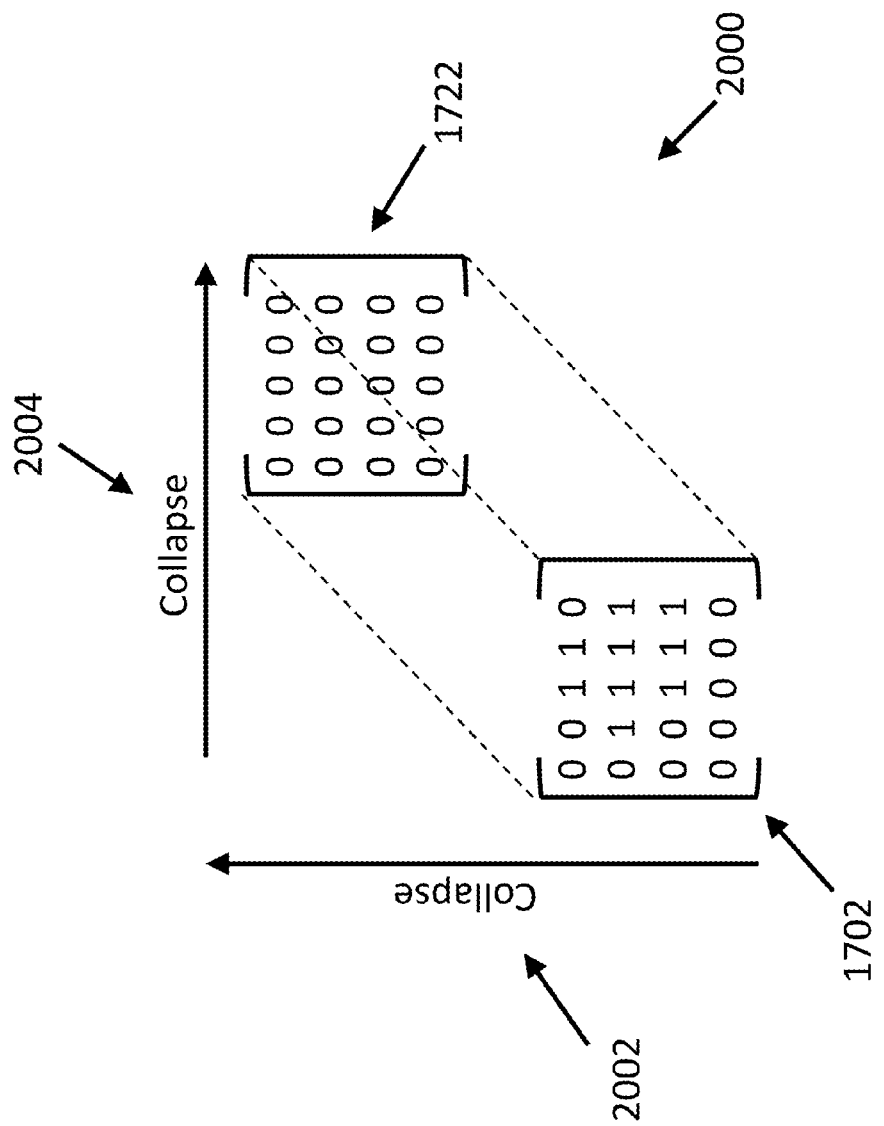

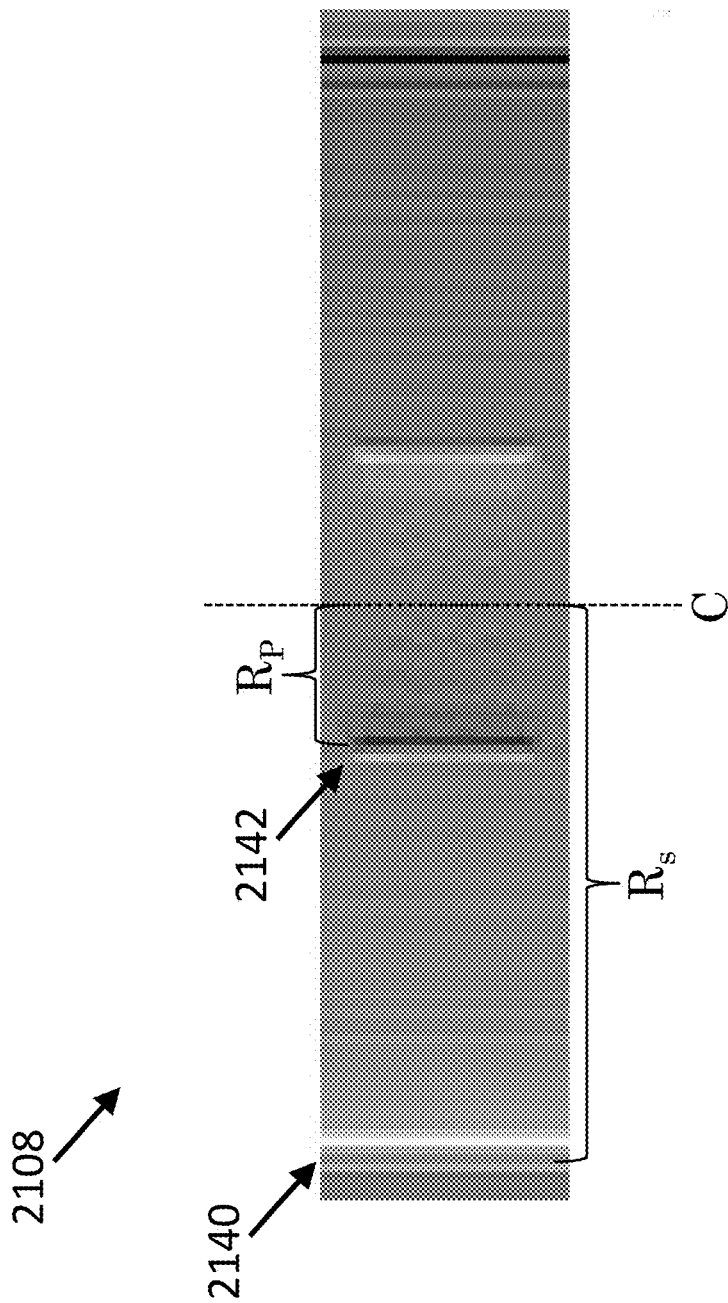

SUPER RESOLUTION IMAGING OF CONVOLVED LIGHT

This application claims the benefit of U.S. Provisional Application Ser. No. 61/777,278, filed Mar. 12, 2012, which is incorporated herein by reference in its entirety.

BACKGROUND

As light radiates through space it spreads due to diffraction, a wave effect. This wave effect limits the resolution of the human eye and other electromagnetic imaging devices, such as microscopes and telescopes. In 1873, physicist Ernest Abbe expressed this limit as: $d=\lambda/2(n \sin \theta)$, where "d" is the diameter of a resolvable spot, "$\lambda$" is the wavelength of light, "n" is the index of refraction of the transmitting medium, and "$\theta$" is the spot angle. This limit was later expressed by astronomer W. R. Dawes in terms of aperture: $R=11.6/D$, where "R" is the angular separation in arc seconds between two resolvable points, and "D" is the aperture in centimeters of the viewing device.

Since then, astronomers have addressed the diffraction limit by building telescopes with increasingly larger apertures, primary mirrors, and objective lenses. However, as the size of the telescope increases, the costs associated with building and maintaining the telescope skyrocket to prohibitive levels. Using these large powerful telescopes is far out of the reach of amateur astronomers, and even governments struggle with the costs of running large telescopes. Thus, there is a demand in astronomy for a new practical low-cost method for increasing telescope resolving power.

In microscopy, information on relevant attempts to increase resolution can be found in U.S. Pat. No. 5,043,570 and U.S. Pat. No. 5,731,588. However, each one of these references disclose systems that require highly controlled scanning environments, ill-suited for applications where the imaging object is not easily manipulated, such as star systems hundreds of parsecs from Earth. These systems are further limited by their complex controls, unwieldy size, extreme delicacy, slow imaging speed, and the high costs associated with building and running the systems. Thus, there is a demand in microscopy for a new practical low-cost method for increasing microscope resolving power.

DESCRIPTION OF THE DRAWINGS

FIG. 17A-F illustrate example data manipulations for processing image data to generate enhanced images, as according to some embodiments.

FIG. 19 illustrates an example image data manipulation of applying filters in multi-dimensional space, as according to some embodiments.

FIG. 20 illustrates an example image data manipulation of applying a collapse in multi-dimensional space, as according to some embodiments.

FIG. 21A-E illustrate example implementations and example outputs involving a small object passing in front of a larger object, as according to some embodiments.

DETAILED DESCRIPTION

Here below, modes for caring out mechanical convolution imaging shall be explained with reference to drawings.

Summary of the Present Embodiment

Figure 1A:
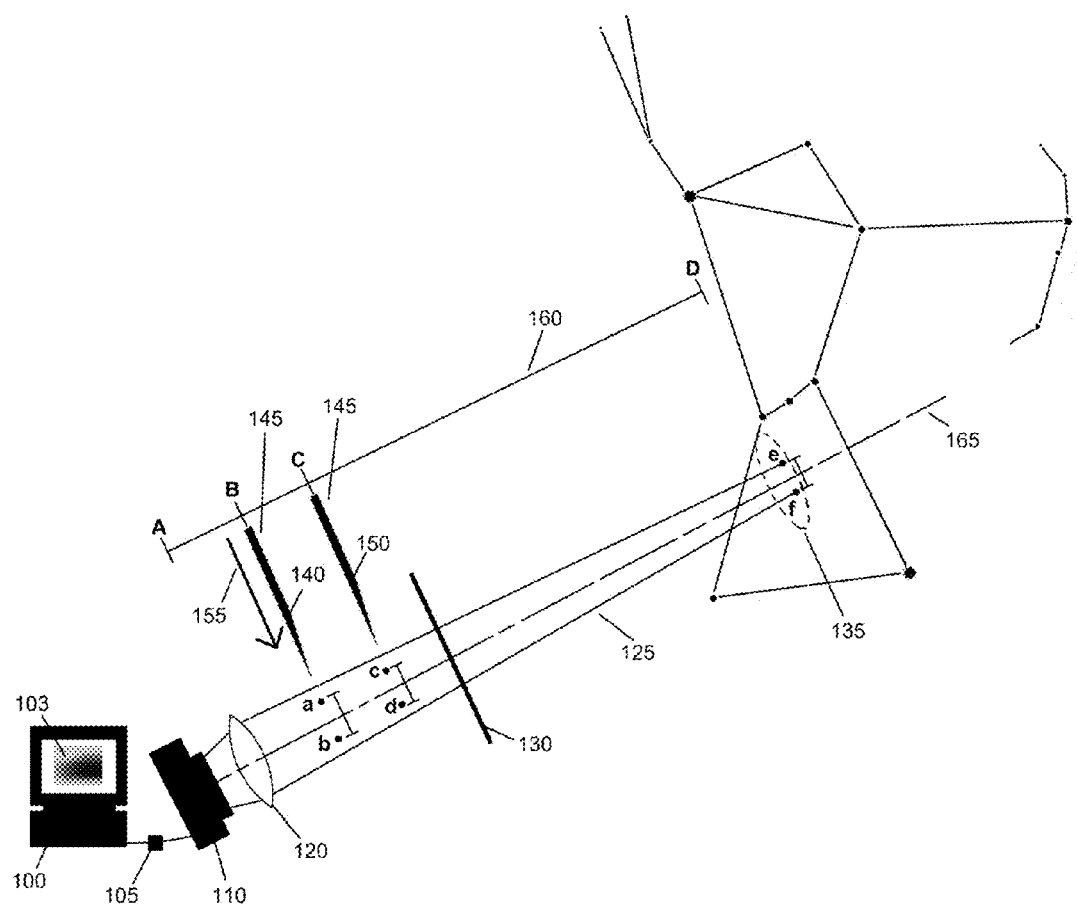
FIG. 1A shows an example two-blade variation of the imaging system.

In the present embodiment, a convolving blade is used to distort light waves coming from imaging objects to reveal characteristics about the waves to enable higher resolution imaging of the objects. FIG. 1A is a diagram showing one possible variation of the imaging system. In this variation, imaging objects 135 are electromagnetic sources, such as stars, that create an electromagnetic or light path 125, that may be convolved by a convolution blade system 145 comprising one or more blades 140, 150 and an optional labeling filter 130. As the imaging objects 135 are imaged through a lensing system 120 by a sensor 110, such as a CCD/CMOS image sensor, lux meter, or phototransistor, one of the blades in the system, the first blade 140 for example, is inserted into the light path 125 to create recorded wave data 105 which is a recording of the light path as it is changed by the blade insertion. The recorded wave data 105 is then sent to a computer system 100 for processing to generate useful output data 103 about the imaging objects 135.

In FIG. 1A imaging objects 135 are denoted by point maximas e and f, which are at a distance AD from the sensor 110, where two points side-by-side ("AD") represent the distance between them, as shown on reference line 160. Point maximas can be thought of as point spread function local maximas of radiating objects. Point maximas e and f spread out on the path from A to D. At point C on the reference line 160, e and f point maximas are represented by points c and d, respectively. At point B on reference line 160, the same point maximas are represented by a and b. Thus, the distance between the point maximas increases as the light travels from imaging objects 135 to the sensor 110, such that: ef<cd<ab.

The light path 125 defines the boundary of light or electromagnetic waves radiating from imaging objects 135. The light path 125 may be labeled using an optional labeling filter 130 such as a polarizer or color filter, as explained below. The convolving blade system 145 in this variation may consist of materials that have characteristics opposite that of the labeling filter 130 which may also be considered part of the convolving blade system 145. If the labeling filter 130 consists of a vertically aligned polarizer, then the blades 140, 150 may consist of horizontally aligned polarizers. Similarly, where the labeling filter 130 may be a green light frequency pass filter, the blades 140, 145 may consist of filters that are notched to filter out green light. If a labeling filter 130 is omitted from the convolving blade system 145, the blades 140, 150 may consist of opaque or translucent materials, such as steel razor blades or liquid crystals. Alternatively, a convolving blade system 145 may consist of a single first blade 140 with or without the labeling filter 130, inserted once to create one result, inserted at an angle to create a flux gradient result, or inserted at different places in the light path 125. The blades 140, 150 in this variation are designed to move on an axis 155 that is perpendicular to the light path axis 165 in discrete or continuous movements. The blades 140, 150 may be actuated using linear actuators or equivalent means of movement known in the art.

Figure 1B:
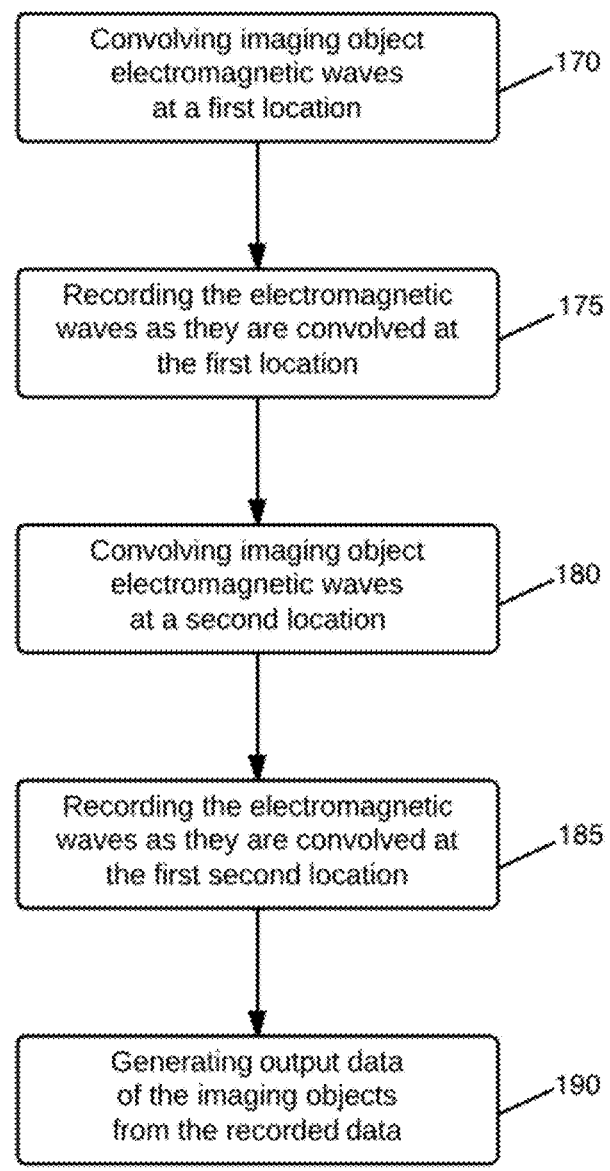
FIG. 1B shows an example flowchart for the two-blade variation of the imaging system.

A simplified example method using this system is shown in FIG. 1B. At the first step 170, the first blade 140 is inserted into the light path 125 in the direction of the reference arrow axis 155 at a first position B. As the blade travels farther into the light path, it cuts off more light in the path thus changing the signal received by the sensor 110. At the second step 175, the sensor 110 records this movement of the blade through the light path and sends it as recorded wave data 105 to the computer system 100, after which the first blade is removed. At the third step 180, the second convolving blade 150 is inserted into the light path 125 in the direction of the reference arrow axis 155 at a second position C. As the second blade 150 travels farther into the light path, it cuts off more light in the path thus changing the signal received by the sensor 110. At the fourth step 185, the sensor 110 records the second blade's movement through the light path and sends it as a second set of recorded wave data 105 to the computer system 100, after which the second blade is removed. Next at the fifth step 190, the computer system 100 uses the first and second set of recorded wave data to generate output data 103 regarding the imaging objects, such as their range, shape, size, plots, surfaces, or images. Another equal variation includes starting the convolving steps 170, 180 with the blades fully inserted and measuring the light path 125 with the sensor 110 as the blades are removed. Another variation includes having only one convolving step 170 where the blade is inserted perpendicular to the light path 125 or at an angle, and one recording step 180 then immediately starting the fifth step 190.

The following is another example of how this variation works referring to FIG. 1A, though one skilled in the art will appreciate that the ordering can again be changed and elements modified. The sensor 110 is directed towards the imaging objects 135 to record the incoming light path 125. The light path 125 from the imaging objects 135 is convolved by filtering through the labeling filter 130, which here is a horizontally aligned polarizer. Then, the first blade 140 at point B, here comprised of a vertical polarizer, is moved along an axis 155 so it blocks the now horizontally polarized light incident on the blade. The first blade 140 continues its movement along the axis 155 until it is fully blocking the light path 125. The first blade's movement through the light path 125 creates a signal representing a convolution of the light path as convolved by the first blade 140. Sensor 110 records the incoming light path as it is convolved and sends this as recorded wave data 105, which may be a plurality images or a video stream, to computer system 100 for processing. Next, the process may be repeated with the second blade 150 at point C. The computer system 100 may then use the recorded wave data 105 to output object dimension data such as size, shape, and range to the imaging objects 135 as output data 103. Alternatively the computer system 100 may use the recorded wave data 105 to enhance pre-recorded images (images of the light path un-convolved by the blades) of the imaging objects 135 through image processing and output that as output data 103. Alternatively the computer system 100 may use the recorded wave data 105 to generate entirely new computer graphic representations of the imaging objects 135 as the output data 103.

Figure 2A:
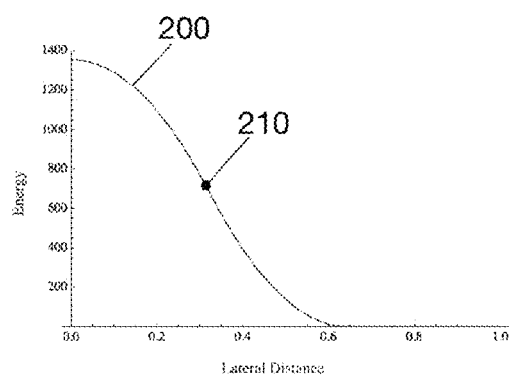
FIG. 2A-D show example two-dimensional graph plot results of the imaging system.
Figure 2B:
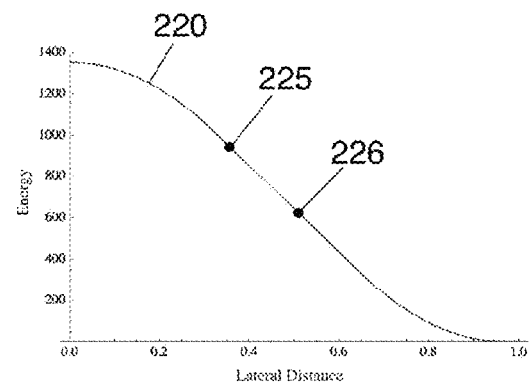
Figure 2C:
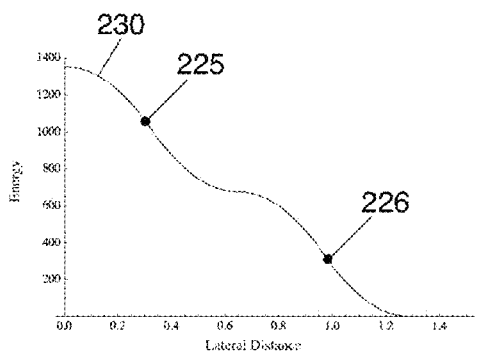

FIG. 2A-D show possible sensor outputs of convolved light path data. FIG. 2A shows a graph plot 200 where the distance AD between the sensor 110 and the imaging objects 135 is greater than the distance set by the diffraction limit. In this situation, point maxima's e and f are essentially indistinguishable from one another and lie at the center point 210 of the graph plot 200. Note, however that this graph would be virtually identical to a graph plot of a single point maxima system of just e for example, where f is non-existent. Thus an observer (not depicted) using imaging sensor 110 at this great a distance would have a difficult time determining whether there are two point maximas, e and f, or just one, e. FIG. 2B shows a graph plot 220, where the light path 125 has been convolved by the first convolution blade 140 at a distance of AB from the sensor 110. Due to diffractive spreading, where ab>ef, point maximas a and b are further spread out on the graph plot 220, and lie at an approximate first point 225 and second point 226, respectively. FIG. 2C shows a graph plot 230, where the light path 125 is convolved by a second convolution blade 150 at a distance AC from the sensor. Due to diffractive spreading, where ab>cd, point maximas c and d are more spread out on the result slope plot 230 than their a and b counterparts, and lie at an approximate first point 225 and second point 226 as shown on graph plot 230, respectively. Further, as the distance of AC approaches that of AD (i.e., AC→AD), point maximas c and d grow further apart if magnified properly, thereby allowing more accurate measurements of imaging objects 135 to be made. For example, if the imaging objects 135 consist of a far away binary star system where AD is many parsecs long, the second blade 150 at AC should appropriately be as far from the sensor 110 as possible to capture as much diffractive spreading of the light path 125 as possible. Other types of far-away blades are disclosed in FIG. 11B and FIG. 15 and are discussed below.

One advantage of the imaging system disclosed is that using a blade to convolve a light path is a highly versatile way of increasing resolution. Whereas telescopes may increase resolution by increasing apertures "horizontally", the system disclosed here increases the resolution "vertically", positioning the blade nearer and nearer to the imaging objects, convolving them one or more times to yield useful data. Another advantage of the blade system disclosed here is that it is far easier to use than a scanning system because with the system here, the imaging objects are imaged all at once, instead of scanning them little by little which is not possible in many imaging applications. Yet another advantage of the imaging system disclosed is it may be built and customized using off the shelf parts and computer software which can keep costs very low compared to the prior art.

Analytically, the plots in FIG. 2A-C may be represented mathematically as, $\Delta B$, of the convolution integral where:

$$\Delta B = f(\tau) * g(x) = \int_{-\infty}^{\infty} f(\tau)(x-\tau)d\tau \qquad 1\text{-}1$$

In equation 1-1, the function $f$ may represent the convolution blade system 145. One possible function that may mathematically represent $f$ is a negative variation of the Heaviside step function wherein the Dirac delta function, $\delta(s)$, is integrated over ds, but where the limits, x and $\infty$, are reversed to produce a negative step-function. See equation 1-2 for $f$ in general form.

$$f = \int_x^\infty \delta(s)ds \qquad 1\text{-}2$$

In equation 1-1, the function g may represent the imaging objects 135. One possible function that may represent g is a superposition of two Gaussian point spread functions as shown in equation 1-3, and approximated in FIG. 2D. In this equation, A and B are amplitude normalization variables; $\alpha$ and $\beta$, are diffraction spread normalization variables; and $\eta$ is the shift variable that shifts the second point spread function laterally. Further, $Ae^{-\alpha x^2}$ can be thought to correspond to a point spread function of one of the imaging objects 135 with a point maxima e at its peak, and $Be^{-\beta(x\pm\eta)^2}$ can be through to correspond to point spread function of the other of the imaging objects 135 with a point maxima fat its peak, but shifted laterally by $\eta$. In some applications, where there is a lack of information about the point spread functions, simple discrete functions such as unit triangles may be used to represent the point spread functions. Computer system 100 can model the graph plots 200, 220, 230 of the imaging objects 135 by applying curve fitting techniques as are known in the art, wherein A, B, $\alpha$, $\beta$, and $\eta$ are adjusted to allow the convolution integral, $\Delta B$, to best fit recorded wave data 105. In particular, a person of ordinary skill in the art can readily apply these techniques using software with imaging modules, such as MATLAB and Mathematica, using linear regression or similar techniques, but may also apply the above methods using custom coded imaging software as well.

$$g(x) = Ae^{-\alpha x^2} \pm Be^{-\beta(x\pm N)^2} \qquad 1\text{-}3$$

Figure 2D:
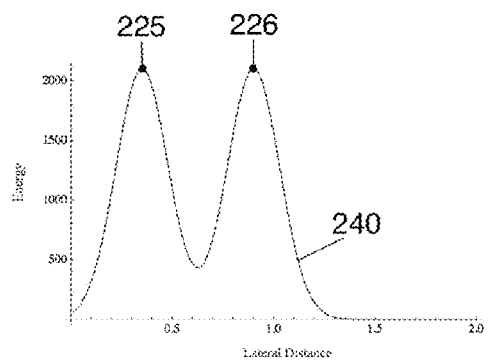

FIG. 2D shows a deconvolution graph plot 240 produced from result slope 230 through methods described here. On the deconvolution graph plot 240, point maximas a and b now lie at the first point 225 and the second point 226 which coincide with the local maximas of plot 240. The deconvolution plot may be generated by taking the derivative of $\Delta B$ with respect to the lateral distance x. The deconvolution plot is not limited to representation by derivatives of $\Delta B$. Other methods known in the art may be applied such as dividing the Laplacian Transform of $\Delta B$ by the Laplacian Transform of $f$ or g and taking the Inverse Laplacian Transform of the quotient, as shown in equation 1-4, where $\bar{\tau}$ is an intermediary dimension.

$$g(x) = \mathcal{L}_{\bar{\tau}}^{-1}\left(\frac{\mathcal{L}_\tau(\Delta B)(\bar{\tau})}{\mathcal{L}_\tau(f)(\bar{\tau})}\right)(x) \qquad 1\text{-}4$$

Figure 3:
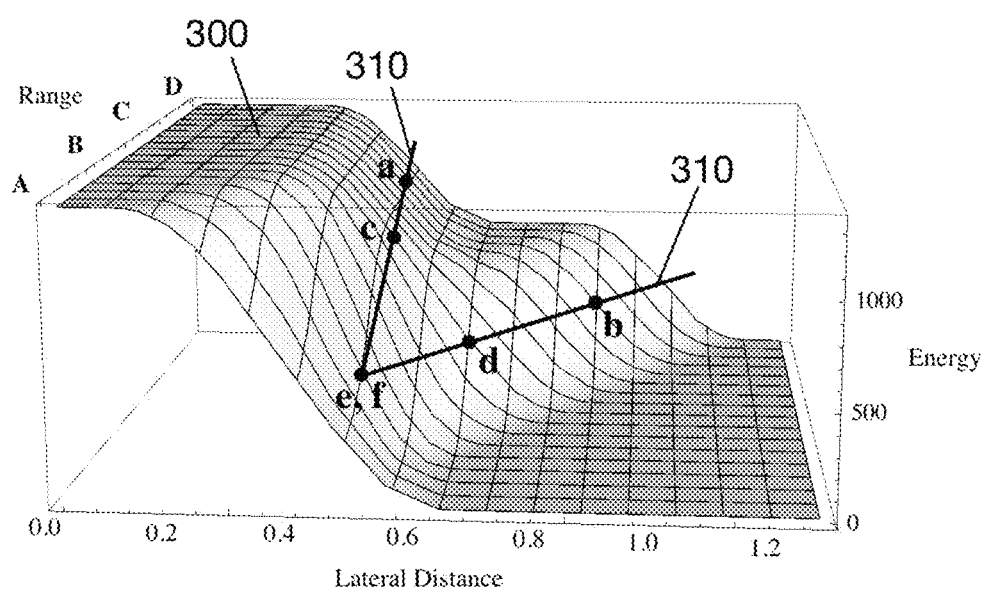
FIG. 3 shows an example three-dimensional graph surface result of the imaging system with point maximas indicated.

FIG. 3 shows a three dimensional surface 300, two of space ("Range" and "Lateral Distance") and one of energy ("Energy"), of the convolution produced by a blade, such as the first blade 140, and light path (125) at a plurality of ranges denoted by points A, B, C, D. Light point maximas e and f, c and d, and a and b are also labeled on surface 300 along point maxima axes 310. The convolution surface 300 may be used in correlation with the techniques described above (as shown in FIG. 2A-D) to give the complete energy-space dimensions of electromagnetic radiation from the imaging objects 135. In particular, the actual distance between points e and f may be found using the point maxima proportion equation 1-5, and the range from the sensor 110 to the imaging objects 135, AD, may be found using the point maxima equation 1-6.

$$ef = cd^2/ab \qquad 1\text{-}5$$

$$AD = AB + BC + BC(cd - ef/ab - cd) \qquad 1\text{-}6$$

Figure 4A:
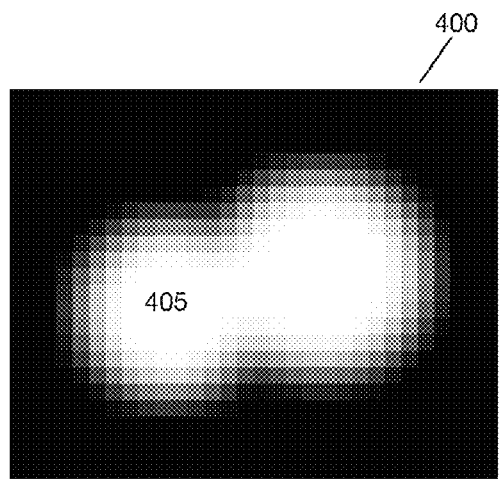
FIG. 4A-G show example image outputs of the imaging system.
Figure 4B:
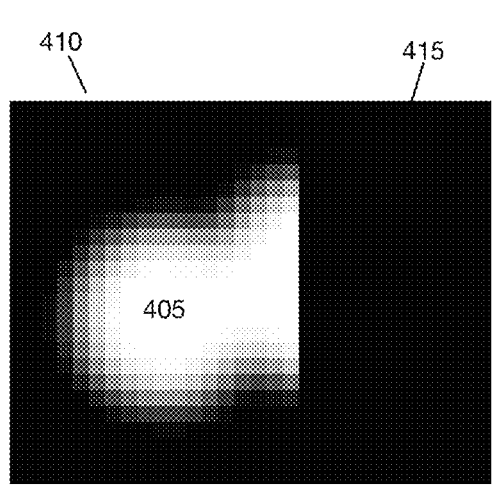
Figure 4C:
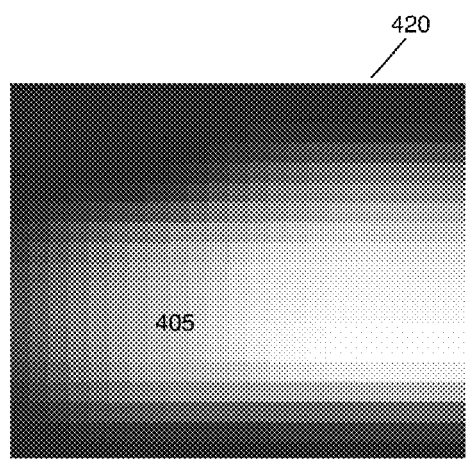
Figure 4D:
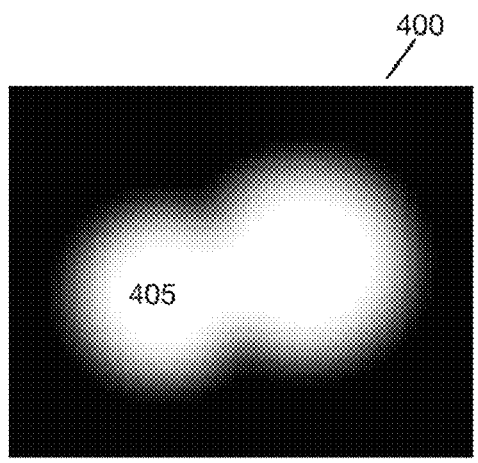

The principles that create the two-dimensional graph plots of FIG. 2A-D, which use one dimension of energy ("Energy") and one of space ("Lateral Distance") may similarly be extended to two-dimensional plots using two dimensions of space, also known as images, as shown in FIG. 4A-G. The image shown FIG. 4A is an example image or video stream capture 400 from a CCD camera imaging a two-object system 405. FIG. 4B shows an image or video stream capture 410 of the two-object system 405 as it is convolved from right to left with a blade 415, which is denoted by black pixels of value 0. Using the computing system 100, the recorded wave data 105 of images or a video stream may undergo image processing, such as image stacking, or matrix operations as are known in the art to create the convolved image output 420 with the two-object system 405 now convolved with a blade 140, as shown in FIG. 4C. The process may be repeated with a second blade 150 at different range, CD, to the two body system 405 to yield a second convolved image output (not shown), thereby allowing a determination of the two-object system's 405 dimensions as using the above disclosed techniques, which in image and video processing are analogous to motion estimation vectors, to yield a higher resolution image 435 as shown in FIG. 4D.

Figure 4E:
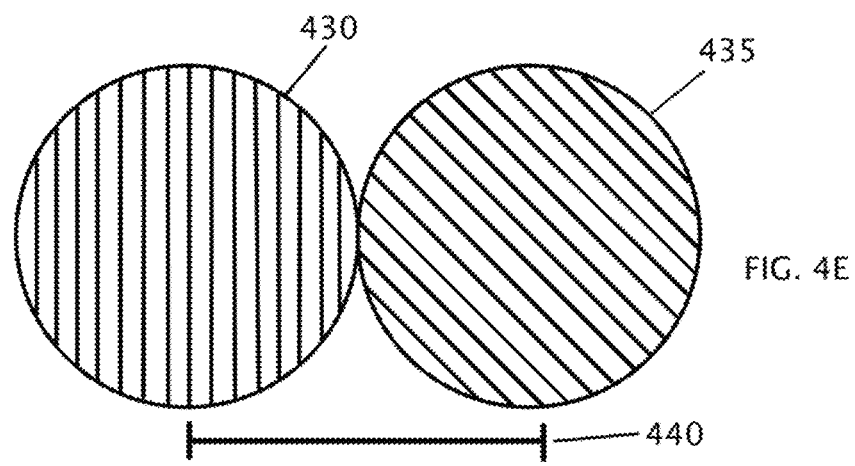
Figure 4F:
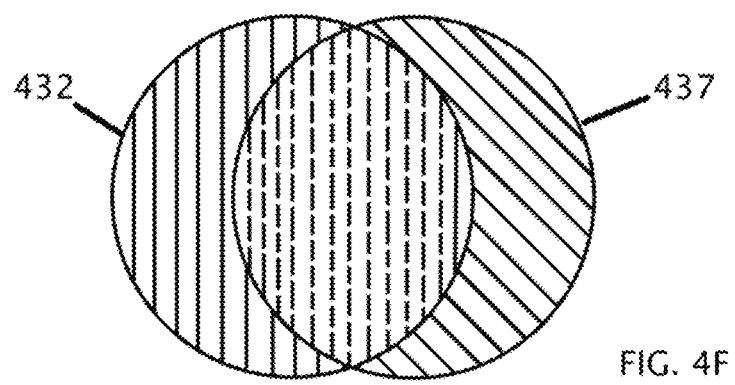
Figure 4G:
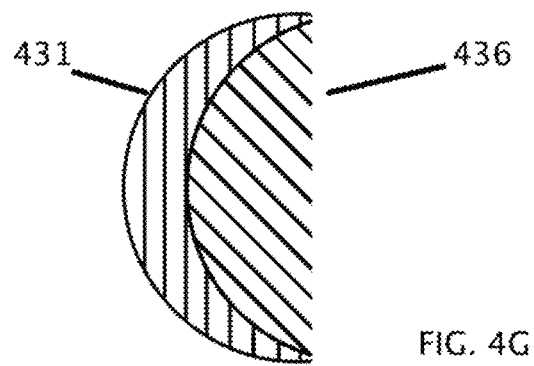

While the images in FIG. 4A-D, are grayscale with pixel values between 1 (white) and 0 (black), FIG. 4E-G show how the same principles may be applied for color images with channel RGB data. In FIG. 4E a green light spot 430 and red light spot 435 have point light maximas (here spot centers) that are 28 microns apart as indicated by a reference line 440. At great distances, such as AD, the two spots 430, 435 mix together due to wave diffraction and interference, as shown in FIG. 4F. Using the convolution blade processes described above, an image sensor will receive the output shown in FIG. 4G, where color the channel data green is highly prevalent on the left side the convolved spot 431 in a bowed arc which follows the perimeter of the diffracted green spot 432 and color channel data red is highly prevalent on the right side of the convolved spot 436 in a bowed arc, which again follows the perimeter of the diffracted red spot 437. A person of ordinary skill in the art may then use trigonometry and geometry methods to find the center points of the red and green spots using the bowed arcs.

Figure 5A:
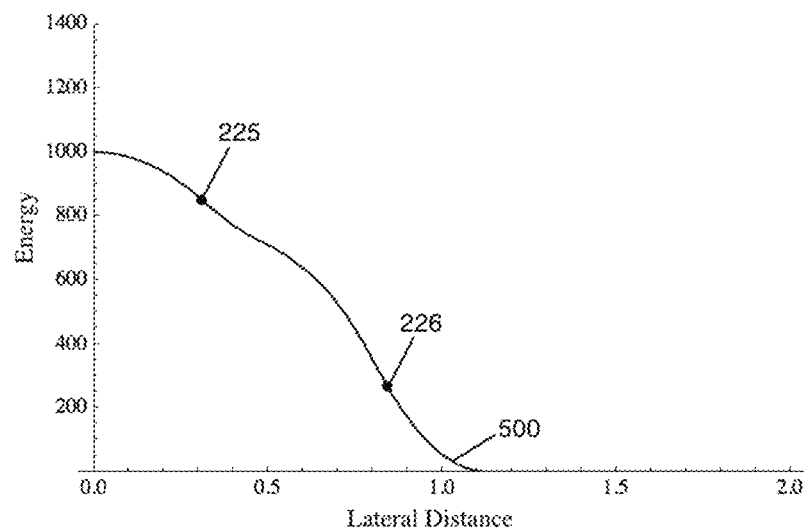
FIG. 5A-B show example two-dimensional graph plot results of a two object system of unequal magnitude.
Figure 5B:
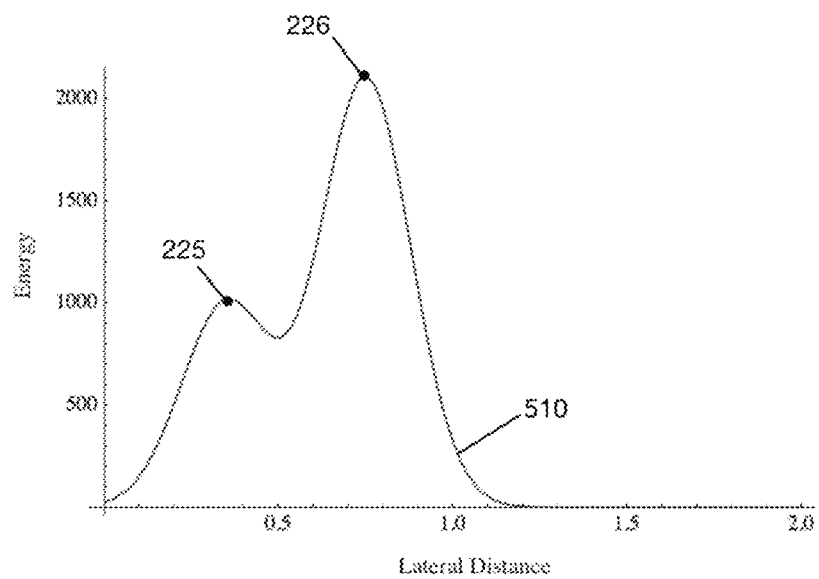

FIG. 5A-B show possible result graphs where one point maxima, for example e, is of a smaller energy magnitude than point maxima f. FIG. 5A shows a result of the convolution process in a graph plot 500 with a reduced plot slope around e at first point 225, whereas there is a larger slope around f at second point 226. A deconvolution result slope 510 in FIG. 5B more readily shows the nature of the system. Point maxima e, at the first point 225, lies at a smaller local maxima than point maxima f, which lies at the second point 226 at a larger local maxima. This indicates that point maxima f comes from a higher or closer energy source, such as a brighter or nearer star.

Figure 6:
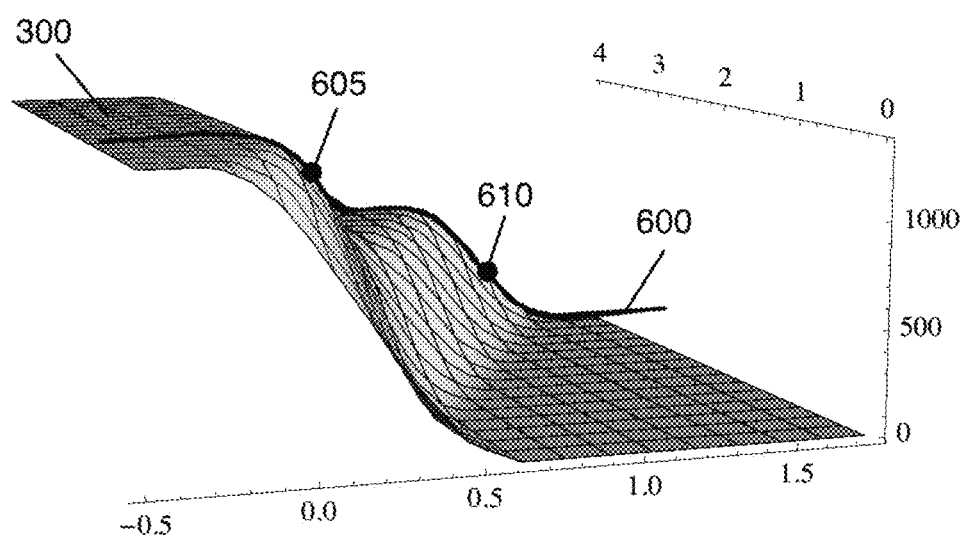
FIG. 6 shows a two-dimensional false positive graph plot result of a two object system that appears to be of unequal magnitude.

FIG. 6 shows three-dimensional surface 300 of FIG. 3, but from a different perspective, that allows the computer system 100 to avoid perspective errors. From this perspective, perspective plot 600 corresponds to a convolution blade movement (not shown) through the surface 300. The plot 600 appears to have a smaller magnitude point maxima 605 near a larger magnitude point maxima 610, which may cause the computer system 100 to conclude that the apparent smaller point maxima 605 was generated from a dimmer or farther energy source and the larger point maxima 610 was generated by a brighter or closer energy source, but this is not the case. Rather, the smaller point maxima 605 is due to a perspective skew. In reality, the graph surface 300 was generated by the two point maximas of the same energy magnitude and range.

Figure 7A:
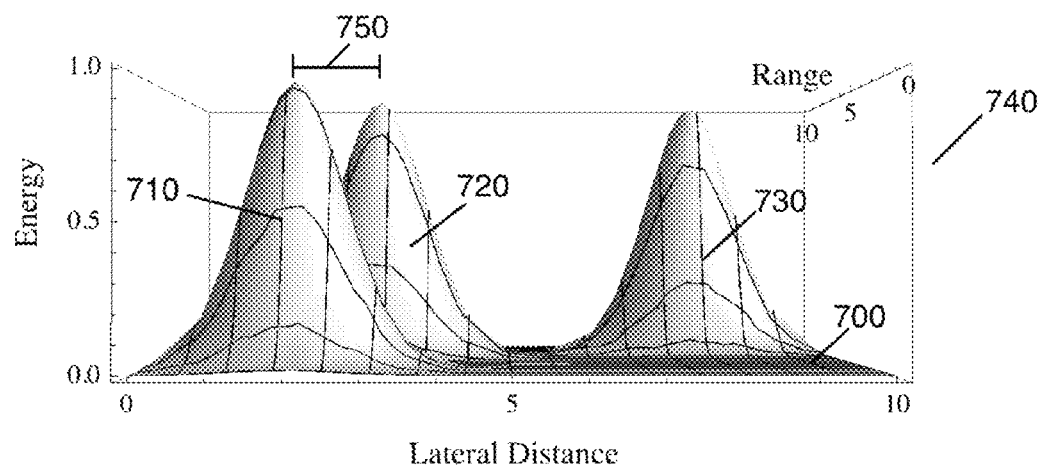
FIG. 7A-B show three-dimensional graph surface results that may be used to determine dimensions by using multiple perspectives.
Figure 7B:
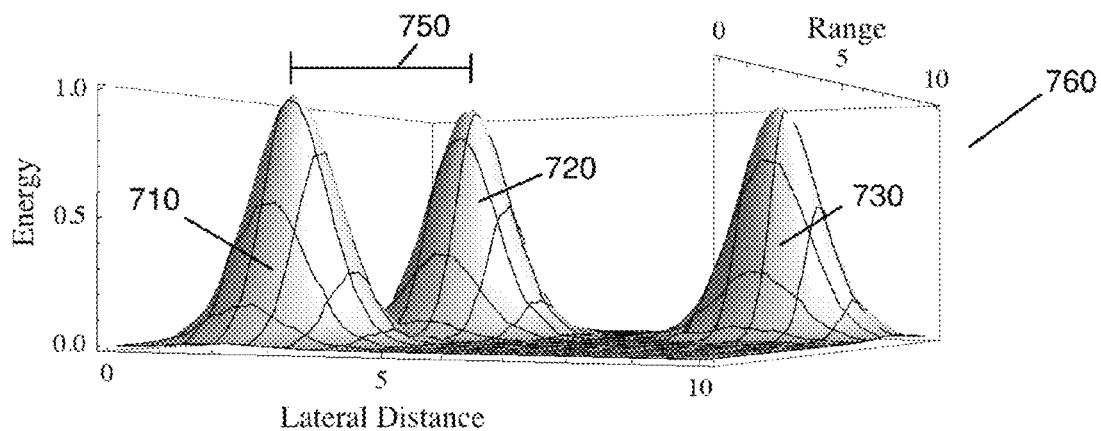

FIG. 7A-B show a surface 700 where perspective may be used by the computer system 100 to determine ranges. FIG. 7A shows a first point spread function 710 at a range of 2, a second point spread function 720 at a range of 6, and a third point spread function 730 at a range of 8, all viewed from a first perspective 740 where it is not readily apparent which of the point spread functions is closer or farther in the absence of the shading and numbered graph axes. A reference distance 750 between the peak maximas of the first and second point spread functions 710, 720 provides a measureable data value which can be found using the above described convolution techniques. Viewed from a different perspective 760 in FIG. 7B, where a shift has occurred, the reference distance 750 between the two point maximas is now demonstrably larger, thus allowing ranges to the point spread functions 710, 720 to be more readily determined. A method exemplifying this processes would be to first convolve spots 710 and 720 from the first perspective 740 to record the convolution curves shown in FIG. 2A-D, for example, and measure the distances between the maximas 750, then move the imaging system laterally to the second perspective 760 and repeat the process of recording the distance between point maximas 750, thereby revealing that the first point maxima 710 is at a closer range of 2, than the second point maxima 720 with range 6.

Figure 8A:
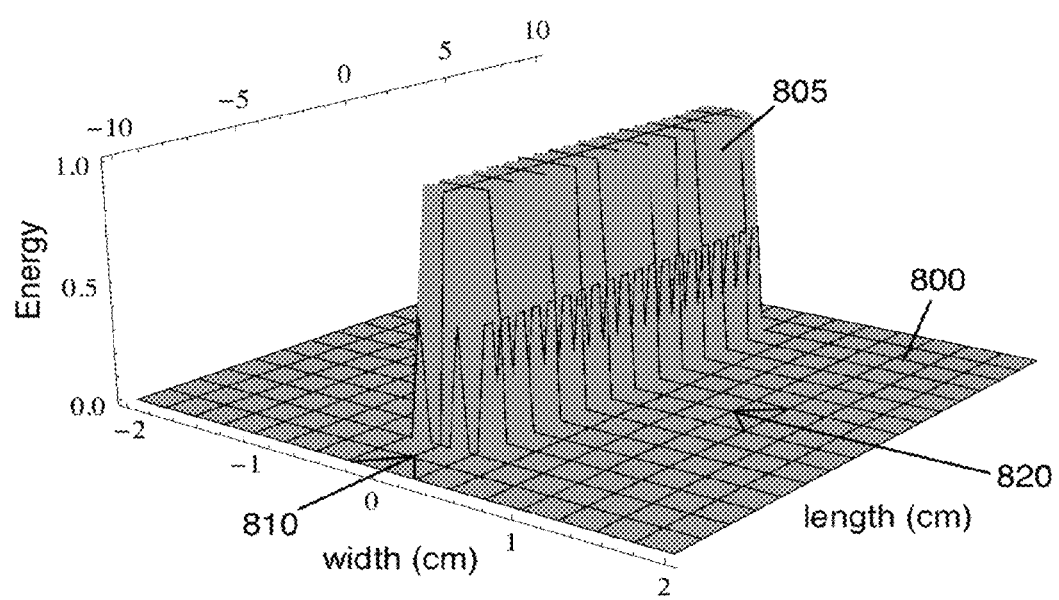
FIG. 8A-C show graph plots and surfaces where multiple perspectives are used to determine object shape and size.
Figure 8B:
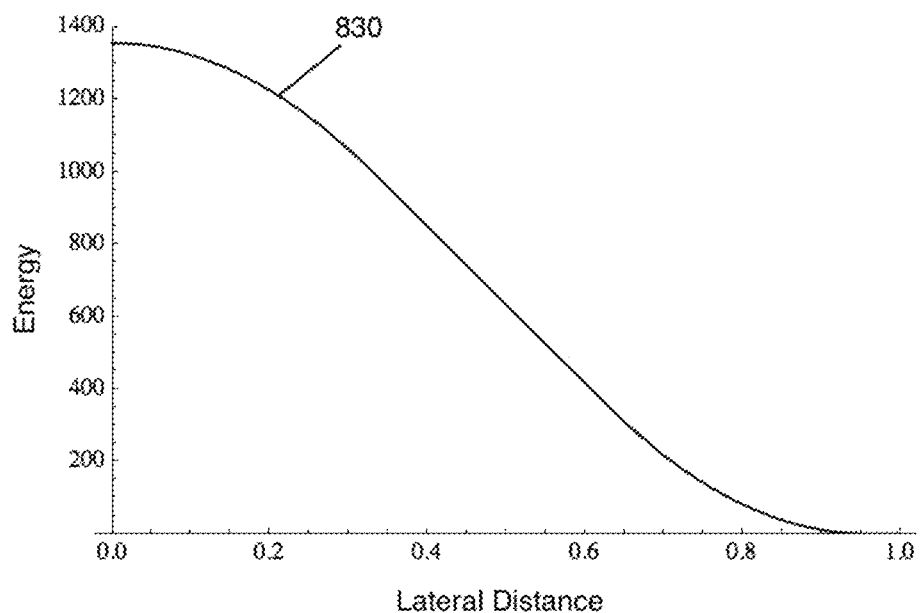
Figure 8C:
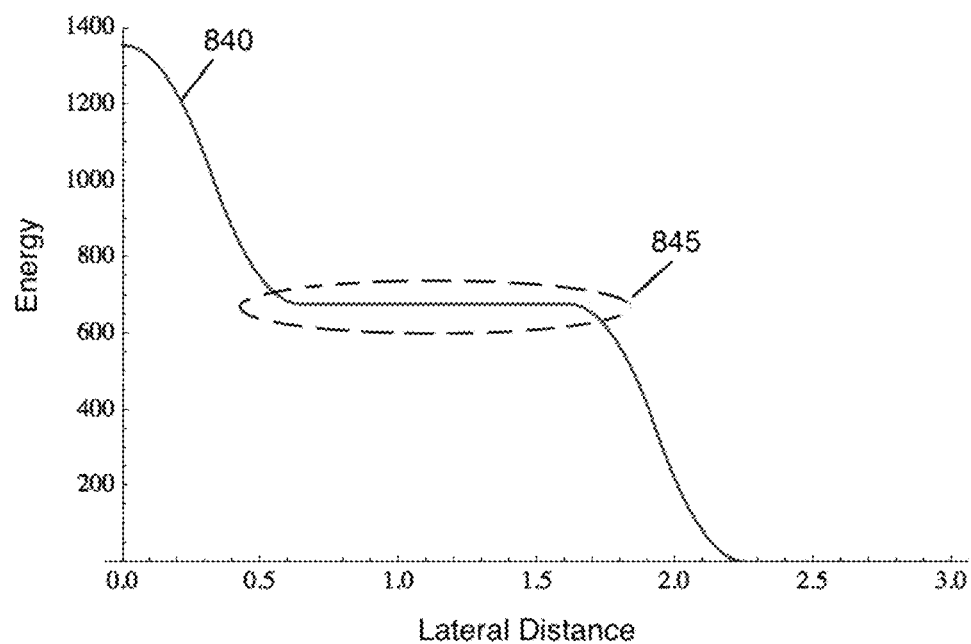

FIG. 8A-C show a similar technique using perspective to find object shapes. In FIG. 8A, a surface 800 represents a point spread function of an object 805 with an elongated form. Convolving the object using the techniques disclosed from its narrow face as indicated by a reference arrow 810, will yield a convolution graph plot 830 shown in FIG. 8B. While convolving from its wide face as indicated by reference arrow 820 will yield a convolution graph plot 840 shown in FIG. 8C, where length face point maxima 840 is a plateau which indicates that the object 805 is longer than it is wider. The computer system 100 can then use the plots 830, 840 to recreate a more accurate image of the object 805 using the techniques disclosed above.

Figure 9A:
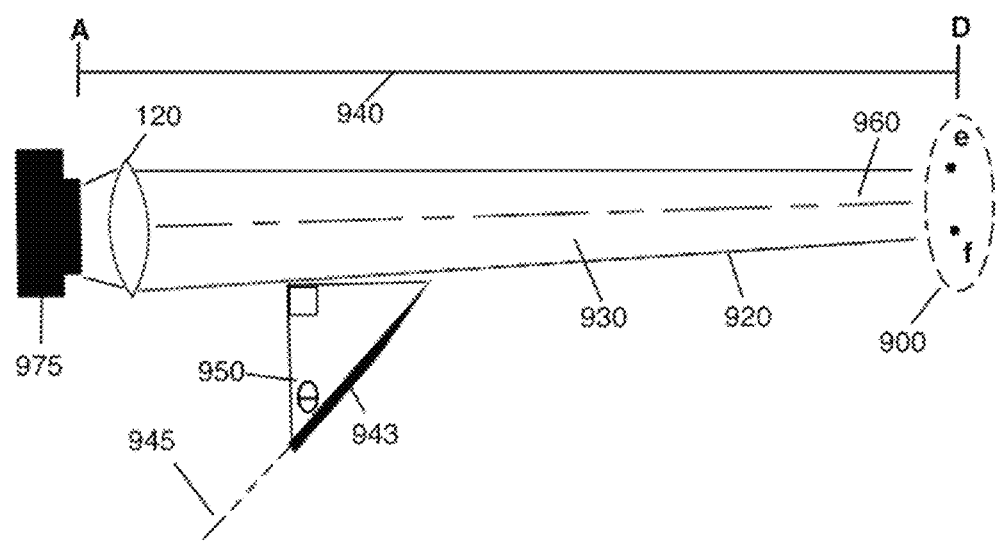
FIG. 9A-C show a variation of the imaging system using a blade at angle.
Figure 9B:
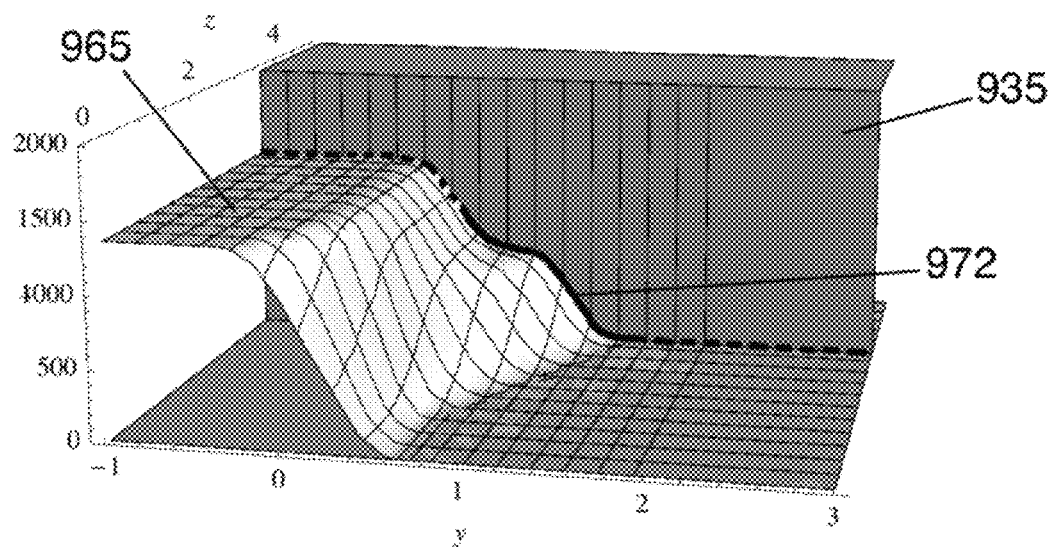
Figure 9C:
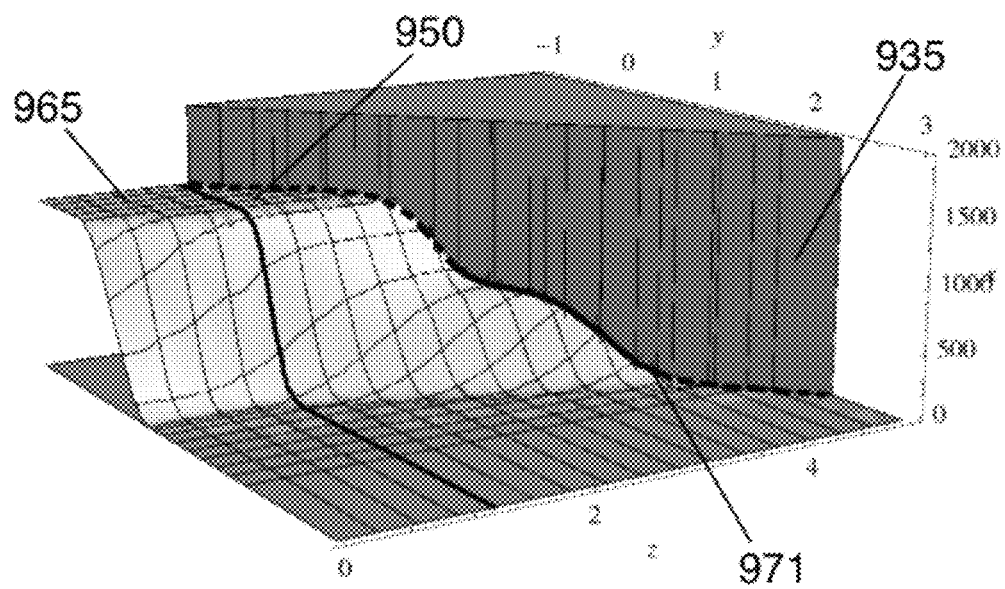

FIG. 9A-C show another possible variation of the imaging system and possible convolution surface outputs. In FIG. 9A, imaging objects 900, represented by e and f, create an electromagnetic or light path 920 that has a flux gradient 930 that decreases in intensity as D→A, which are points on reference line 940. In this variation, the convolution blade 943 is inserted along an axis 945 at an insertion angle θ 950 to the light path axis 960. FIG. 9B shows an example surface output 965 where the blade 935 (here represented by a vertical plane) is at insertion angle of 0 degrees (degrees not diagrammed). FIG. 9C shows an example surface output 965 where the convolution blade 935 is at an insertion angle 950 of 45 degrees. FIG. 9C shows the effect that changing the convolution blade angle θ 950 has on the data recorded by the sensor 975. Particularly, the cross-section of FIG. 9C features an elongated lower cross-section slope 971 that will have a different rate of change (i.e. different first and second derivatives) than the cross section slope 972 in FIG. 9B. By using a single blade at an angle, the imaging system is able to forgo taking multiple measurements at different positions along light path, and instead take one measurement at an angle where the convolution of the flux gradient discloses how light path 125 evolves as D→A. However, even at an angle of 0 degrees (perpendicular) convolving the light path data may still yield more information than imaging the imaging objects without any blade processes.

Figure 10A:
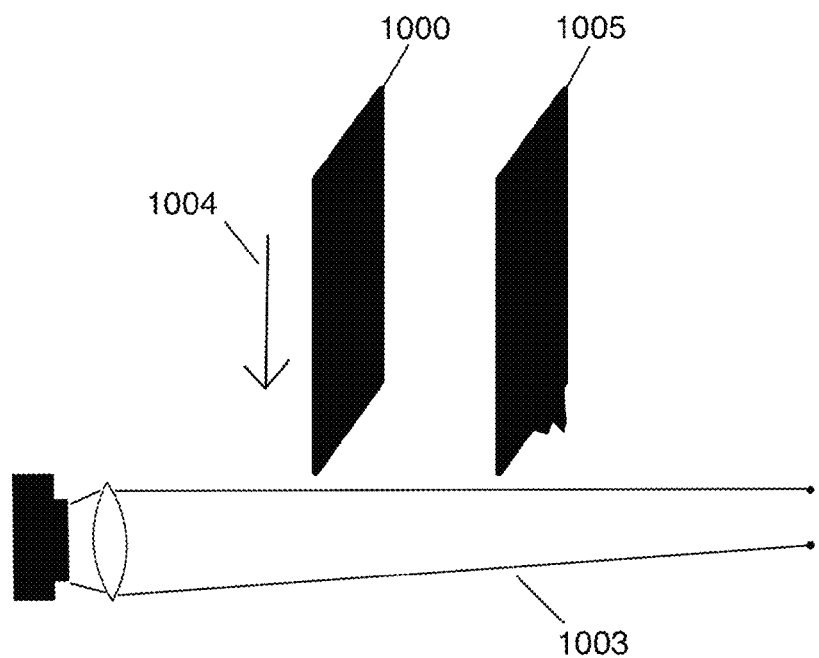
FIG. 10A-D show example options of the blade types and configurations.
Figure 10B:
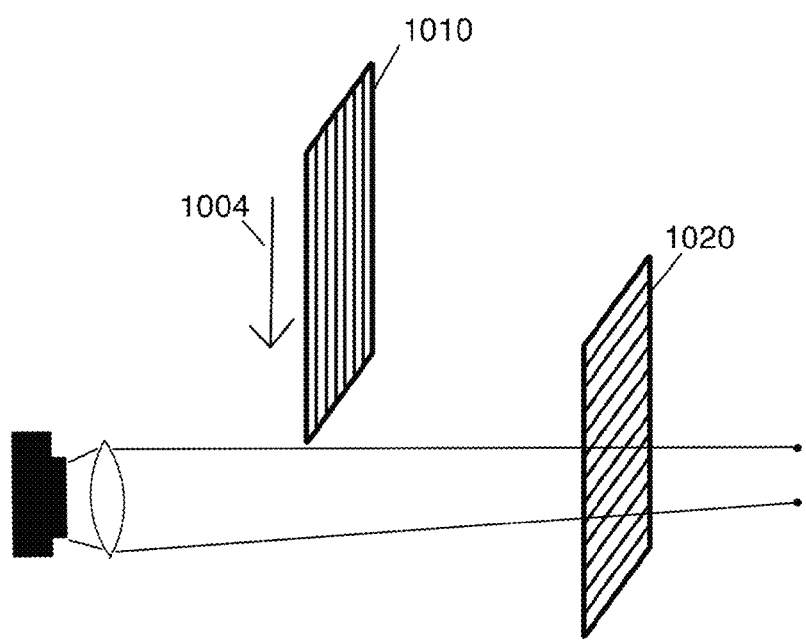
Figure 10C:
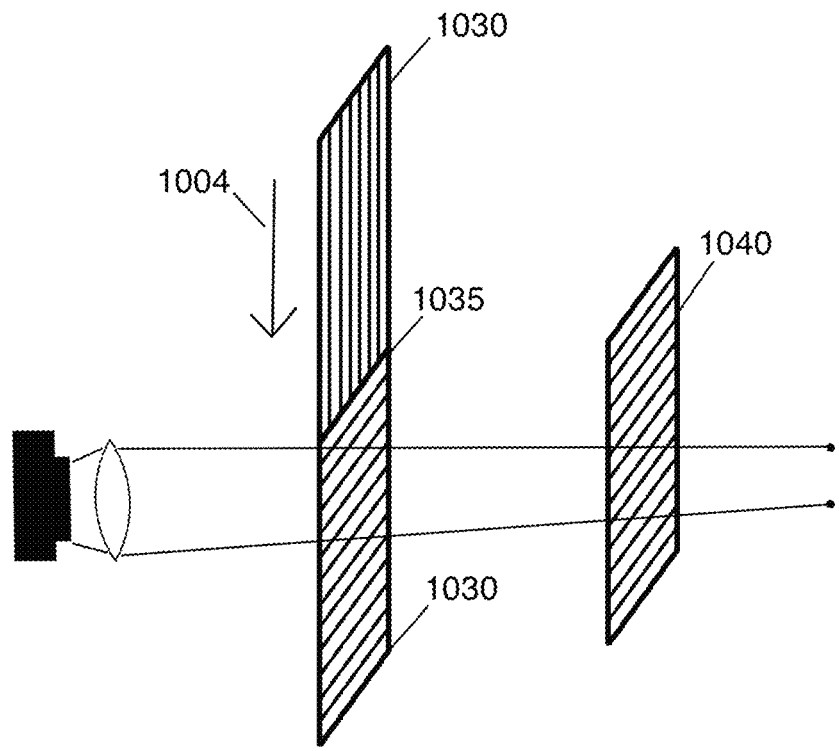

FIG. 10A-C show different configurations and types of convolution blades that may be used with the imaging system. In FIG. 10A, a steel razor blade with a straight edge 1000 is inserted into light path 1003 in the direction of a reference arrow 1004. Due to steel's opaque nature, no labeling filter 130 (as shown in FIG. 1) is required. Alternatively, a steel razor blade with partially jagged edge 1005 may be used to customize the convolution output, such that the jagged edge convolves the light path before the straight edge does, acting as a specialized spatial filter. Another variation utilizes polarizers as shown in FIG. 10B. There, a convolution blade 1010 is a vertically aligned polarizer and a labeling filter 1020 is a horizontally aligned polarizer. An advantage of using polarizer blades is that they cause less "smear" of the light as it is convolved.

Figure 10D:
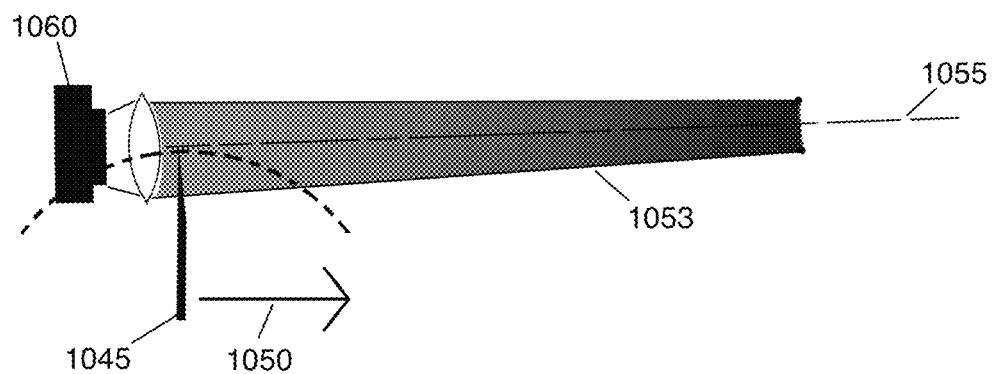

FIG. 10C shows another variation wherein the convolution blade consists of two orthogonal polarizers 1030 joined along an adjacent edge 1035, where the labeling filter 1040 consists of a polarizer parallel to one of the polarizers used in orthogonal blade 1030. FIG. 10D shows a variation of the imaging system wherein the blade 1045 is held tangent to the light path axis 1055. Using this configuration, single images or multiple images combined using image stacking will yield better resolution than had no blade 1045 been inserted. Alternatively, the blade 1045 held at the tangent of 1055 may undergo a range convolution by allowing sensor 1060 to record the light path data as the blade 1045 is moved along the direction indicated by the reference arrow 1050.

Figure 11A:
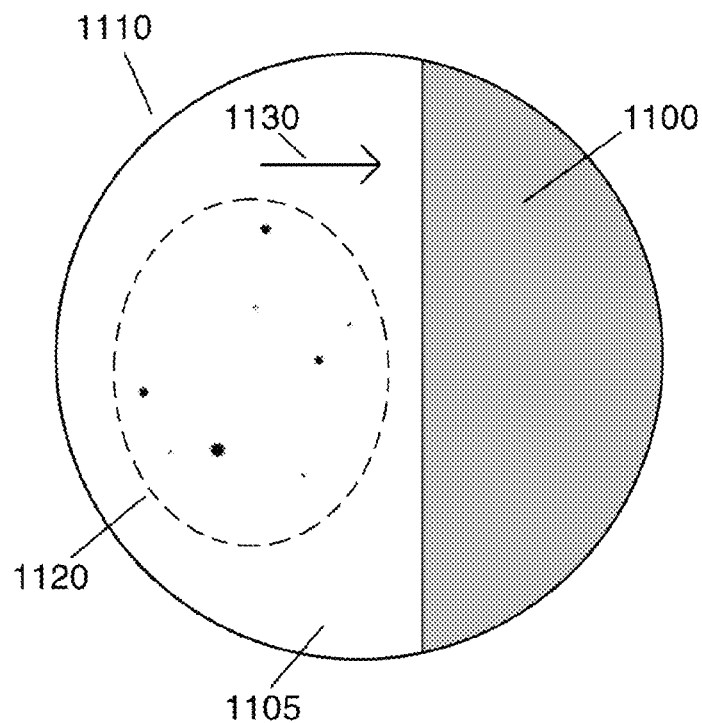
FIG. 11A-B show ocular views through an imaging system using different blade configurations.
Figure 11B:
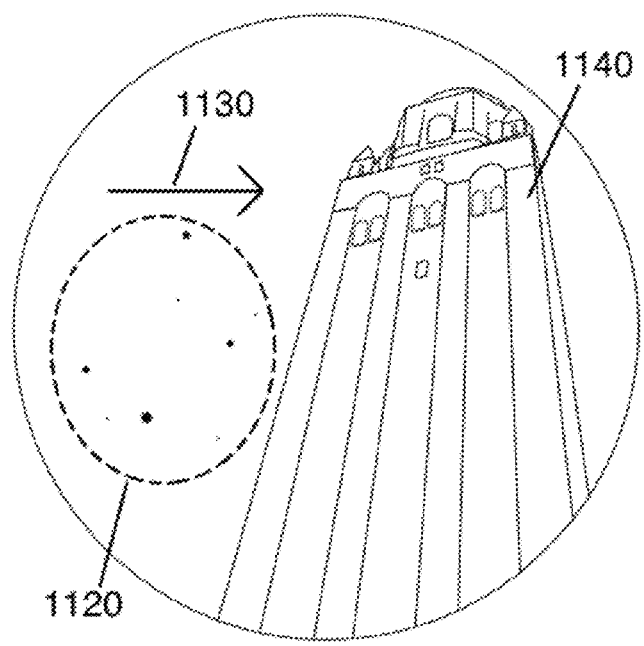

FIG. 11A shows an ocular view of another convolution blade variation. The blade 1100 is mounted on an aperture 1110 of a lensing system (ocular view) such as a telescope, and remains stationary with respect to the aperture 1110. A plurality of stars 1120, visible through the un-obstructed portion of the aperture 1105, is then allowed to move the towards the blade 1100 in an apparent motion indicated by the reference arrow 1130 due to Earth's rotation around its axis. Alternatively, if a telescope is utilized, the apparent motion of the stars may be caused by movement of the telescope's tripod motors moving the aperture 1110 into the plurality of stars 1120. Similarly, large objects such a cliffs, asteroids, or a school tower 1140 may be used to convolve the plurality of stars 1120, as shown in FIG. 11B. Using the school tower 1140, or other far object, as a convolution blade 140 (in FIG. 1) allows an observer to create a larger distance between the sensor 110 and the blade 150 thereby allowing more accurate measurements to be recorded.

Figure 12A:
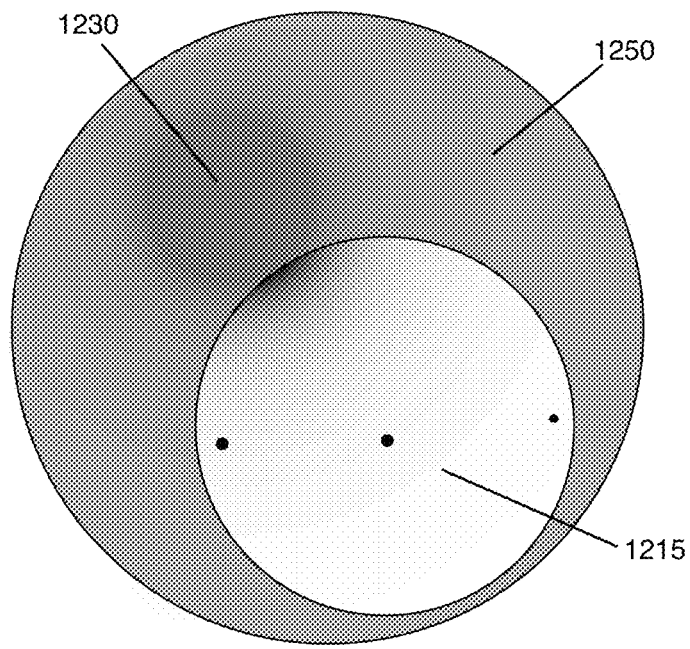
FIG. 12A-B show different types of filters that may be used with the imaging system.
Figure 12B:
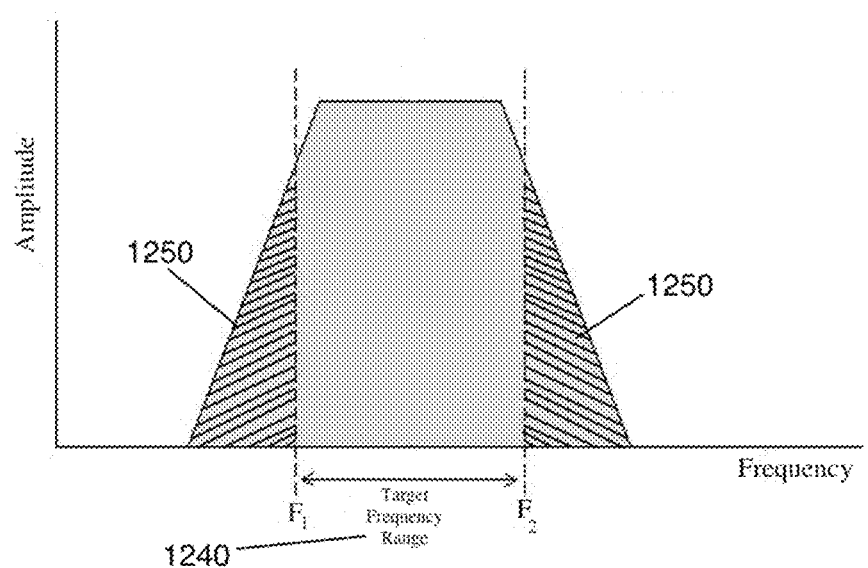

FIG. 12A-B show a variety of optional filtering techniques. To improve the signal to noise ratio (SNR) of the imaging target 1215, such as the stars in Orion's belt, a variety of spatial filters 1250 may be applied to block out signal from noisy nearby objects, such as the moon 1230, as demonstrated in FIG. 12A. Similarly, the light coming from imaging objects 135 (in FIG. 1) may consist of particular frequencies 1240, as shown in FIG. 12B, which is a frequency/amplitude graph of a notch filter. In this case, a notch filter (not pictured) is devised to block out unwanted noise 1250. A person of ordinary skill in the art can similarly apply other filters, such as light color filters, polarizers high-frequency pass, and low-frequency pass filters generally.

Figure 13:
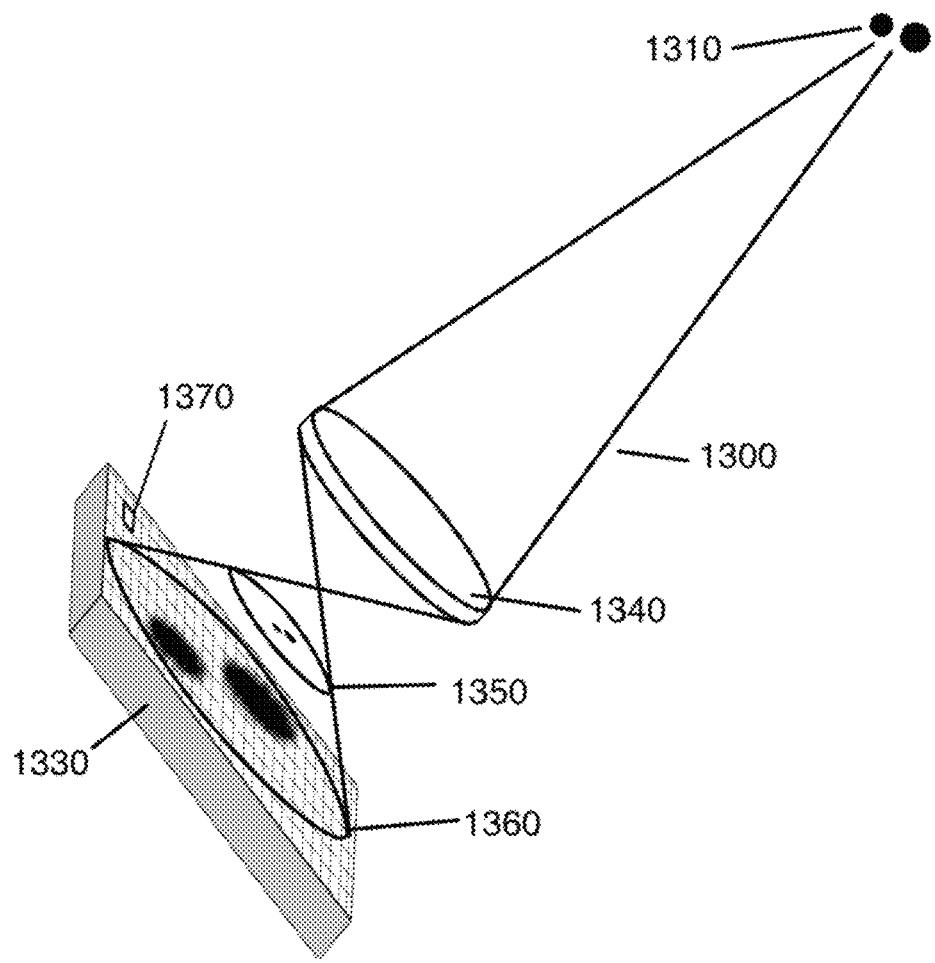
FIG. 13 shows an example variation of the imaging system using out of focus methods.

FIG. 13 shows a method for increasing signal energy received by a sensor, such as an image sensor 1330. Often, the light path or signal energy 1300 coming from the imaging objects 1310 is highly attenuated by the time it reaches sensor 1330. To improve the signal amplitude and definition, a lensing system 1340 may direct an out-of-focus image plane 1360 on the image sensor, instead of using an in-focus image plane 1350, because the out of focus image plane 1360 causes more sensor elements 1370 to receive signal energy. Similarly, the image sensor could be replaced by a lux meter with a single recording element, and lensing system 1340 may focus all of the light path 1300 on the signal lux meter element.

Figure 14:
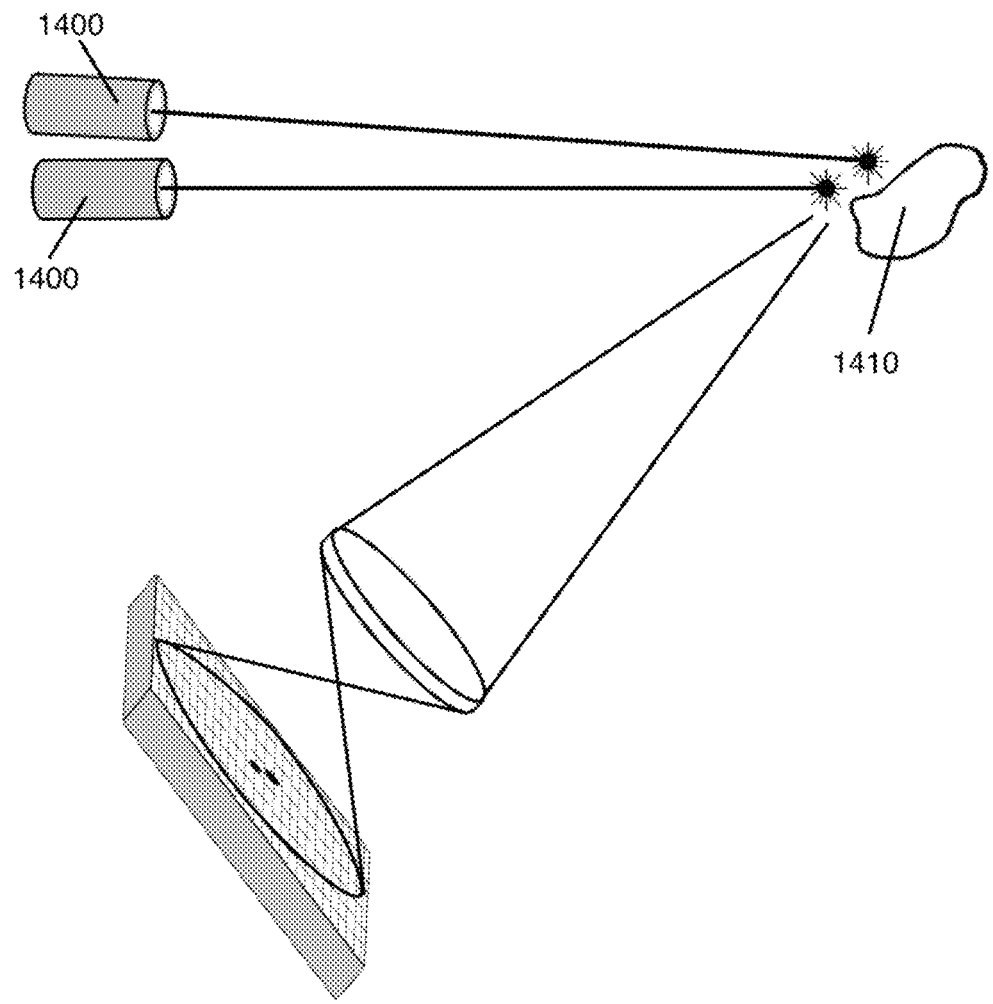
FIG. 14 shows an example variation of the imaging system using two illumination devices for imaging objects.

FIG. 14 shows a variation of the imaging system wherein a plurality of light sources 1400 are used to illuminate a target object 1410. In this variation, the light sources 1400 may be lasers, arc lamps, or other sources of illumination. The advantage of this variation is the ability to determine dimensions, such as range, of an object with no defined features or very low SNR.

Figure 15:
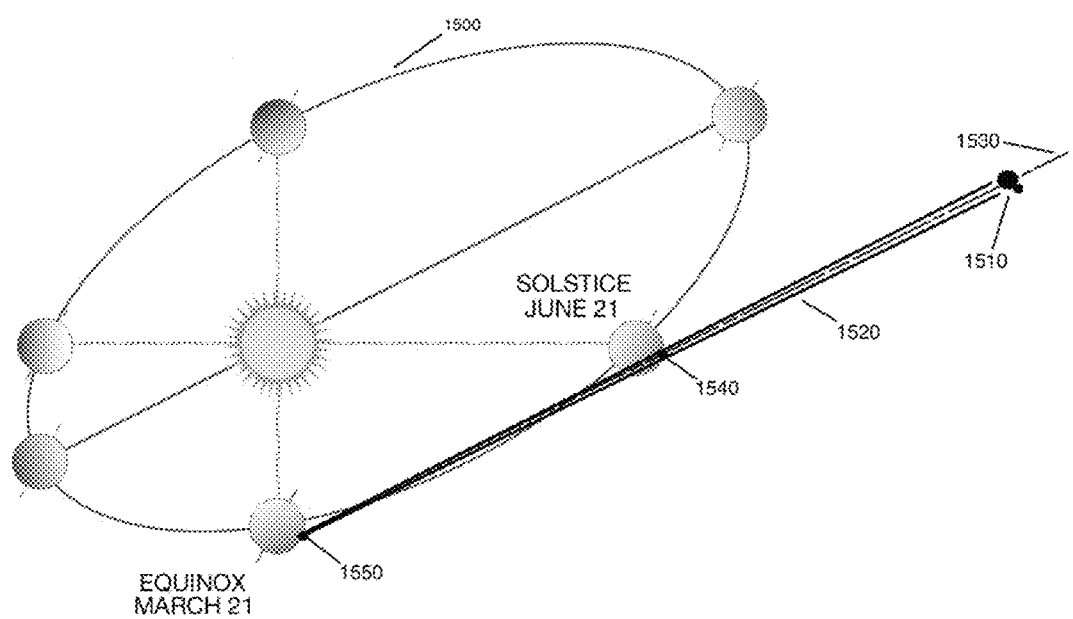
FIG. 15 shows an example variation of the imaging system using different positions in Earth's orbit.

FIG. 15 shows a variation of the imaging system using Earth's orbit 1500. The imaging objects 1510 are on an imaging axis 1530 that intersects Earth's solstice position on June 21 at a solstice position point 1540 and Earth's equinox position on March 21 at an equinox position point 1550. At the equinox position 1550, a sensor 110, lensing system 120 and a convolving blade system 145, as shown in FIG. 1, take a measurement of a blade 140 as it moves through the light path 1520 at an angle perpendicular to the imaging axis 1530, or at an angle θ therefrom. Later, at the solstice position 1540, the process is repeated. It is noted that the same blade 140 may be used in both processes, first at the equinox position 1550 and second at the solstice position 1540 whereby the second blade 150 is simulated by the first blade at a different position.

After the equinox and solstice processes have been recorded producing two sets of recorded wave data 105, a computer system 100 may generate the plots and images shown in FIG. 2A-D, FIG. 3, and FIG. 4A-G using the techniques disclosed above. A person of ordinary skill in the art that will appreciate that possible variations of this system include using imaging objects that are not aligned with the equinox and solstice positions 1550, 1540 or are out of the plane of Earth's orbit 1500 and using trigonometry to calculate proper distances; or another variation comprising generating plots and images immediately after the equinox position measurement and foregoing the solstice position measurement. The latter method, whereby a second blade measurement is not applied, is of interest because one of ordinary skill in the art can appreciate that even a single convolution blade 140 measurement will reveal higher resolution than if no blade has been applied.

Figure 16:
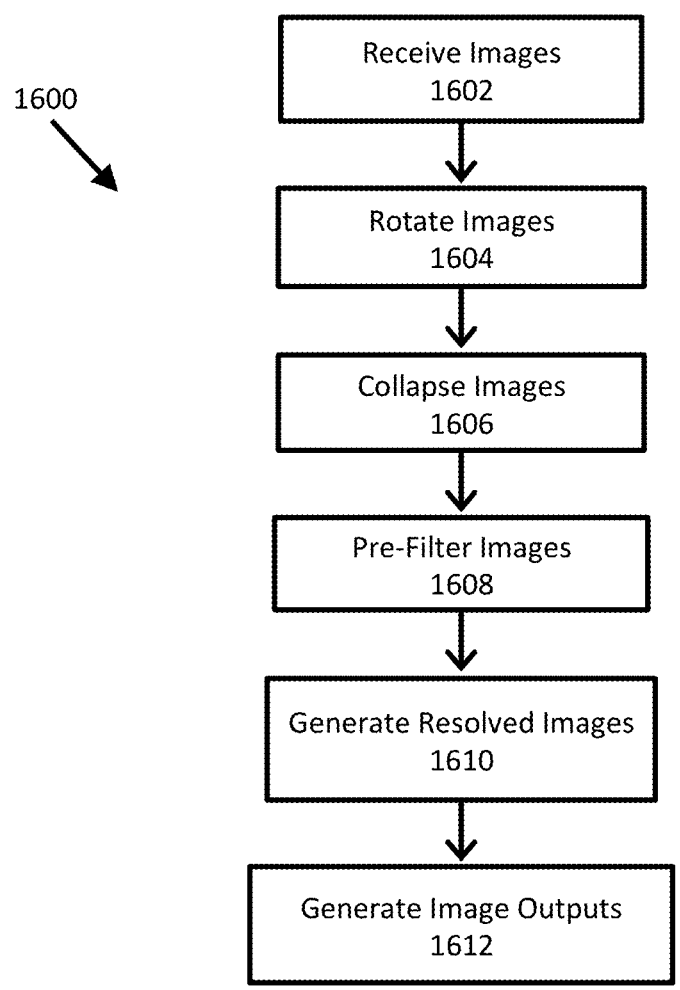
FIG. 16 shows an example flowchart of an approach for processing image data to generate enhanced images, according to some embodiments.

FIG. 16 shows a flowchart 1600 for an approach for manipulating and restructuring image data to generate enhanced images, as according to some embodiments. At 1602, the image sequence is received at the computing device 100 for processing. In some embodiments, the image sequences corresponds to light that has been convolved laterally. The convolved light may be recorded using an image sensor (e.g. 110, FIG. 1) to generate convolved light data (e.g. 105, FIG. 1). In some embodiments, the convolved light data corresponds to one or more frames (e.g. two-dimensional image data) captured over time intervals. In this way, the convolved light data may be aligned in a temporal axis (e.g. time arrow 1716, FIG. 17A).

At 1604, the image sequence may be treated as 3-D image block (e.g. matrix, tensor) that may be rotated by an amount of degrees, such as 90 degrees along one or more axes. In some embodiments, no rotation is implemented. In some embodiments, the image block may be rotated by slicing the block into frames of dimensions different than their original dimensions (e.g. as captured dimensions) and then recomposing the image block from the new sliced frames to rotate the image block. As an example of the frame slice rotation operation, if a two-dimensional image (e.g. frame) corresponds to the X axis (e.g. horizontal axis) and Y axis (e.g. vertical axis); multiple frames may be captured to generate an image block of X, Y, and T axes (where T corresponds to time). To rotate the image block by slicing data, the X, Y, T, axis may be sliced into individual frames of Y and T dimensions. Next, the new rotate image block may be generated (e.g. recomposed) by using the Y and T frames using a image compose operation (e.g. Image3D( ) in Mathematica).

At 1606, the image block may be collapsed to generate a 2-D image matrix. In some embodiments, the image block may be collapsed by totaling the rows of the matrix along an axis to reduce dimensions. In some embodiments, the convolved light data is collapsed to generate collapse light data. Generally, a collapsing operation adds elements of the image block together to reduce the object's (e.g. image block's) dimensionality. For example, if multiple image frames are captured in the X and Y dimensions, the 3D block may be generated to correspond to the X, Y, and T dimensions. The XYT block may then be collapsed or totaled in the XY direction (parallel to T), or YT direction (parallel to X) to generate collapsed light data (e.g. 1742, FIG. 17D) of one or more dimensions smaller than the image block.

At 1608, the images may be pre-filtered to remove unwanted artifacts, such as noise and oversaturation. At 1610, one or more enhanced or more resolved images may be generated by applying derivatives to generate enhanced images with greater resolution. In some embodiments, the derivative filters may be applied in a direction parallel to the temporal dimension (e.g. applied in a direction parallel to the T dimension). In some embodiments, derivative filters may be applied in a direction orthogonal to the temporal dimension (e.g. applied in a direction orthogonal to the T dimension). At 1612, the enhanced images may be further filtered, modified, or adjusted (e.g. cropping, denoising, binarization) to generate a final output. Though the approach above recites the process in a specific order, one of ordinary skill in the art appreciates that the steps can be modified, reordered, added or removed as appropriate for a given implementation. For example, in some implementations rotating a large image block (e.g. 1604), which may have dimensions such as 980×640×100000 (where 980×640 is the image resolution and "100000" denotes 100000 frames or seconds), may place too great a strain on the computing system. In some embodiments, one solution is to first collapse the image block (e.g. 1606) into a smaller data set, then apply the rotation. Further combinations are modifications are explained with in conjunction with FIGS. 17A-F, 19, and 20.

Figure 17B:
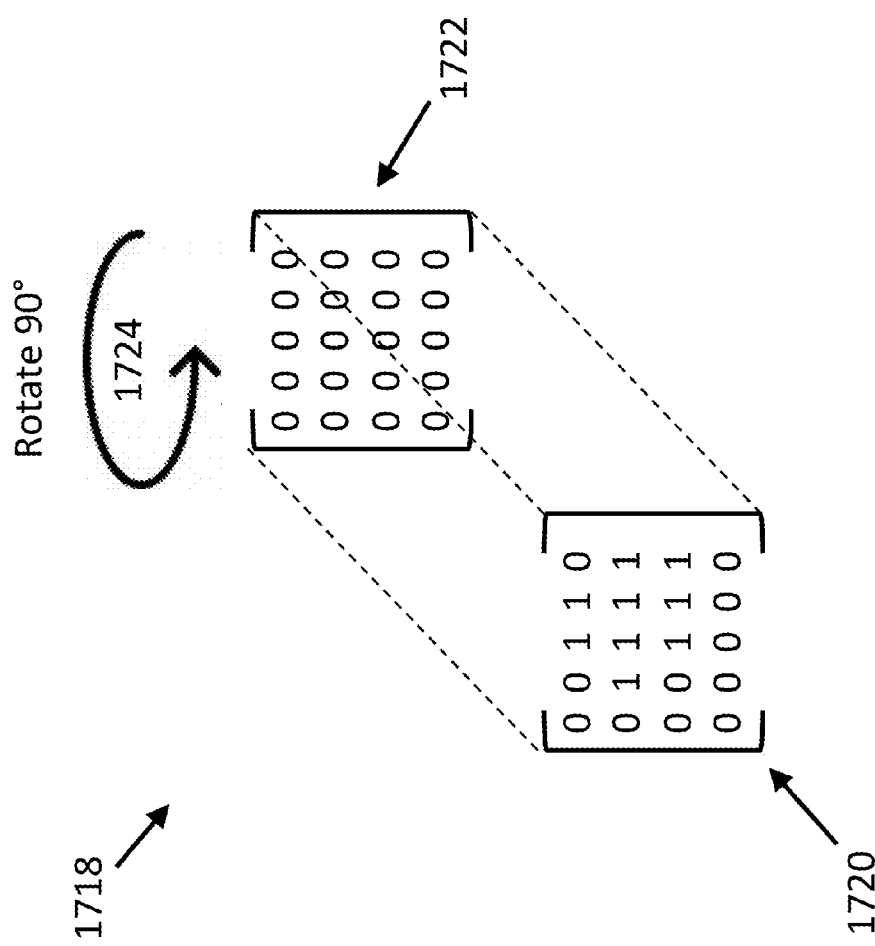

FIG. 17A-F illustrate example data manipulations and restructuring for processing image data to generate enhanced images, as according to some embodiments. FIG. 17A illustrates an image block 1700 that has been convolved by a blade (not depicted). The illustrated image block is spread out by frames (e.g. image slices, images) 1702-1712 for greater clarity. Image frame 1702, for example, illustrates a 5×4 pixel image where "1" may represent a white pixel and "0" may represent a black pixel. Thus for example, image frame 1702 may represent an image captured of a far away star where the 1's represent pixels with captured photon data and zero's indicated the absence of light.

In this example, time flows in the direction of the time arrow 1716. That is, image frame 1702 may be a picture taken at time, t=0; image frame 1704 may be a picture taken at time, t=1 (e.g. 1 second), and so on, until the last example frame is captured, frame 1712 which is taken at t=6 (e.g. 6 seconds). Thus, the image block 1700 may correspond to a video sequence or a plurality of frames aligned along a temporal axis (e.g. time arrow 1716).

As mentioned, the image block 1700 corresponds to light coming from objects convolved by a blade; in particular, in this example, the light has been convolved along a direction indicated by the blade movement arrow 1714. For example, in frame 1702, none of the pixels have been blocked by the blade, as indicated by the right-most column, which still has image information (e.g. the 1's in the right-most column) from the hypothetical star(s) being imaged. However, at frame 1704 the blade has been incremented to block the right-most column, thus the right-most column in 1704 is all 0's and appears black. At 1706, two right-most columns have been blocked by the blade, as indicated by 0's in those columns. The blade movement continues until frame 1712 (the last in this example sequence), where the blade has completely occluded the star being imaged, as indicated by the 0's in image block 1712. (Another illustrative example of the blade incrementing is shown in FIG. 23A-K, discussed in further detail below.) The process described here is merely an example of some embodiments for producing enhanced images. One of ordinary skill in the art appreciates that while frames, images slices or samples may be used here, continuous data (such as the data illustrated in FIG. 2A-D) may likewise be implemented. That is, instead of the incremental movements illustrated here, the blade may move forward continuously (e.g. infinitesimally, effectively infinitesimally) and the frames may be captured according to a frames per second (FPS) capture rate. Similarly, while 5×4 pixel images are sampled one per second, for a duration of 6 second total, one of ordinary skill in the art appreciates that the number of samples taken, the sampling rate, and the duration of the imaging run (e.g. total elapsed capture time) may be modified or adjusted to optimize the approach per implementation. Finally, while 0's and 1's are illustrated here as an example for black and white pixels, one of ordinary skill in the art appreciates that other data-values and/or color-spaces, such as RGB or CMYK, can likewise be implemented.

FIG. 17B illustrates an example image block rotation sequence, as according to some embodiments. There, the image block 1700 is rotated 90 degrees counter clockwise with respect to the Y-axis (where Y is up/down with respect to font orientation in FIG. 17B). The output of this example rotation sequence is illustrated as rotated image block 1732 in FIG. 17C. There, frame 1728 comprises each left-most column from each frame 1702 to 1712. In other words, the left-most column of frame 1728 corresponds to the left most column in frame 1702. Likewise, the second left-most column in frame 1728 corresponds to the left-most column in frame 1704; the third left-most column in frame 1728 corresponds to the left-most frame in frame 1706, etc. Similarly, frame 1730 comprises the right-most column of each frames 1702-1712. In some embodiments, the image block 1718 may be rotated one or more degrees along the Y axis as illustrated in arrow 1724. In some embodiments, the rotation may rotate the image block one or more degrees along the T axis (e.g. the axis along time arrow 1716 in FIG. 17A).

In some embodiments, the rotation may be performed as part of a image slice rotation sequence wherein the image block is partitioned into frames of different dimensions than as the frames were captured, and then recombining the frames to compose a rotated image block. For example, referring to FIG. 17A, the frames may have been captured along the X axis (horizontally) and Y axis (vertically), and over time-intervals along the temporal dimension T (e.g. the dimensions parallel to 1716). Thus, in this example, image block 1718 may comprise XYT dimensions. The image slice rotation sequence may first partition image block 1718 into YT slices. For example the first YT frame (e.g. $YT_1$) comprises the the left most columns of each frames 1702-1712 (e.g. $YT_1$={{0, 0, 0, 0}, {0, 0, 0, 0}, {0, 0, 0, 0}, {0, 0, 0, 0}, {0, 0, 0, 0}} and the last YT frame ($YT_5$) comprises the right most columns of frames 1702-1712 (e.g. $YT_5$={{0, 1, 1, 0}, {0, 0, 0, 0}, {0, 0, 0, 0}, {0, 0, 0, 0}, {0, 0, 0, 0}}). Next, a rotated image block (e.g. image block 1726, FIG. 17C) may be generated by combining the YT frames (e.g., in this example: $YT_1$-$YT_5$).

Figure 17C:
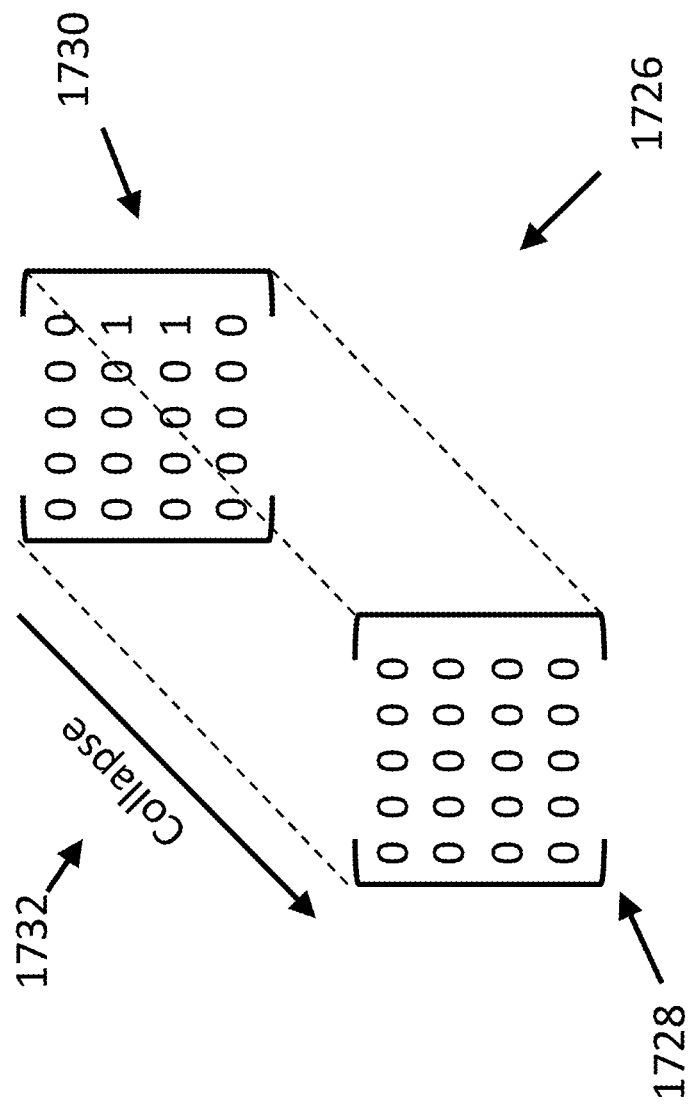

FIG. 17C illustrates the collapse operation (e.g. totaling the matrix) as indicated by the collapse arrow 1732, as according to some embodiments. In some embodiments, the collapse operation collapses an n-dimensional image data object by at least n−1. In some embodiments, the collapse operation collapses an n-dimensional image data object by more than n−1 (e.g. n−2). In some embodiments, the convolved data (e.g. image block 1726, FIG. 17C) is collapsed to generate collapsed light data (e.g. frame 1742, FIG. 17D).

For example, the operation may reduce a 3-D image sequence into a 2-D image by summing all the elements in the desired direction. As an example, if matrix_1 is a 2×2 array: {{c1, c2,}, {c3, c4}}; then a row collapse/totaling operation on matrix_1 may sum elements together row-wise to yield: {c1+c2, c3+c4}; similarly, a column collapse/totaling operation on matrix_1 would sum elements together column-wise to yield: {c1+c3, c2+c4}. Thus the collapse/totaling operation, at least in this example, reduces the dimensions by one, from 2-D to 1-D. In this way, for example, the number of dimensions of the image block may be reduced by collapsing.

Applied here to the image block 1726, image frame 1728, image frame 1730, and the image frames between the two (denoted by the dotted lines) are summed in the direction indicated by 1732. (Note: the actual output of the collapse operation for the dataset depicted FIG. 17C would be the array: {{0, 0, 3, 2, 0},{0, 4, 3, 2, 1},{0, 0, 3, 2, 1},{0, 0, 0, 0, 0}}. However, in FIG. 17D-F a different dataset, which more clearly illustrates the filtering processes, is explained/used instead.)

Figure 17D:
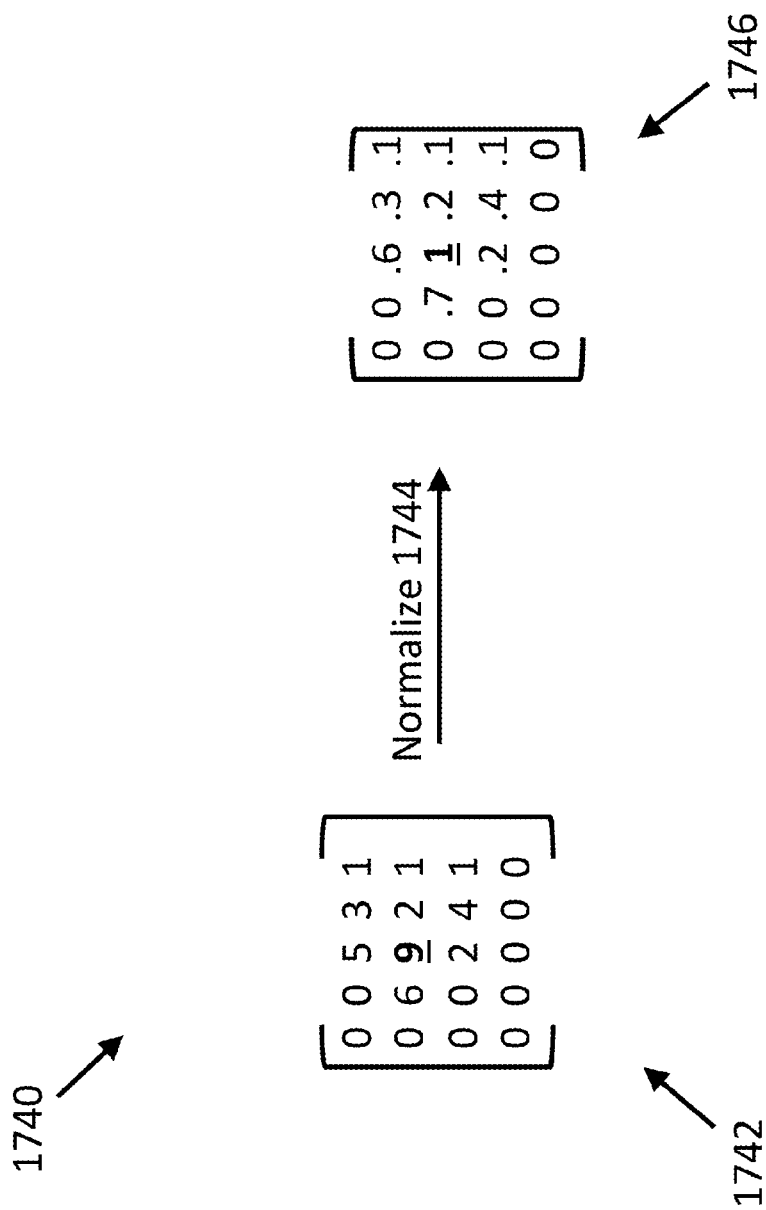
Figure 17E:
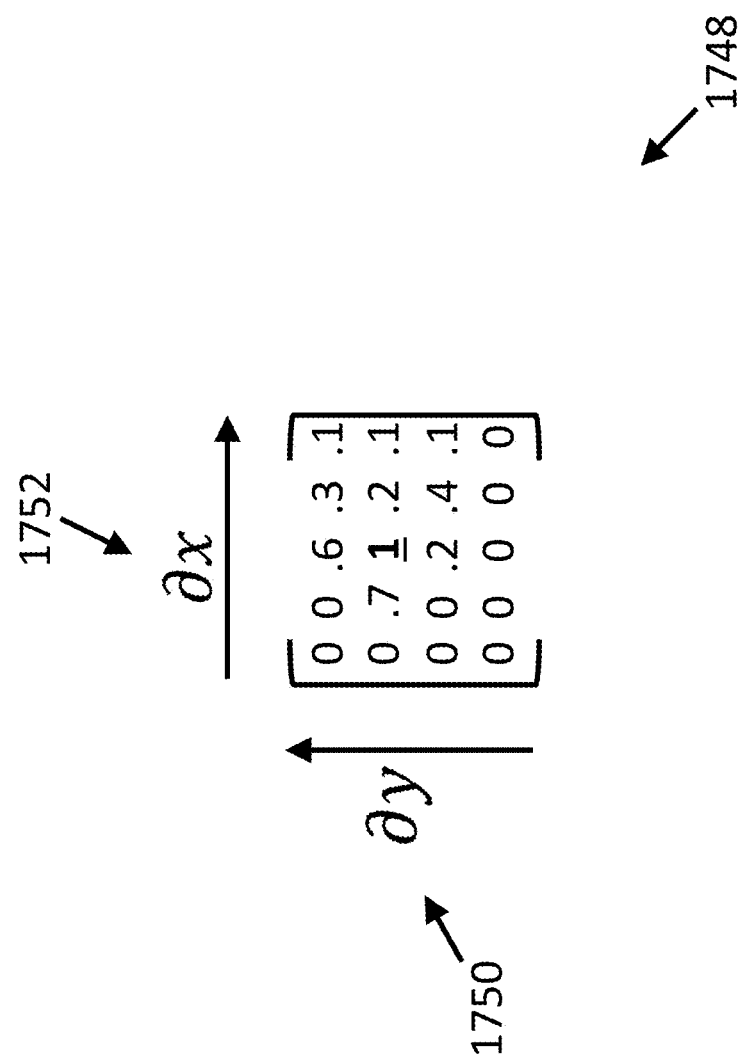

FIG. 17D illustrates a filtering process that may be applied to the image block or collapse image data to enhance the result output by removing artifacts (e.g. unwanted features). In particular, the filtering operation depicted is normalization, or normalizing over a range. After the collapse operation, the resultant image may be oversaturated. In a grayscale image, where the pixel values range from 0 (black) to 1 (white) (a gray pixel, for example, may be represented as "0.5"; or a light gray pixel may be represented as a number closer to white, such as "0.9"), pixel summation results over "1" are oversaturated. One operation to remove oversaturation is normalizing over the range, wherein all the pixel elements are divided by the largest element in the array. The filtering process 1740 in FIG. 4D illustrates an example normalization process. There, after the collapse, the resultant 2-D frame 1742 has values over "1" which will appear oversaturated and overly "white". To normalize the image 1744 and increase detail, each element is divided by the highest/maximum element value in the range. Applied here, the element with "9" is the highest value. Accordingly, each element may be divided by 9 to remove oversaturation. Thus, the pixel element with 9 becomes 1 (i.e. 9/9=1), the element with 6 becomes "0.7" (6/9=~0.7), and so on, through-out the array, until the normalized image frame 1746 is generated. In some embodiments, after normalization a result image is directly output without applying derivative filters. In some embodiments, normalizing the data is skipped and the derivative filters are used to reduce artifacts since in some cases derivative filters produce the same change-based output without normalization of data.

In some embodiments, derivative filters may be applied to the image data (e.g. 1748, or image block 1718) to deconvolve the image, as according to some embodiments. For example, in FIG. 17E the normalized image frame 1746 may have two derivatives applied. One possible image output is generated by applying the horizontal derivative filter 1752 (e.g. $\partial x$) to the normalized image frame to deconvolve the image with respect to x. In some embodiments, an output image is generated by applying the vertical derivative filter 1750 (e.g. $\partial y$) to deconvolve the image with respect to y. In some embodiments, an image output is generated by applying both horizontal and vertical derivatives to generate a deconvolved image with respect to both dimensions. Further additional image processing (e.g. filtering, lighting, darkening, removing noise, applying additional derivatives) may be applied to modify or optimize the image, as required per implementation.

Figure 17F:
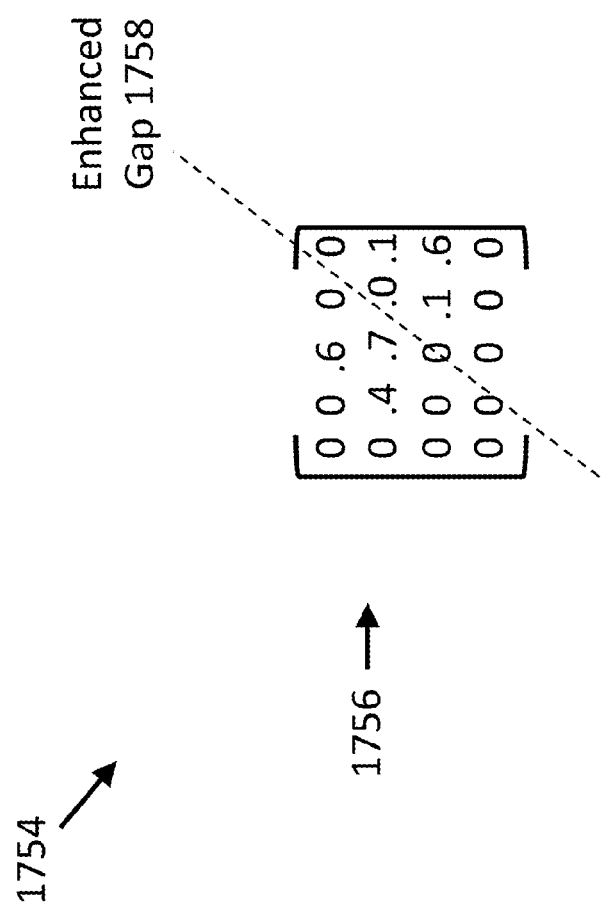

FIG. 17F illustrates an example image frame after derivatives filters are been applied. Notably, the image may appear enhanced or in higher resolution. For example, if the imaging targets are diffraction limited binary stars, the resultant image may feature an enhanced gap 1758 between the two stars. Though only two points (e.g. dots, stars) are manipulated here, one of ordinary skill in the art appreciates that the same techniques (e.g. convolving with a blade, and filtering using the above approaches) yields increased resolution when the objects being imaged are not two dots. For instance, more complex objects such as microorganisms may be imaged using the same techniques and approaches.

Figure 18B:
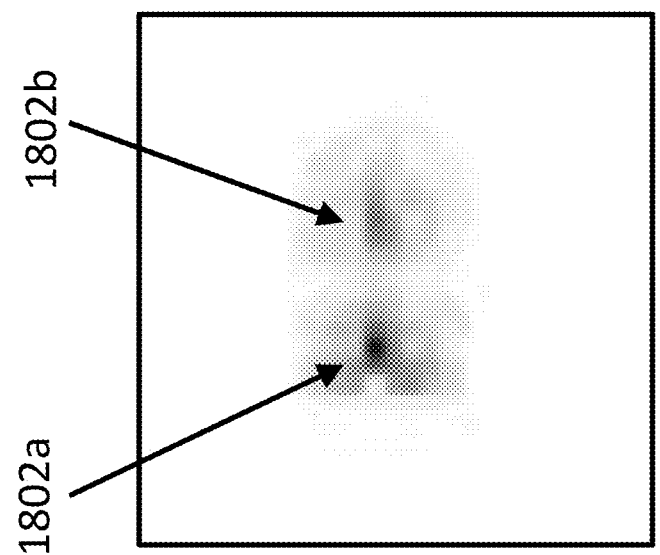
FIG. 18A-B illustrate an example input and output of the image processing approaches, as according to some embodiments.
Figure 18A:
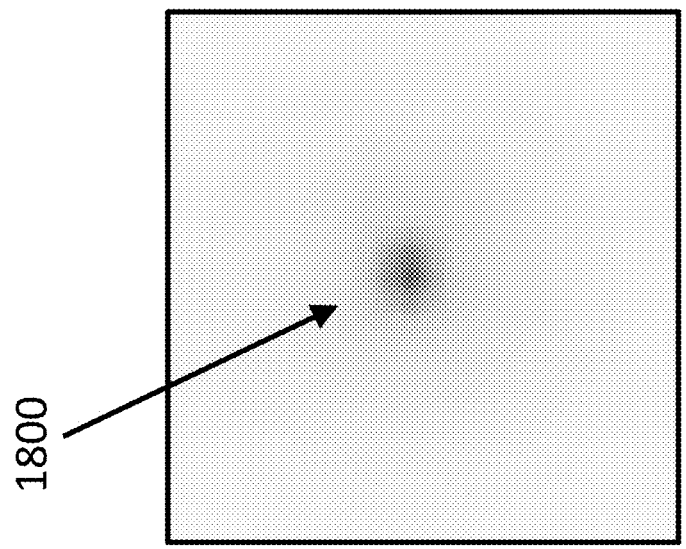

FIG. 18A-B illustrates two binary stars (e.g. two spots, dots, points) before and after the processing using approaches, such as those described above. In FIG. 18A, the combined image of the binary stars appears as one unresolvable spot 1800. As explained, due to the diffractive spreading, light from the two stars coalesces and mixes with one another. At some distance, the two stars cease appearing as two points and instead appear as one combined spot 1800. Conventional approaches, such as increasing the aperture of the telescope, may be used to "split" (e.g. resolve) the two spots. However, as explained these approaches can be very expensive and/or impractical: as the distance between the observer and the binary system increases (or, as in some cases in microscopy, as the distance between the two spots decreases), the sophistication, size, cost, and complexity of the lensing systems can quickly become impractical.

FIG. 18B shows the binary star system resolved using the above-disclosed approaches. There, a blade has been inserted into the light path from the binary star system (not depicted), and the resulting information was processed as described. The result are two distinct spots, 1802a and 1802b, which correspond to the physical binary star system. The example image in FIG. 18B has been further post processed by clipping (e.g. trimming) some of the resulting smear that the convolving processed produced. In some embodiments, the smearing may be reduced by changing the location of the blade to the imaging targets (e.g. putting the blade closer to the objects being imaged), increasing the number of increments the blade makes to pass the object (or inserting the blade in one continuous movement), increasing the number of captures per time interval (e.g. FPS), and/or reducing the amount of light radiating from the targeting objects (to increase the definition of the imaging objects, e.g. removing the glowing/saturation effects).

FIG. 19 illustrates an image block 1900 that has under gone image processing in a different order than as illustrated in FIG. 16. In particular, the flow FIG. 16 discloses first collapsing the imaging block 1900, then performing derivative filtering. In contrast, FIG. 19 illustrates performing derivative filtering, such as applying the vertical derivative filter 1902 and/or the horizontal derivative filter 1904 directly to the image block 1900, before a collapse. Depending on the parameters of the implementation (e.g. whether computational environment can support the heavier load of performing filtering on a image block instead of a 2-D image, or whether the implementation requires dynamic image manipulation of a dynamic video feed), it may be more appropriate to perform derivative filtering directly on the image block 1900, instead of first collapsing the image block.

FIG. 20 illustrates performing the collapse on the image block in different directions, than as illustrated in FIG. 17C.

As is known in the art, matrices can be rotated and collapsed in different directions. While FIG. 17C illustrates collapsing an image block out of the page (towards the viewer), one of ordinary skill in the art appreciates that collapses may occur in different directions. For instance, in FIG. 20, depending on the imaging objects and and implementation goals, it may be optimal to collapse in the vertical direction 2002 or from left-to-right 2004 (as opposed to from right-to-left, as illustrated in FIG. 17C). Rotations, as illustrated in FIG. 17B, may be used in concert with collapses in various directions to optimize the approach described FIG. 16, per implementation or environment.

Figure 21A:
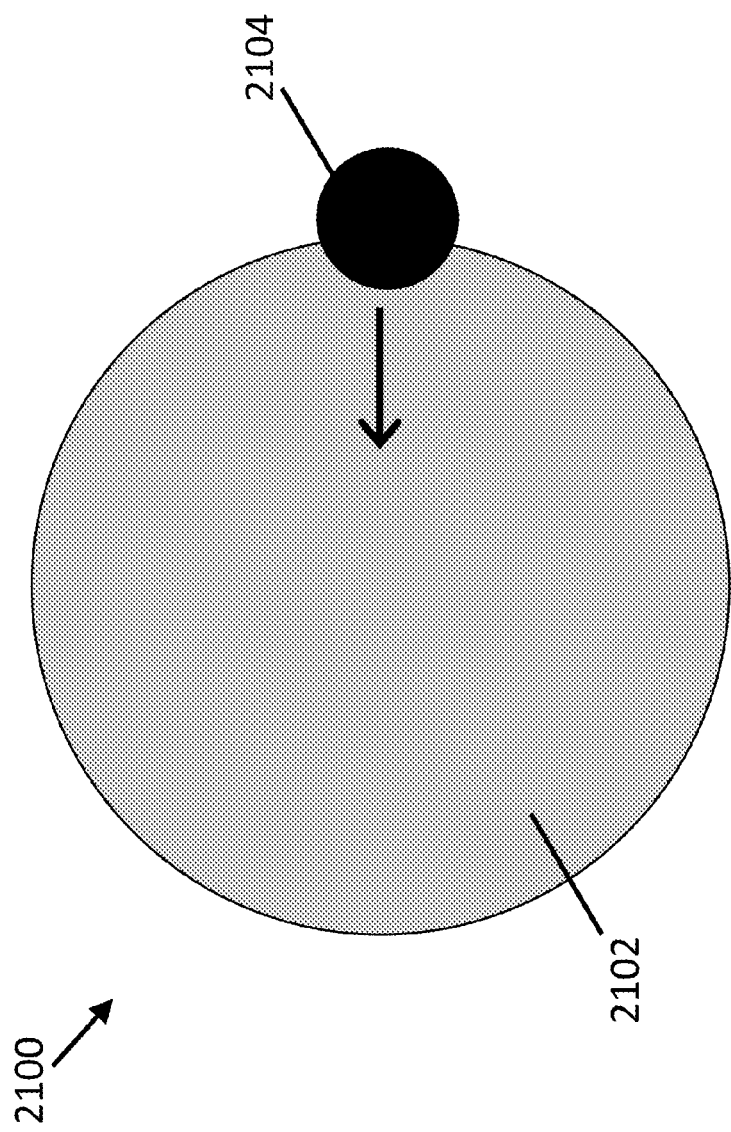

FIG. 21A illustrates imaging objects 2100 that may be imaged enhanced using the approaches disclosed herein. There, a small imaging object 2104 (e.g. a planet) orbits a larger imaging object 2102 (e.g. a host star). Generally, host stars are far more luminous than their orbiting planets. In such situations, it is typically extremely difficult to image the darker planets as they orbit around their host stars. One technique to detect such planets, the transit method, works by plotting the total amount of light emanating from the host star on a light curve (e.g. a 2-D plot with light intensity as a function of time) and then looking for dips in the light curve that occur when the planet transits (passes in front of) the host star. While this method can be used to detect far-away exo-planets, it produces only light curve plots, not richer image outputs.

The approaches discussed above can be used to generate a richer image output of transiting targeting objects, such as those shown in FIG. 21A. In particular, instead of using a blade (e.g. 140, 150), the transiting planet 2104 and/or the host star 2102 can be used as a blade. For instance, if the transiting planet 2104 is used as a blade, multiple images may first be captured as the transiting planet moves from darkness (outside the disk of the host star 2102), moves across the face of the host star 2102, and then moves back into darkness. Because, in this example, the blade (e.g. the transiting planet 2104) is much smaller than the object it is obscuring or convolving (e.g. the host star 2102), the resultant image output may not be as detailed as an image output when the blade completely blots out the imaging targets (See imaging output FIG. 18B); however, useful information and image details can still be generated applying the approaches discussed above (e.g. FIG. 16).

Figure 21B:
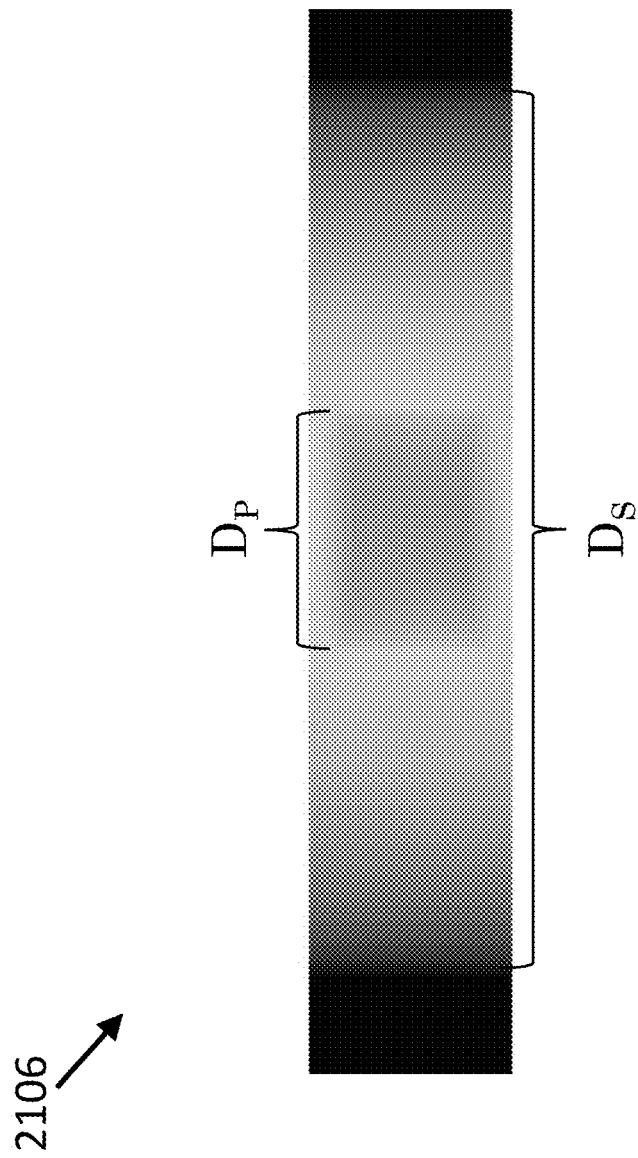

FIG. 21B illustrates an image output for the transiting objects 2100, as according to some embodiments. There, the image output 2106 is result of a rotation 1604 (with respect to T), collapse (see FIG. 17C), and normalization (see FIG. 17D), however no derivative filtering has been applied (see FIG. 17E). The vertical height (relative to the text orientation in FIG. 21B) of the image corresponds to how many frames (e.g. 1702-1712) were imaged as the planet transited the host star. From the resultant image 2106 information can be determined and/or output. In particular, for example, in resultant image 2106 "Dp" corresponds to the diameter of the planet 2104 and Ds corresponds to the diameter of the host star 2102.

FIG. 21C illustrates an image output for the transiting objects 2100, wherein a horizontal filter has been applied. There, the resultant image output 2108 is a result of a rotation 1604 (see FIG. 17B), collapse (see FIG. 17C), normalization (see FIG. 17D), and application of a horizontal derivative filter 1752 (see FIG. 17E). From the resultant image 2108 information can be determined and/or output. In particular, for example, in resultant image 2108 "Rp" corresponds to the radius of the planet 2104 and Ds corresponds to the radius of the host star 2102. Although the information such as the radius, or diameter are observable in FIG. 21B, as illustrated in FIG. 21C the information is more apparent due to the changes emphasized by the derivative filtering. For instance, the border of the host star is made more prominent by a light band 2140 (created by applying the derivative to the transition of the black background area to the light star area). Similarly, the border of the planet is made more prominent by light/dark bands 2142. The color/grayscale value of the bands (e.g. features) in FIG. 21C is based at least in part on the direction of derivative filtering applied, as discussed in more detail with reference to FIG. 21D.

Figure 21D:
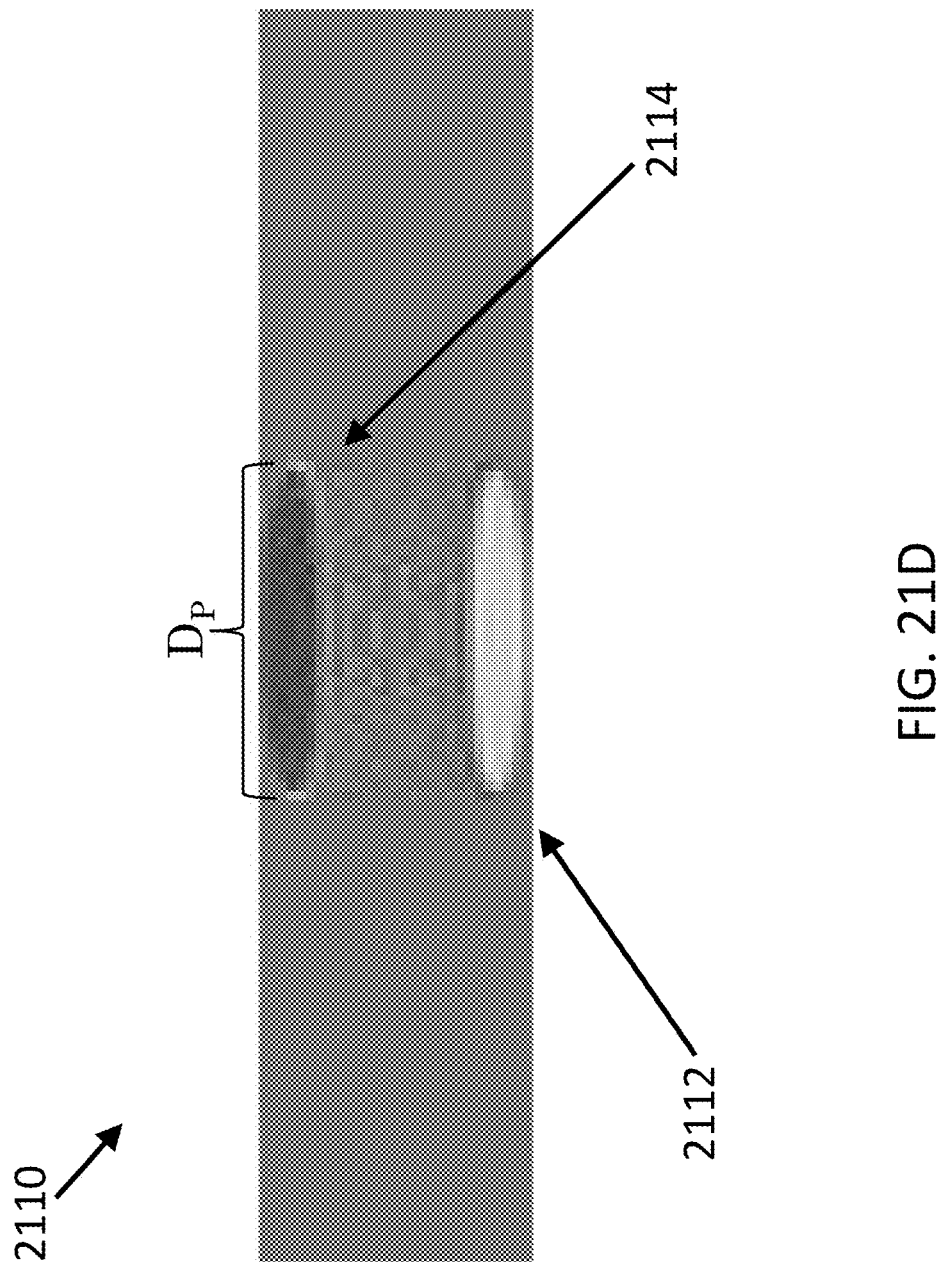

FIG. 21D illustrates an image output for the transiting objects 2100, wherein a vertical filter has been applied. There, the resultant image output 2110 is a result of a rotation 1604, collapse (see FIG. 17C), normalization (see FIG. 17D), and application of a vertical derivative filter 1750 (see FIG. 17E). From the resultant image 2110 information can be determined and/or output. In particular, for example, in resultant image 2108 "Dp" corresponds to the diameter of the planet 2104 (the diameter of the host star, Ds, has been removed by the vertical derivative filter because, as shown in FIG. 21B, there is little change in the image vertically with respect to the host star).

As mentioned the pixel values (e.g. color values, grayscale values) can yield useful information about the objects being imaged and their conditions. For instance, dark disk 2114 corresponds to the planet 2104 moving from complete darkness into "light" (obscuring part of the host star 2102). Similarly, light disk 2112 corresponds to the planet 2104 moving from the light-face of the star into darkness.

Figure 21E:
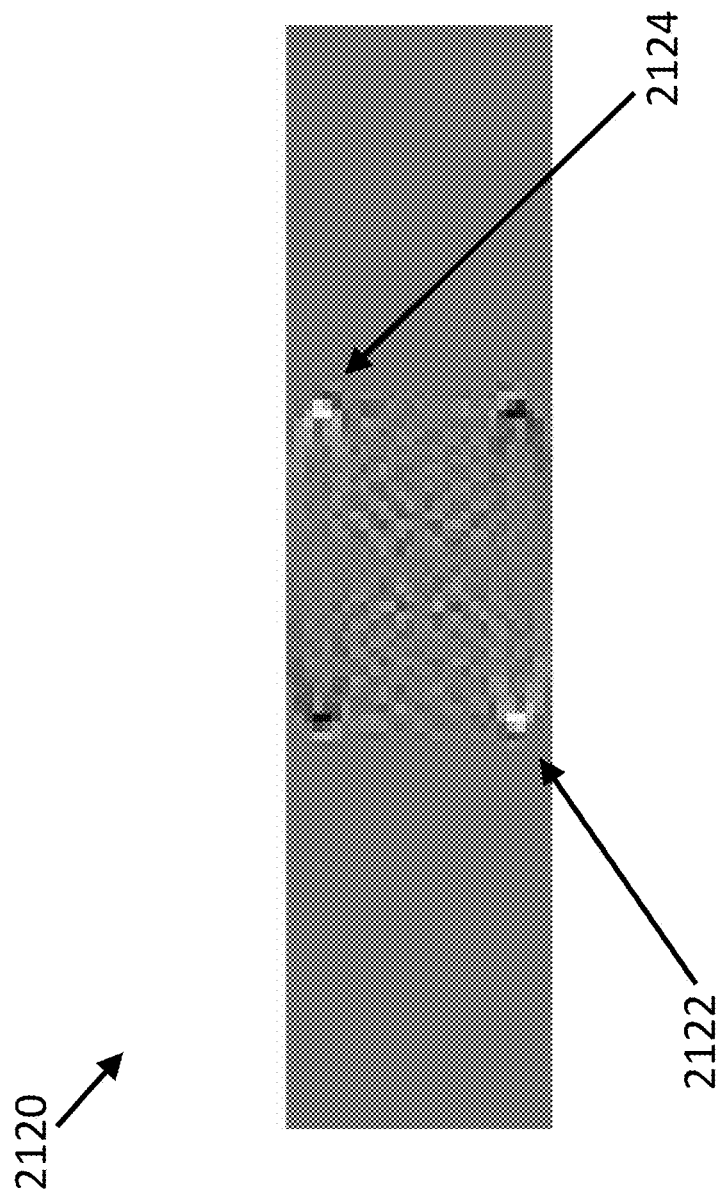

FIG. 21E illustrates an image output for the transiting objects 2100, wherein a vertical and horizontal filter has been applied. There, the resultant image output 2120 is a result of a rotation 1604 (see FIG. 17B), collapse (see FIG. 17C), normalization (see FIG. 17D), and application of a vertical derivative filter 1750 and horizontal derivative filter 1752 (see FIG. 17E). From the resultant image 2120 information can be determined and/or output. In particular, for example, in resultant image 2120 the diameter of the planet can be ascertained as explained above (e.g. the diameter corresponds to the width of the disks). Additionally, because both the horizontal and vertical derivatives are applied additional information can be extracted observing the pixel values of the disks 2122, 2124; such as, for example the characteristics of the planet (e.g. width as correlated to disk 2122 dimensions), and characteristics of the transit itself (e.g. time duration as correlated to the rate of change from dark to light pixels).

Figure 22:
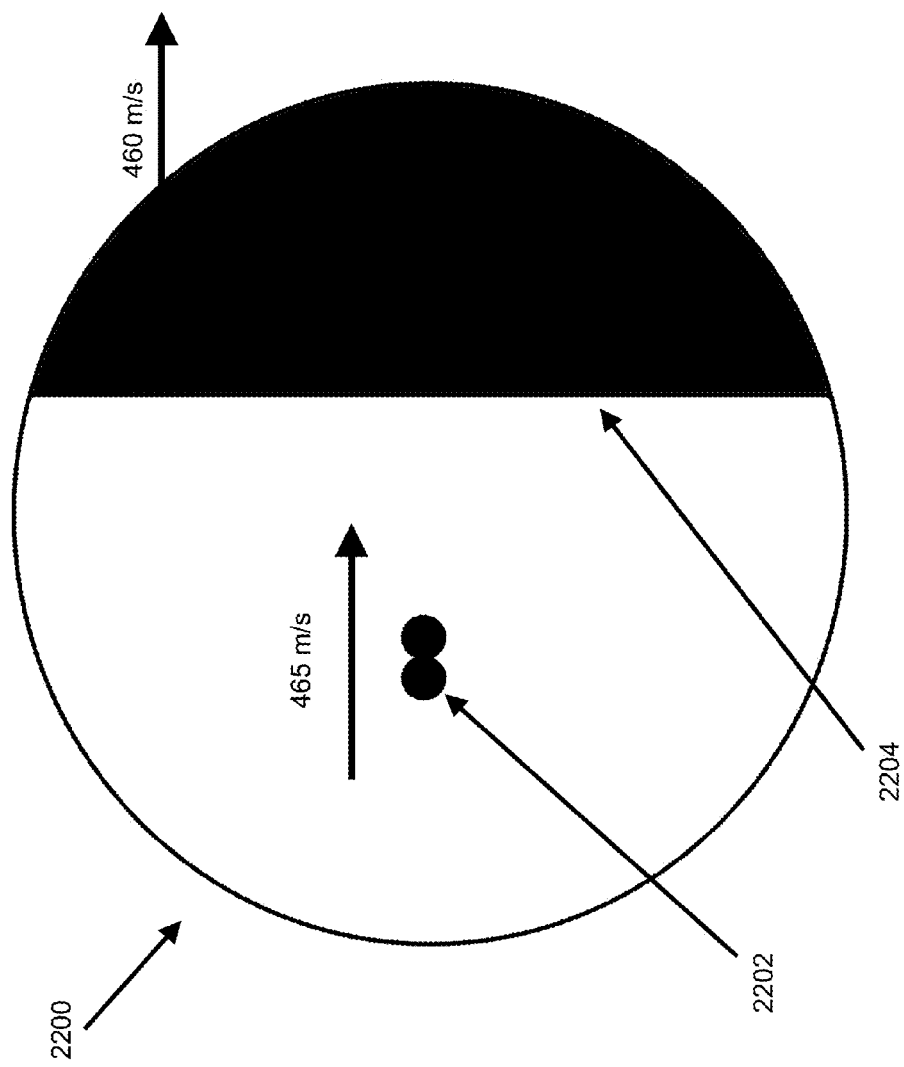
FIG. 22 illustrates an example implementation of actuating the blade at a modified rate in relation to the rotation of the coordinate system, as according to some embodiments.

FIG. 22 illustrates an approach for using a blade moving relative to the imaging target frame of reference in order to enhance imaging results, as according to some embodiments. There, an ocular view 2200 is illustrated comprising two imaging objects 2202 and a blade 2204. In this example, for clarification purposes, it can be assumed that the blade 2204 is mounted directly on telescope as a stationary blade (such that, in order to convolve imaging objects the telescope is pivoted/rotated, thereby moving the imaging objects into the blade, or the stars may be allowed to move into the blade due to Earth's rotation). As illustrated, the imaging objects 2202 can be two binary stars that move from left to right at the apparent speed of 465 m/s. As the Earth rotates, an observer on a night-side will observe the imaging objects move from the left portion of the side, through a celestial equatorial arc.

However, though the imaging objects 2202 appear to move slowly, under magnification in the ocular view 2200 they can move quite fast, staying in view for only a matter of seconds. As such, the imaging objects will convolve—going from visible to behind the blade—quickly. In this situation a camera imaging at 30 frames per second (FPS) may not capture enough frames or information of the convolution process and a "thin" image with little may result. One approach for enhancing the image is to increase the amount of frames per second (e.g. 210 FPS) as the imaging objects go behind the blade; thereby increasing the amount of information, detail, and/or "thickness" of the resultant image output.

In some embodiments, moving the blade system in relation to the imaging objects may be used increase the frames and/or information captured to generate enhanced result images. For instance, as illustrated in FIG. 22, the blade 2204 is moved along the same celestial East-to-West path as the imaging objects 2202 but at a reduced speed. In particular, while imaging targets 2202 move through the sky at an apparent speed of 465 m/s, the telescope system with the blade 2204 is tracking it at a speed that corresponds to 465 m/s, as relative to the imaging objects. As such, the imaging objects are tracked in a lagging manner (e.g. the imaging objects innate speed is used in concert with the blades speed to produce a combined convolved rate/speed). The objects will stay in the field-of-view of the oculus (e.g. 2200) longer, and will be observed as moving slowly toward the blade 2204. In this way, the speed at which the imaging objects 2202 can be slowed down and/or controlled. Thus, an imaging camera can yield more frames per convolution process and a enhanced resultant image can be generated.

FIG. 23A-K illustrate a blade convolving imaging objects in a grid of rows and columns, as according to some embodiments. There, two imaging objects (e.g. a binary star system) are illustrated in a field of view of an imaging device (not depicted). A blade 2304 convolves the imaging objects, in this example, from right to left in increments denoted by the column widths (e.g. $C_1, C_2, \ldots C_{10}$). In some embodiments, the resolution of the output (e.g. FIG. 18B) is a function of column width. That is, for example, the smaller the column widths or increments that the blades move forward may yield higher resolution outputs (assuming that for every increment forward an image frame is captured).

In some embodiments a frame capture balance exists per imaging sensor, if the cells (e.g. $R_1, C_0$ correspond to pixels. For instance, if a CCD sensor is 480 pixels wide (480 1-pixel wide columns), a blade may move in increments of 1-pixel (omitting dot-pitch distances). In such cases, multiple frames per increment may be captured, the resolution of the sensor may be increased, or the frames may be captured using analogue imaging methods and later converted into digital image data. In some embodiments, one column per increment is occluded using a blade consisting of liquid crystals or other mediums/mechanisms to occlude one column at a time. In some embodiments, in cases where the blade moves at increments smaller than a pixel width, an increase in resolution may still occur due to the wavelengths of light (which are far smaller than a pixel width) still diffracting around the blade and producing useful convolution data per pixel.

In some embodiments, for every increment/column the blade moves forward, the number of frames captured varies proportionally. For example, the blade can "move" faster than an imaging device captures: at C1, capture frame; at C2, no capture; at C3, capture frame, etc. This process, where the blade moves faster than the device may yield an image result output (e.g. FIG. 18B) of lower resolution (e.g. more errors in the image).

In some embodiments, the blade may move "slower" than the imaging device captures: at C1, capture two frames; at C2, capture two frames; at C3, capture two frames. This process, where the blade moves slower than the imaging device may yield image result outputs (e.g. FIG. 18B) that contain potentially more details (e.g. increased visibility of two distance objects split up), however the image may be distorted or smeared (e.g convolved) in the direction of the blade movement. For instance, the apparent lateral distance between the two imaging objects may be exaggerated.

In some embodiments, the blade may move in step with the imaging devices: at C1, capture one frame; at C2, capture one frame; at C3, capture one frame. This process, where the blade moves in step (e.g. unity) with the imaging device captures, may produce an accurate image result: the distance between two imaging objects corresponds to actual lateral distance between one another. In some embodiments, when the blade moves faster or slower than the capturing image device, post processing operations, such as compressing/expanding the image or using interpolation techniques, may be implemented to correct the image to proper dimensions and/or details.

Figure 23A:
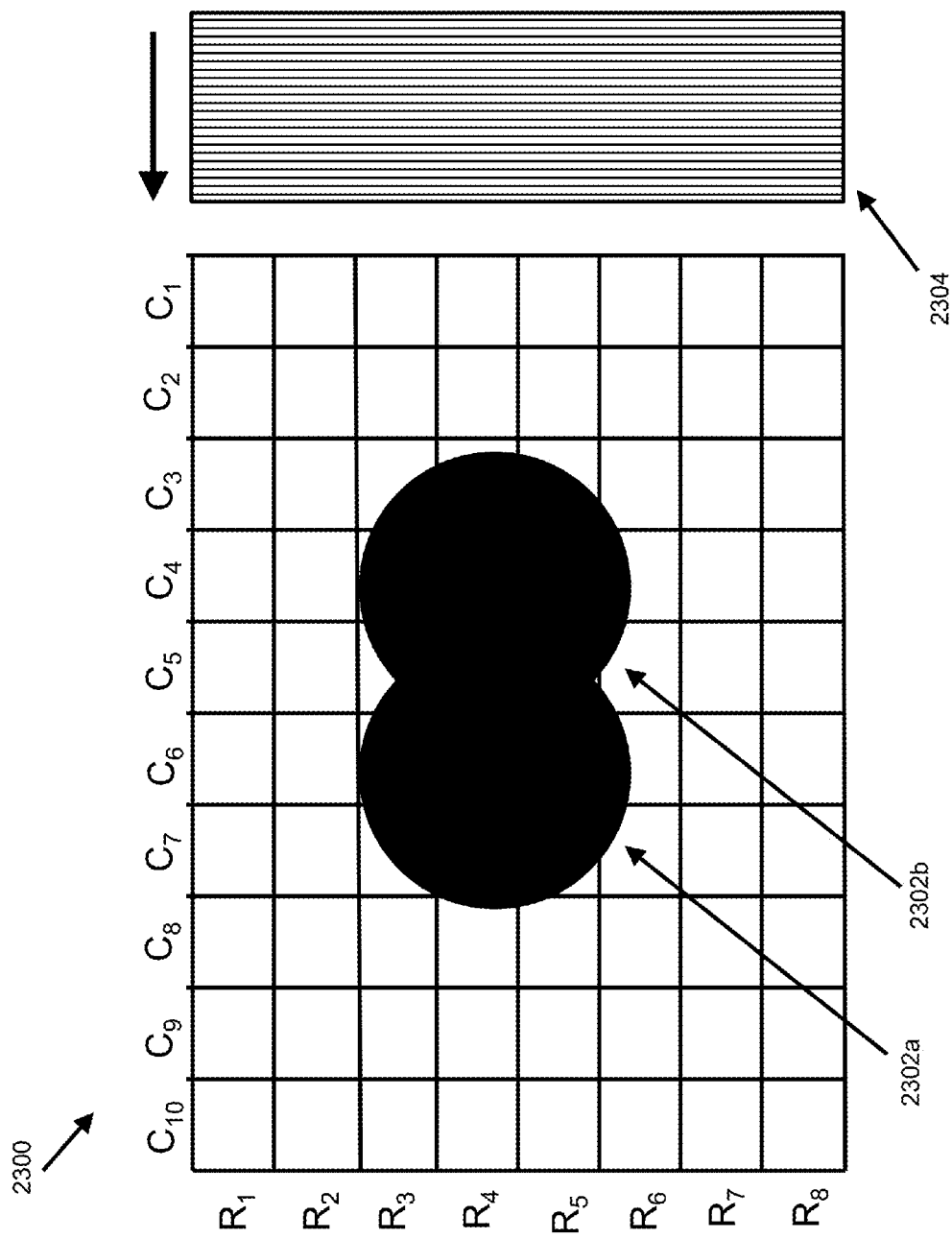
FIG. 23A-K illustrate an example implementation of a blade incrementing over two image objects with an illustrate reference grid as a background, as according to some embodiments.
Figure 23B:
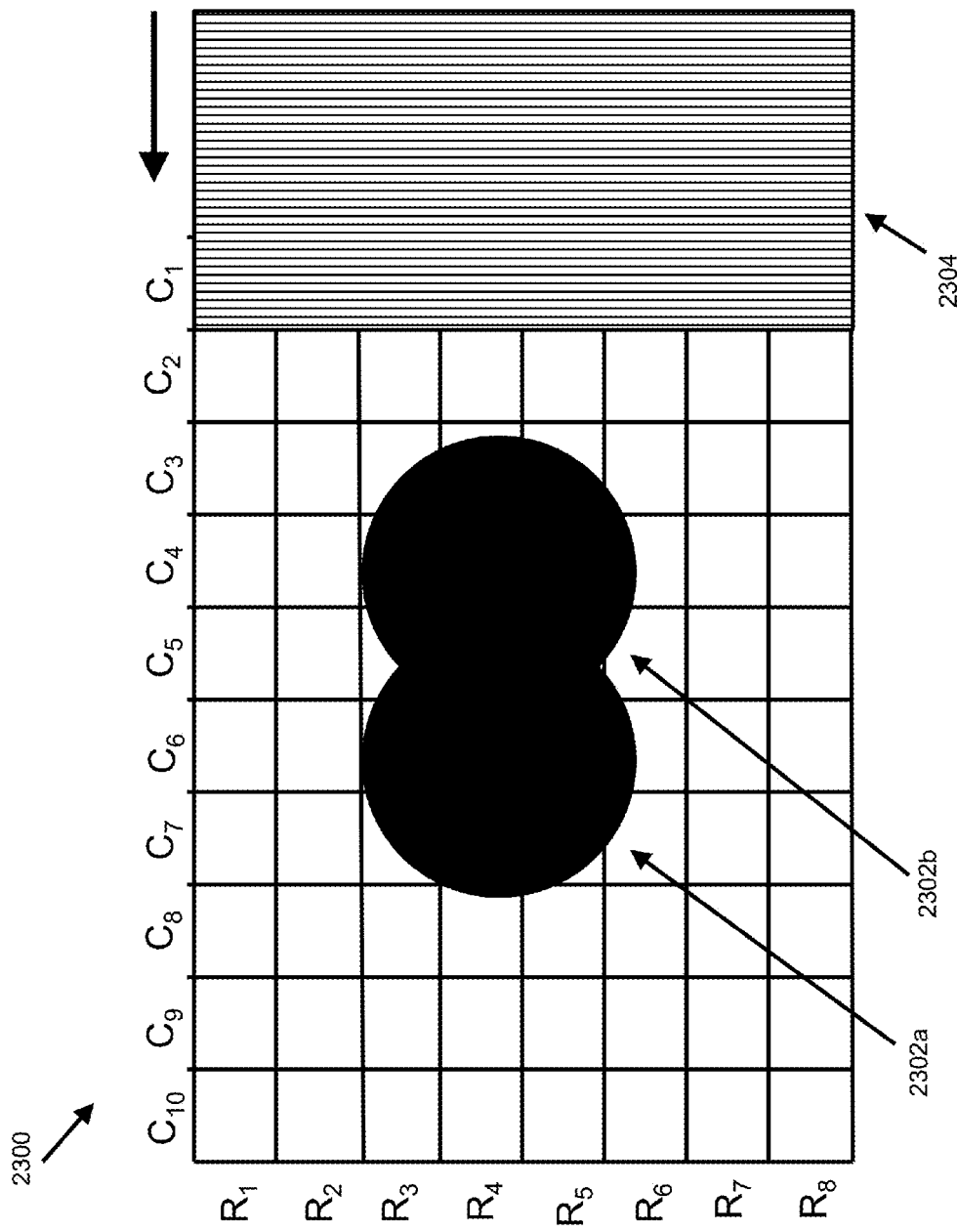
Figure 23C:
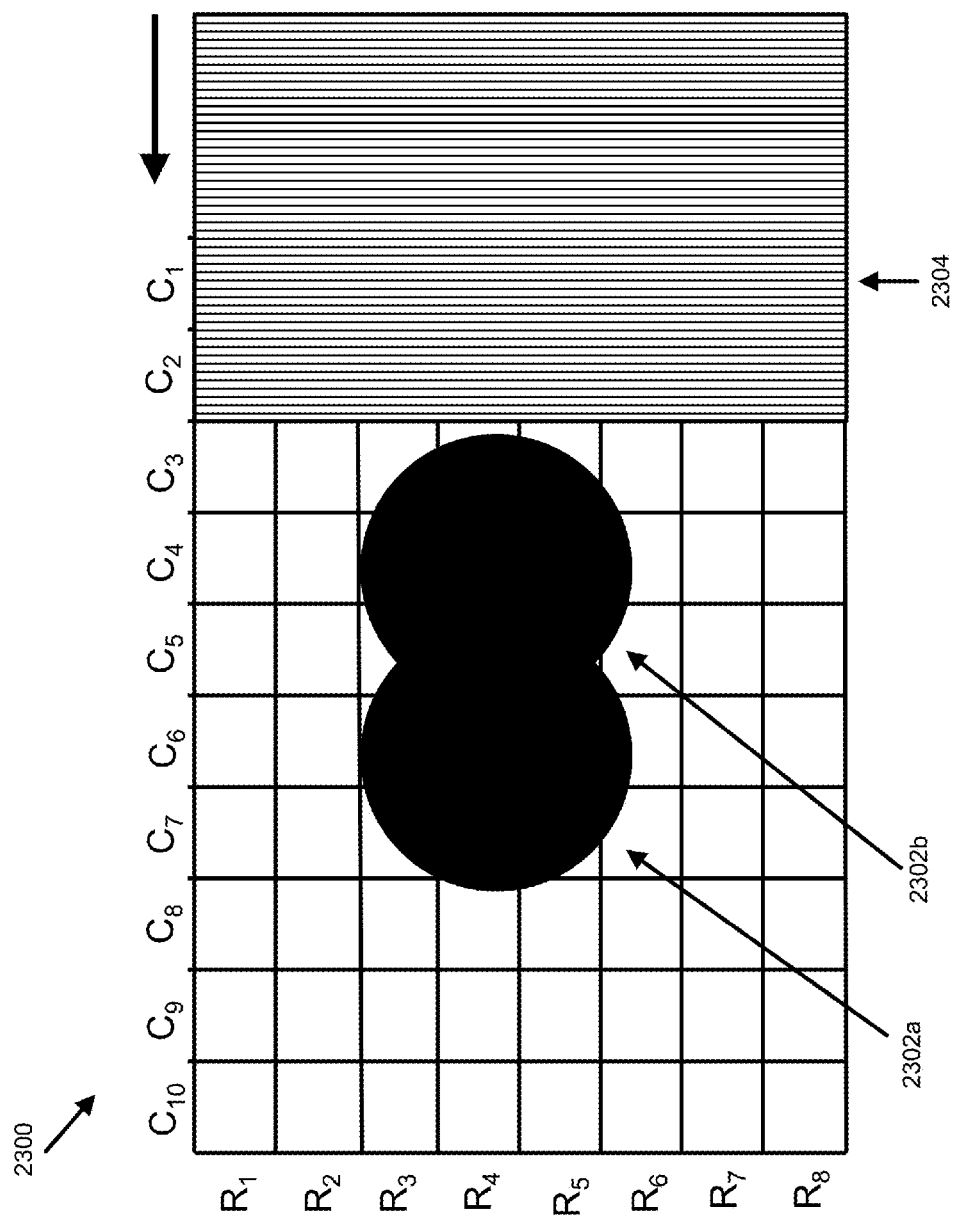
Figure 23D:
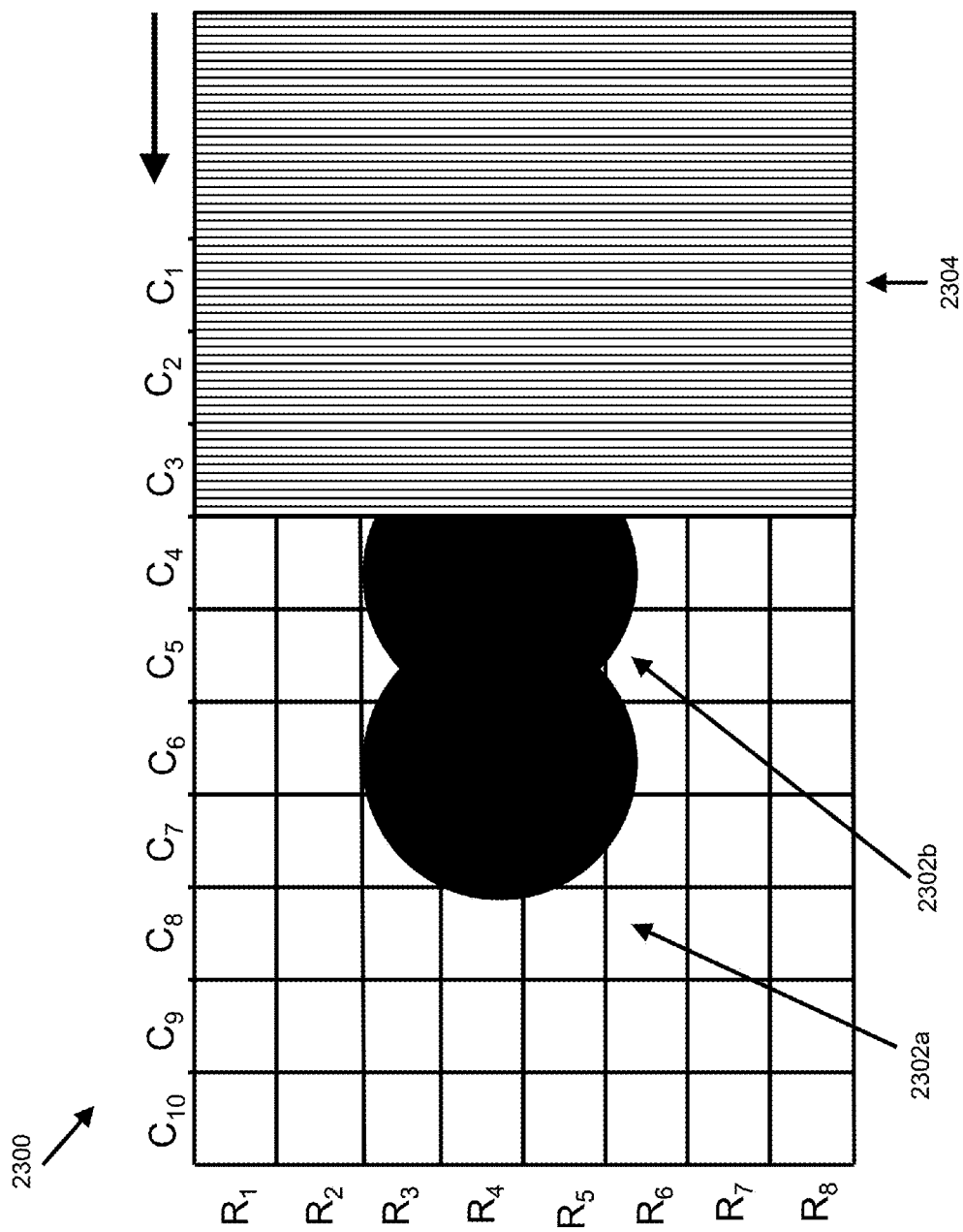
Figure 23E:
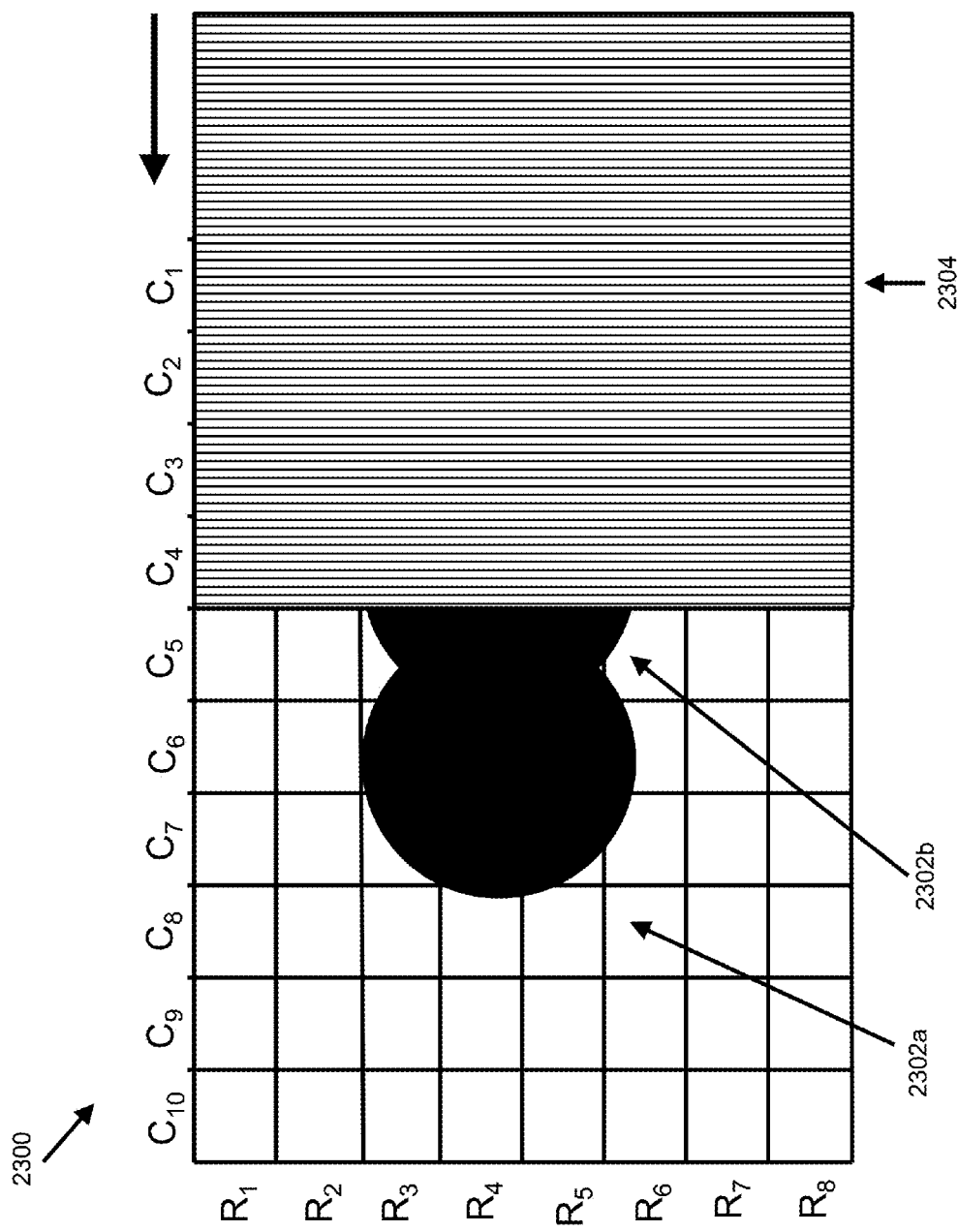
Figure 23F:
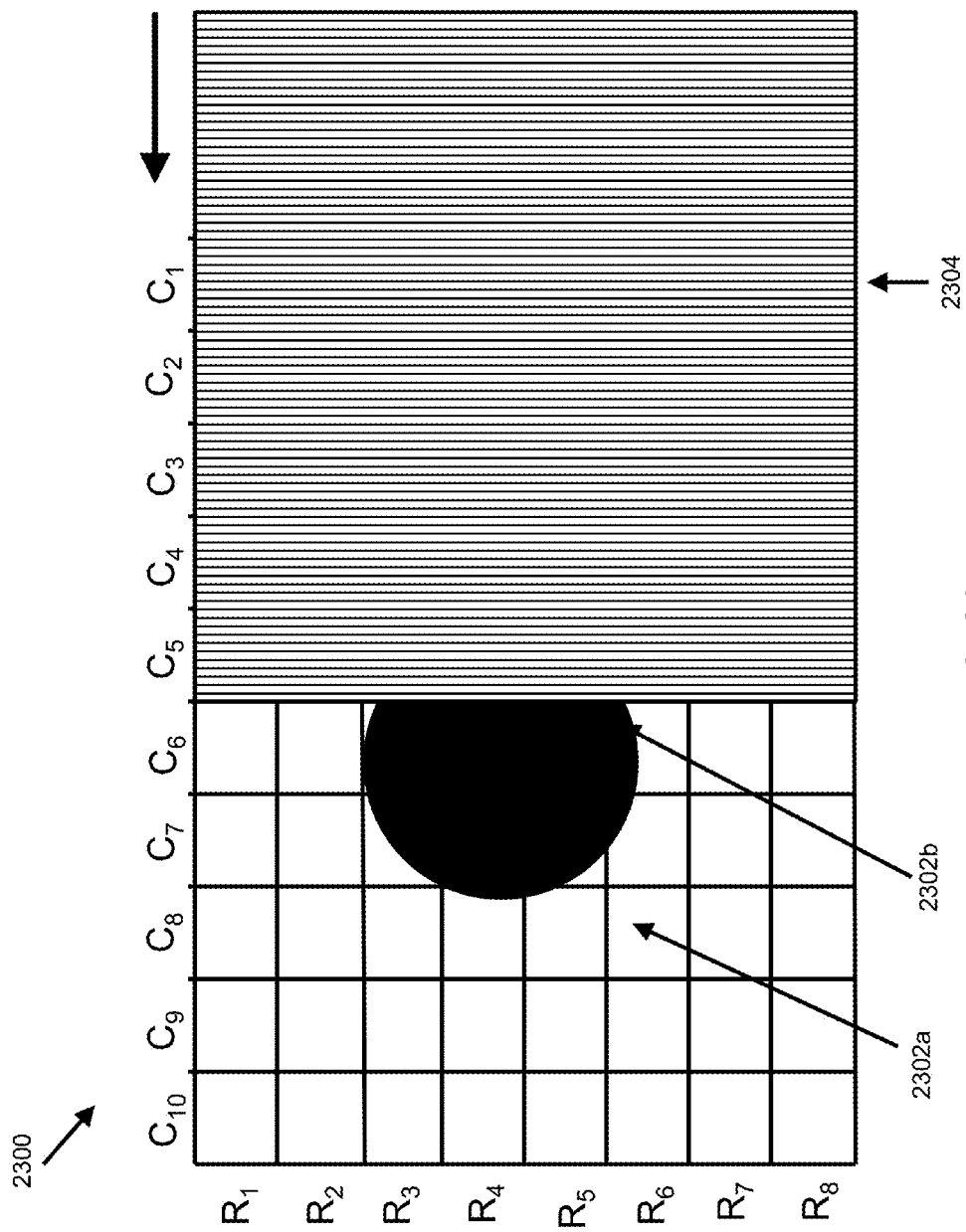
Figure 23G:
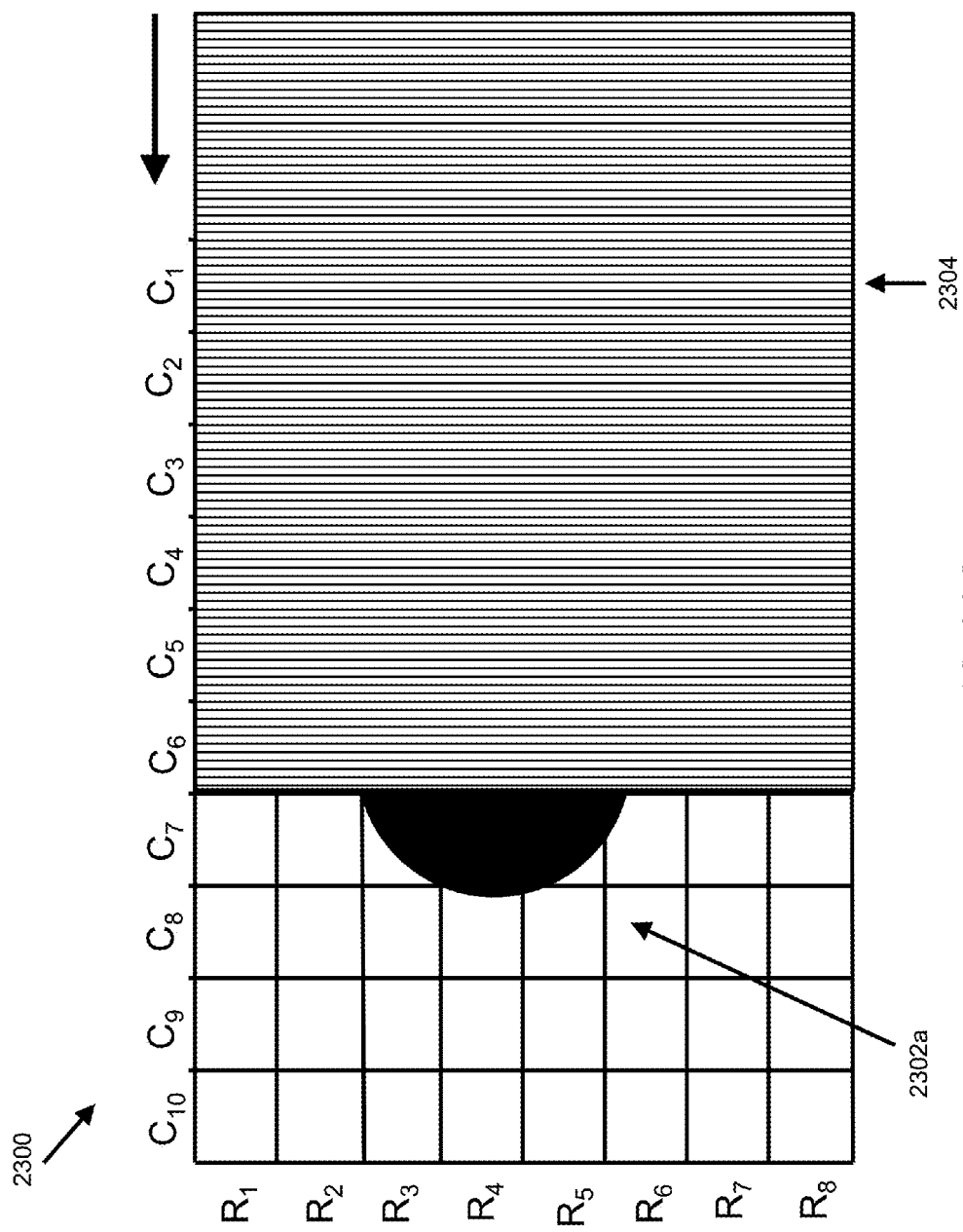
Figure 23H:
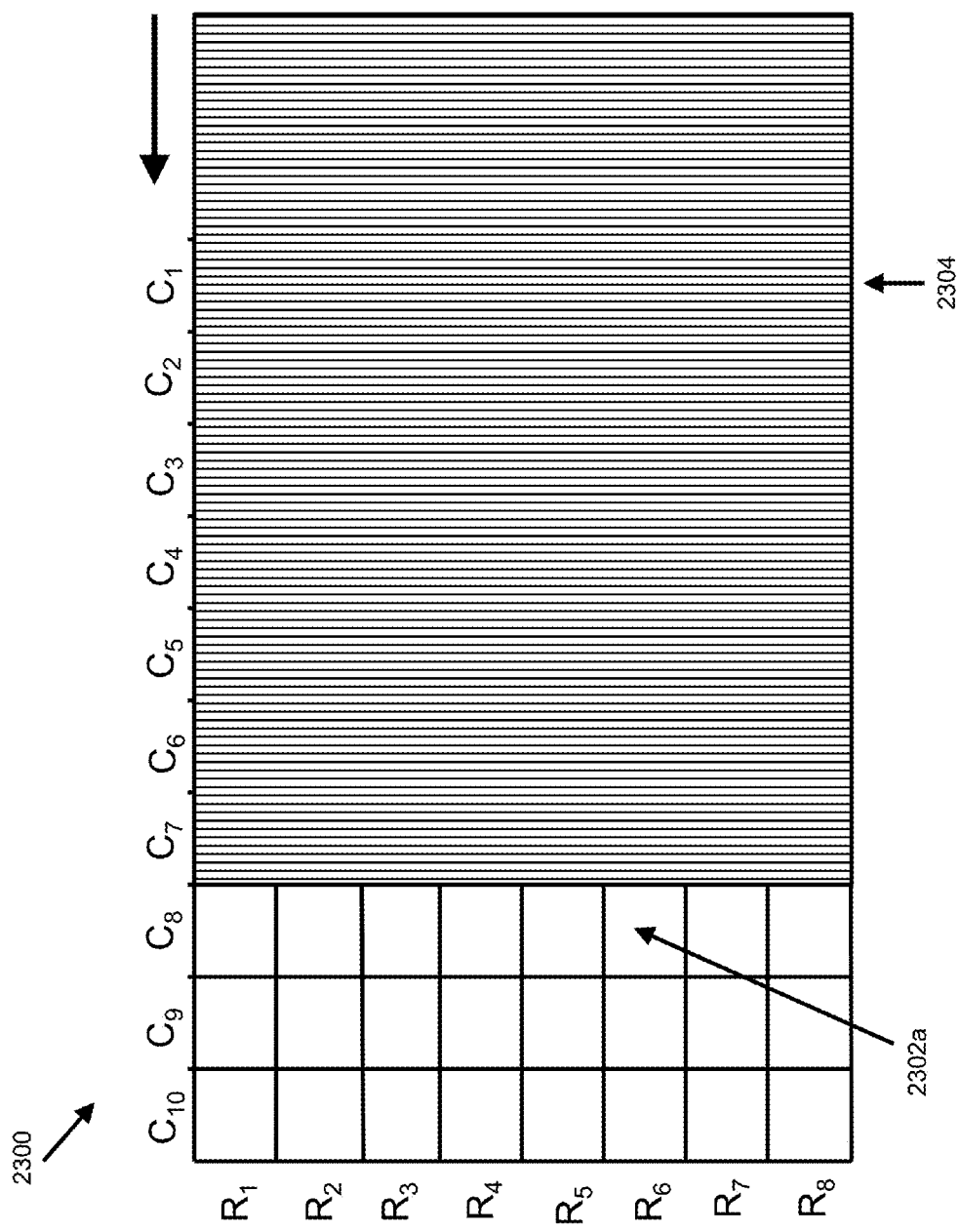
Figure 23I:
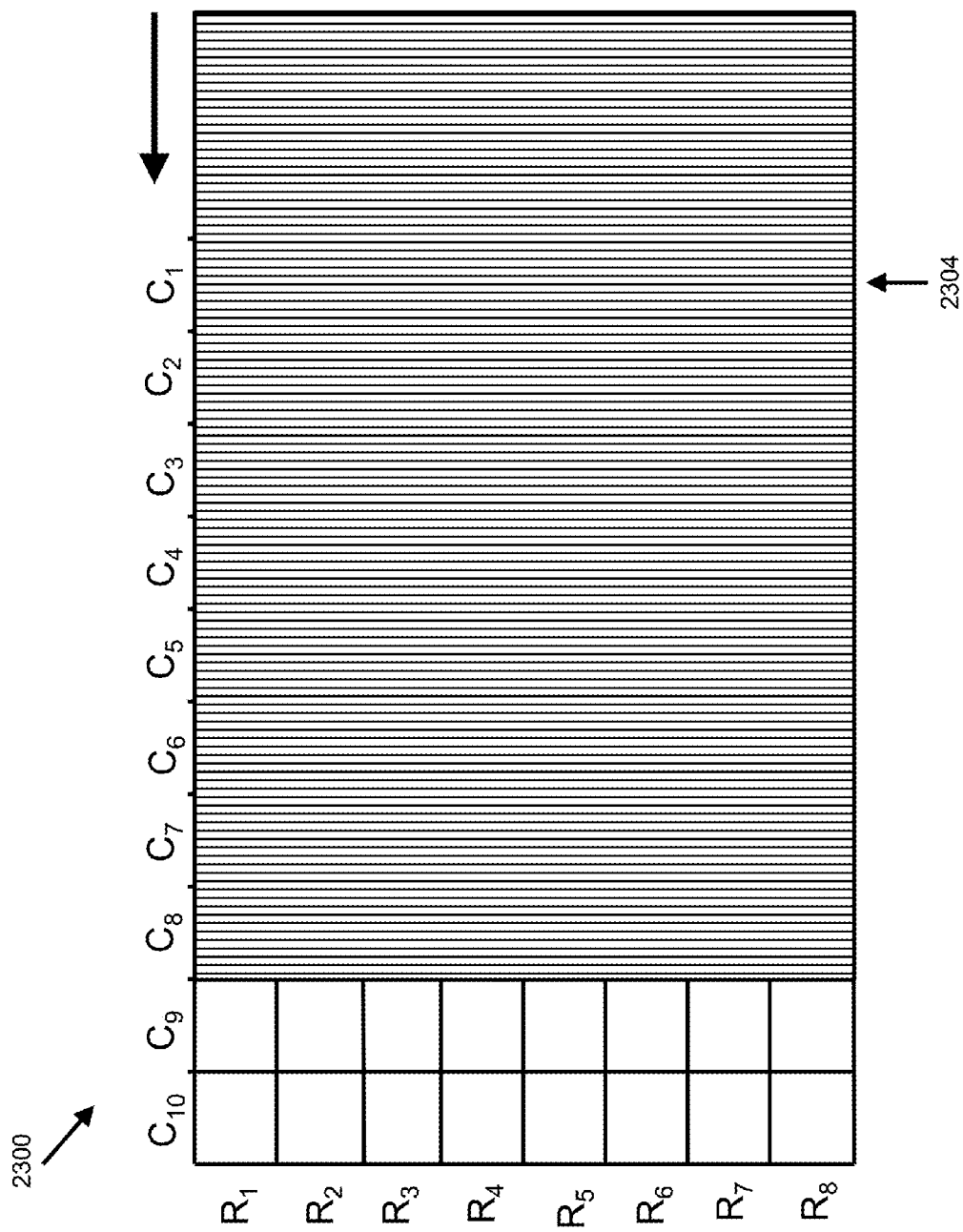
Figure 23J:
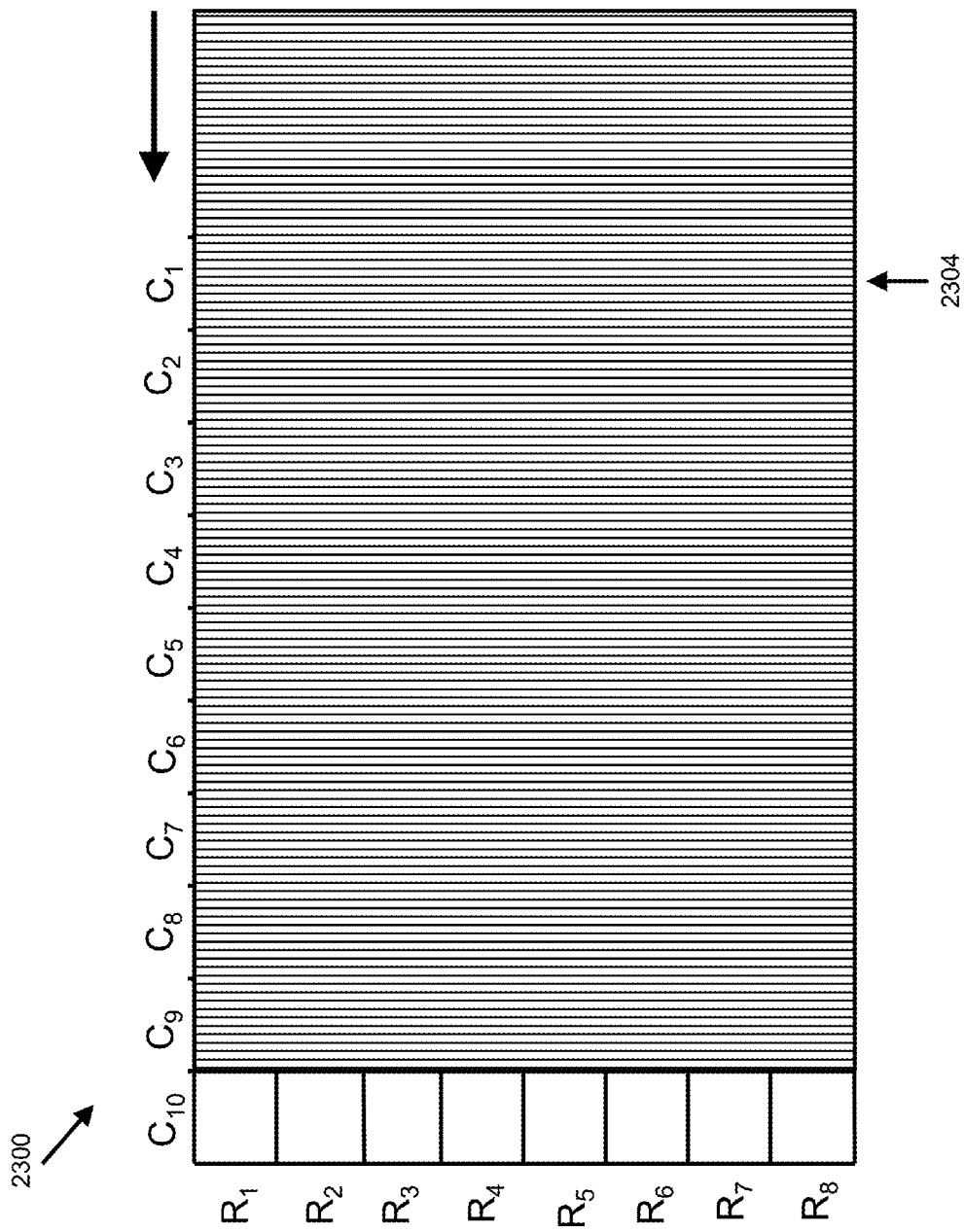
Figure 23K:
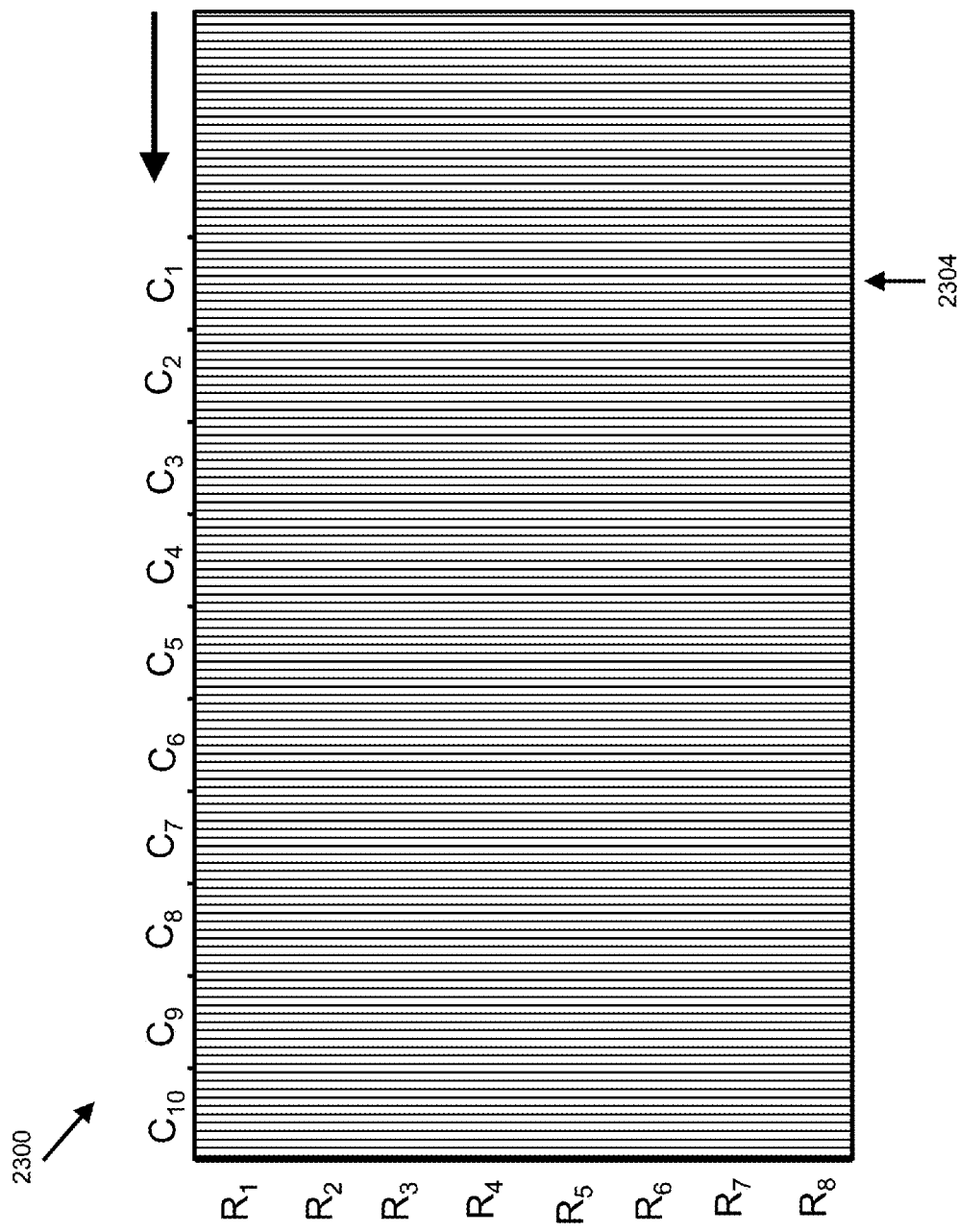

Referring to FIG. 23F, in some embodiments, one or more frames are captured when the blade 2304 is located at or near the center point between imaging objects (e.g. blade at C5, in FIG. 23F). In some embodiments, two or more frames are captured when the blade 2304 is located at or near the center point between imaging objects (e.g. blade at C5, in FIG. 23F) so as to increase the resolution (e.g. the objects split, see FIG. 18B).

In some embodiments, the angle at which the blade approaches (e.g. the blade's angle of attack) the imaging objects is orthogonal, as illustrated in FIG. 23A-K. In some embodiments, the imaging objects form an axis that is not orthogonal to the blade. For instance, if two binary stars have a 0 degree position angle and a stationary mounted blade is used, the blade's angle of attack will be parallel to the binary stars. In cases such as this, the blade may be adjusted and/or rotated so that the angle of attack is orthogonal or closer to orthogonal to the binary stars. In some embodiments, the blade's angle of attack will be at non-orthogonal angles (e.g. 45 degrees) to the imaging objects as the imaging is performed. In cases such as this, such as compressing/expanding the image or using interpolation, may be implemented to correct the image to proper dimensions and/or details, such as those that would result if the blade's angle of attack is orthogonal.

Generally, the more frames that are collected as a blade convolved the targeting objects, the less "thin" the resultant image output may be. In some embodiments, to increase the "thickness" (e.g. image height, in FIG. 21B) of the resultant image multiple frames per blade position may be captured. For instance, assume FIG. 23A-K corresponds to a sample sequence wherein one frame is captured per column increment moved forward. In this case the final result image block (e.g. 1718) will comprise ten frames: a first frame capture at C1, a second frame captured at C2, a third frame captured at C3, etc., to C10. After applying the approaches disclosed above (e.g. FIG. 16), the final result image will be 10 pixels wide; that is, the image result will be very thin. In cases such as this, more frames may be captured (e.g. higher FPS used in the imaging device) to increase the thickness, details, and/or resolution of the result image. For instance, if ten frames were taken per column increment (e.g. 10 frames captured at C1, 10 frames captured at C2) the resultant image will be 100 pixels wide (10 frames captured*10 columns).

In some embodiments a continuous smooth moving blade is implemented that does not move forward with discernable increments/movements. In cases such as this, the thickness, details, and/or resolution of the result image may be increased by increasing the FPS of the imaging device. For instance, if the imaging objects are two stars and the blade is a building (see FIG. 11B), increasing the FPS to 210 from 30 will result in an increase in resolution (after the processes such as those shown in FIG. 16 are applied).

Figure 24:
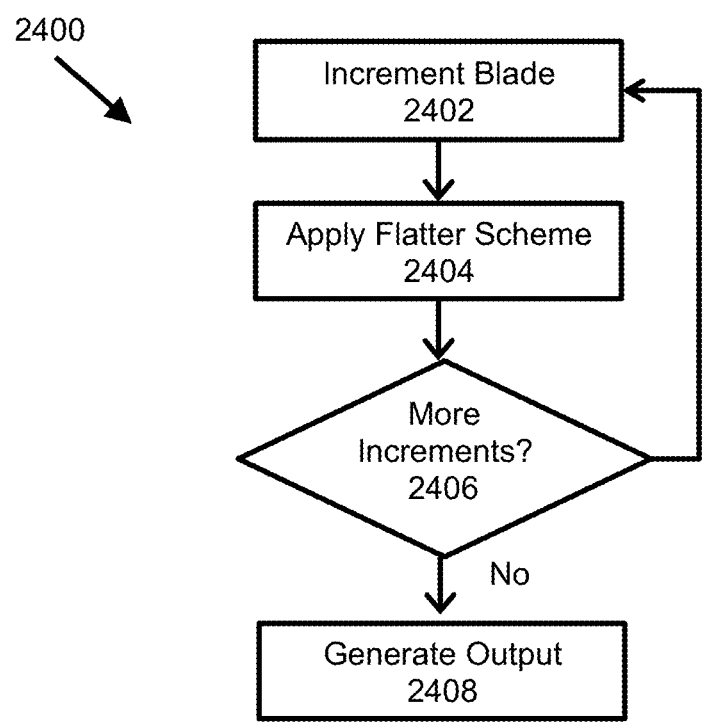
FIG. 24 shows a flowchart of an approach for a data manipulation scheme for generating enhanced images, as according to some embodiments.

FIG. 24 shows a flowchart 2400 for an approach for producing enhanced imaging, such as those in FIG. 18B, without operations such as matrix rotations and collapses, as according to some embodiments. FIG. 24 is a high-level view of multiple approaches that may use flat-based schemes (e.g. algorithms). For instance, instead of collecting one or more images into an image block, collapsing, rotating and filtering (e.g. as illustrated in FIG. 16), the approaches below enable direct data manipulations of the frames, as according to some embodiments.

Generally, at 2402 the blade is incremented forward. For instance, in FIG. 23C the blade 2304 is incremented forward into the C3 column. The result is FIG. 23D where the blade 2304 obfuscates the C3 column. Though the blade is illustrated moving in discrete increments, one of ordinary skill in the art appreciates that the blade may move in continuous movements as well. In that case the increment captures may correspond to the frame capture rate of the imaging device. That is, instead of: increment blade, capture frame, increment blade, capture frame; the process may comprise: move blade forward continuously, capture multiple instances of frames per unit time (e.g. FPS). However for the sake of simplicity in this example, in FIG. 24 every increment forward by the blade is followed by one frame capture by the imaging device. Thus, at 2402 the blade moves forward one increment (e.g. over the C3 column) and one frame of the imaging objects is captured.

At 2404 an approach based at least in part on a flat-based scheme is applied. In some embodiments, the term flat or flatter connotes that data manipulations are performed directly on the images as they are captured (or in post-processing) without waiting to accumulate an image block (e.g. 1718), as according to some embodiments. In some embodiments, the term flat may be treated dimensionally. For instance, if the the result image is in n dimensions, the flat process may result in an image output in n dimensions without accessing or manipulating operations in n+1 dimensions. For example, an image (e.g. FIG. 18A) is in two dimensions (e.g. X and Y), thus n=2. Using a flat process (e.g. flat-ased scheme) a result image can be generated (e.g. FIG. 18B) without using an image block, which is in three dimensions (e.g. n=3; X, Y, and T (time)). The result of the flat-based scheme generates information about what was in the column just incremented over. That is, for example, as the C3 column was incremented over, the flat-based scheme at this point generates information and image detail for what will be in the C3 column of the final result image. These intermediate results may be stored in a database as the process continues, as according to some embodiments.

At 2406, the imaging system determines whether there are more increments to move through. Applied to the series depicted in FIG. 23A-K, since the C3 column was just obfuscated and C4-C10 remain, the determination at 2406 is that there are move increments to move through. Thus the process may loop to 2402 where the blade may be incremented, imaged, processed using a flat-based scheme, and looped again accordingly. If there are no more increments to move through, then the process may continue to 2408. For example, once the blade increments to C10, an image is captured, and/or a flat-based scheme is applied, a final image may be generated using the information generated for each increment/column (that was stored at each step).

FIG. 25 shows a flowchart for an approach using a baseline comparison (e.g. baseline comparator) scheme for generating enhanced imaging, as according to some embodiments. At 2502 a baseline data result is generated. In some embodiments a baseline result can be generated using the approach shown in FIG. 16 but where the imaging target is a single star (e.g. point, dot). For example, in FIG. 23B only one star 2560 is visible. Applying the process shown in FIG. 16 to the imaging object 2560 in FIG. 23B will still result in a single point image output, such as those illustrated in FIG. 2B, or FIG. 18A. In some embodiments, the baseline result is generated and stored as a data structure for later use/analysis.

At 2504, the blade is incremented. For example, in FIG. 23C the blade 2304 can be incremented over the C3 column; the result is shown in FIG. 24D where the C4 column is obfuscated by the blade. Once the blade has incremented a frame may be captured (as explained above, though one frame capture per increment is used here for simplicity, multiple captures and/or continuous blades can be implemented).

At 2506 the difference between the C3 column in the baseline (single-star) result is compared to the C3 column of the capture currently underway (e.g. the imaging process of double-stars 2302a and 2302b). At 2308 if the pixel values (e.g. a pixel located at Row 1, Column 3) of the current capture are the same as the pixel values in the baseline image, then no change is made to the pixel values of the current capture at 2512. However, if the pixel values of the current capture are different (as evidenced by such processes as subtraction, or comparing the pixel values for changes/difference) than the pixel values of the current capture, then deductions may be made to the C3 column of the current capture. After the deductions are made, the column's values may be stored as a result column data structure.

At 2514 a determination is made whether there are more columns to increment through. If there are, then the process loops to 2504 where the blade is incremented and the process repeats. Once there are no more increments to be made, then at 2516 a result is generated. In some embodiments, a result may be generated by retrieving the result columns and using them to create a composite image.

As an example of this process, assume, as above, the C3 column is incremented over. The determination/adjustment process may proceed as follows (where Rows and Columns are referred in short: "R1, C1"=row 1, column 1). Is R1, C3 in the current capture (see FIG. 23C) different from R1, C3 of the baseline (see FIG. 25B). Analyzing R1, C3 of FIG. 23C and R1, C3 of FIG. 25B it is determined they are the same. Thus, at 2512 no change occurs to that pixel value. The same process is repeated for other pixels in the column: is R2, C3 of FIG. 23C the same as R2, C3 of FIG. 25B, etc. The result of the example analysis at 2508 for the C3 column is that the entire C3 column of FIG. 23C is the same as FIG. 25B; accordingly, no changes are made (e.g. 2512).

However, if there are changes between the baseline data and the current capture data deductions may be made. For example, if the blade is incremented over the C5 column there is a difference between the C5 areas (e.g. pixels) in the baseline image data (e.g. FIG. 25B) and current capture (e.g. FIG. 23E to FIG. 23F). In particular, for example, the R3, C5 pixel in FIG. 23E is different than the R3, C5 pixel in FIG. 25B because some light from the second object 2302a is visible to R3, C5 in FIG. 23E, but missing from R3,C5 in FIG. 25B (as FIG. 25B does not contain a second imaging object). In some embodiments the two pixel values (imaging areas) can be subtracted to determine the difference. The difference, or a value proportional to the difference may then be deducted from the R3, C5 pixel value in FIG. 23E and the result stored as a new result column C5' with modified values. Once the process is complete (there are no more iterations and all result column data has been generated), the result column data items can be combined (e.g. added, placed side-by-side) to form a new composite image (e.g. FIG. 18B).

Figure 25A:
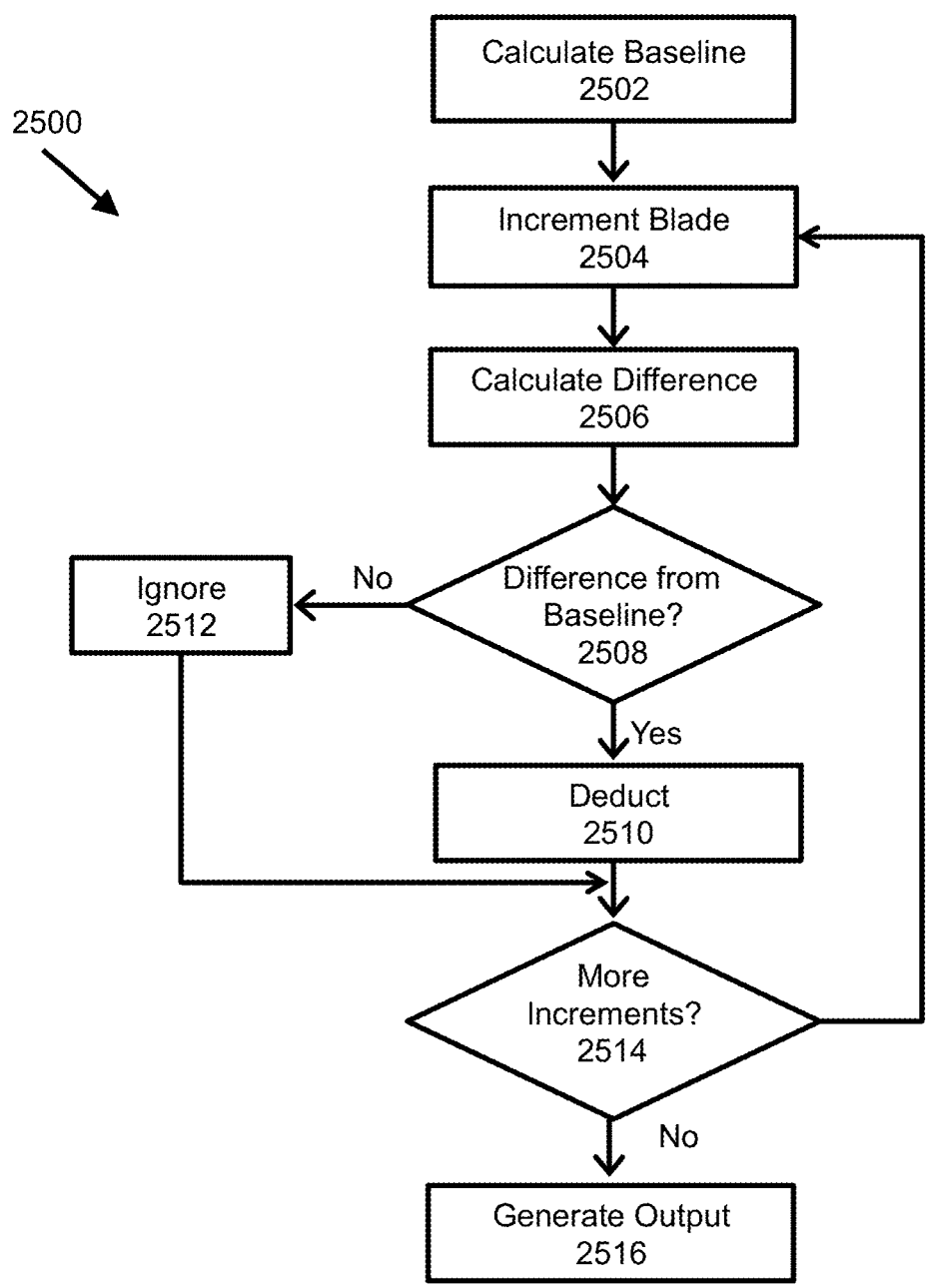
FIG. 25A show a flowchart of an approach for a data manipulation scheme for generating enhanced images, as according to some embodiments.
Figure 25B:
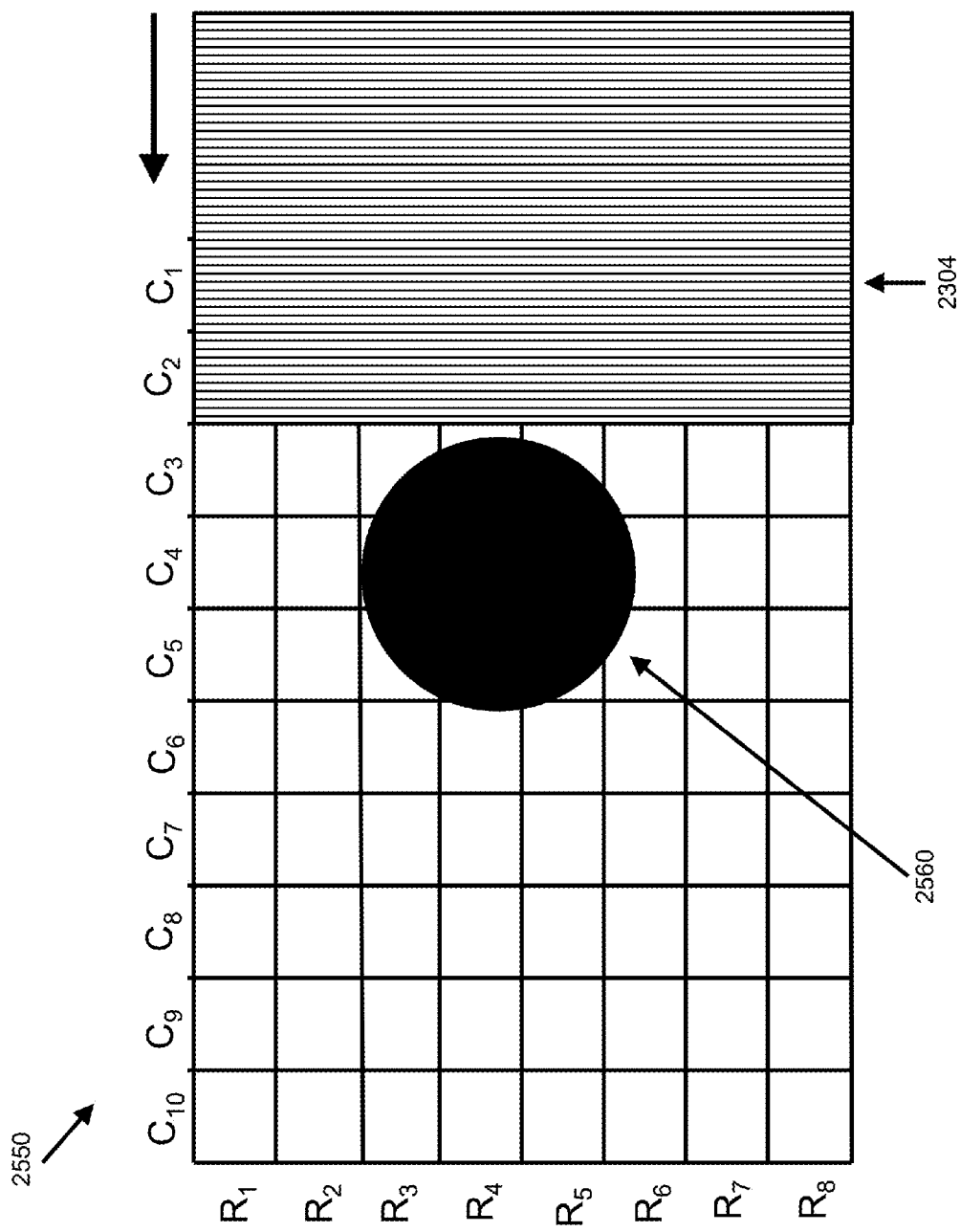
FIG. 25B show an illustration of an approach for a data manipulation scheme for generating enhanced images, as according to some embodiments.

As one of ordinary skill in the art appreciates, of the approach shown in FIG. 25A can be varied or customized. For instance the baseline image in FIG. 25B assumes that the objects in the baseline image and current capture are aligned (e.g. 2560 in FIG. 25B is aligned with 2302b in FIG. 23E). Additionally, object 2560 and FIG. 2302b are of the same size. Additionally, object 2560 and object 2302b radiate light the same amount (e.g. denoted in the figures by the sharp transition from black to white at the stars border, in other words, they shine the same amount). Accordingly, per implementation and/or objects being imaged in the current capture process, the baseline data may be adjusted to yield a more enhanced image. For example, the baseline object's size may be increased, its radiation flux/shine values may be adjusted to be more or less luminous, and/or its alignment with respect to the frame being captured (e.g. 2300) can adjusted. Additionally, the amount of deduction per change detected can be modified per implementation. In some embodiments the difference between R3/C5 in FIGS. 23E and 25B may be determined and used directly to modify the values of the current capture R3/C5. In some embodiments the number detected may be a function (e.g. proportional) of the difference detected.

In some embodiments, no baseline image may be implemented; instead the flat-based scheme may comprise examining row data (e.g. the pixel values of row 3, in FIG. 23A) after the blade as incremented through the frame (e.g. from C1 to C10). From the analysis, it can be determined whether the row data corresponds to single star 1-dimensional plot (e.g. which would appear similar to FIG. 2A) or a double star plot (e.g. which may appear similar to FIG. 2C). In other words, the row data is examined to determine if the row data before the capture is different than the row data after the capture. For example, before the capture process R3, C5 in FIG. 23A may appear as completely filled by the combined output/shine from 2302a and 2302b. However, because the blade 2304 physically occludes part of 2302b as shown in FIG. 23E, the value of R3/C5 will be different than that of the R3/C5 value in FIG. 23A. As such, the difference can be analyzed and an appropriate modification (e.g. deduction) can be made to the R3/C5 pixel value. The modified pixel values may then be store as column result data and combined to generate a composite image, as explained above.

Figure 26:
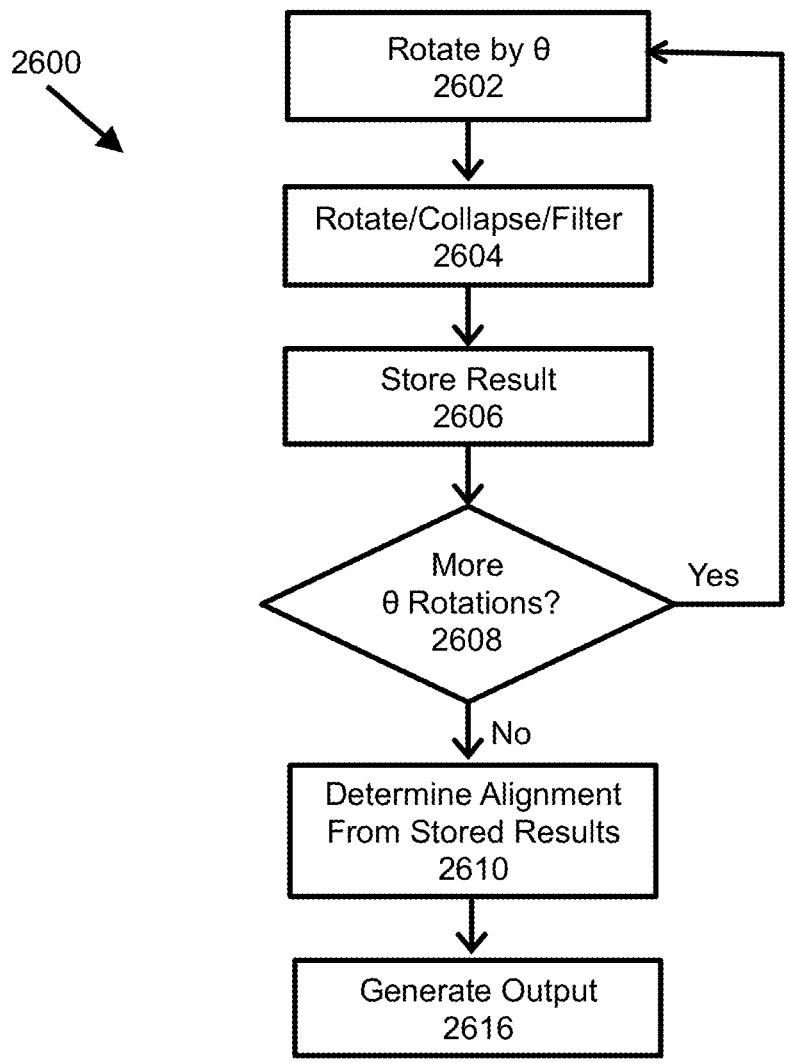
FIG. 26 shows a flowchart of an approach for rotating the blade to find alignments, as according to some embodiments.

FIG. 26 shows an flowchart for an approach for determining the position, orientation, and/or alignment of objects being imaged, as according to some embodiments. At 2602 the imaging system is rotated by θ degrees. For example, referring to FIG. 23A, assume that the blade 2304 and imaging objects 2302a and 2302b are orthogonal to one another (e.g. an axis through the centers of 2302a and 2302b forms a right angle with the edge of the blade 2304). The orthogonal orientation can be assigned as 0 degrees. Then at 2602 the blade is rotated by some amount, such as one degree, so that there is a one-degree angle between an axis through the objects (2302a and 2302b) and blade 2304.

At 2604 an approach such as the sequence illustrated in FIG. 16 may be applied. That is, the blade is moved through the line of sight to the imaging objects as the imaging device captures one or more image frames; the resulting image block is rotated, collapsed, and filtered to output a result image, such as the one illustrated in FIG. 18B. At 2606, the result image may be stored as data for later analysis. At 2608 a determination is made whether there are more rotations to be made. In some embodiments, there are more rotations if the blade system has not rotated 360 degrees. In some embodiments, there are more rotations to be made if the blade system has not rotated to 90 degrees, 180 degrees, or other amounts. Assuming in this example, there are more rotations if the blade has not rotated to 90 degrees (relative to the axis through 2302a and 2302b), then the flow loops to 2602 where the next rotation is made. For example, in the first iteration the blade orthogonal to the imaging objects, the imaging process (e.g. FIG. 16) is performed on the orthogonal blade and the image result is stored; in the second iteration the blade is rotated by one degree, the imaging process is performed, and the image result is stored; in the third iteration the blade is rotated by another degree so that it forms a two-degree angle with the axis through the objects, the imaging process is performed, and the image result is stored; and the process continues to the desired or selected rotation limit: here 90 degrees.

At 2610 the stored images are analyzed to determine imaging object orientation, as according to some embodiments. The analysis may include determining which angle or alignment generates a result image with the greatest amounts of change. At 2616 data may be output as a result. In some embodiments the data output may include an image of the angle that produced the greatest change. In some embodiments, the data output may include descriptive data that describes the angles, orientation, and/or sizes of the objects being imaged.

Figure 27A:
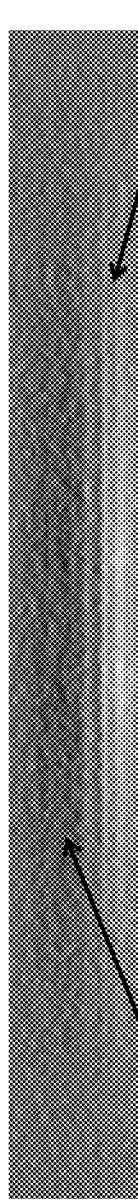
FIG. 27A-D show example outputs of rotation results for different alignment degrees, as according to some embodiments.

FIGS. 27A-D show example outputs of the process shown in FIG. 26, as according to some embodiments. The imaging objects imaged in FIGS. 27A-D are an orbiting exoplanet system, similar to the objects illustrated in FIG. 21A. In particular, FIG. 27A is an result (e.g. 2604, FIG. 26) of the planet 2104 transiting the host star from left to right (with respect to the font orientation in FIG. 26). The left to right action corresponds to an orthogonal blade 2304 approaching objects 2302a and 2302b at 90 degrees. The result of the result/collapse/filter process (e.g. 2604) generates the result image in FIG. 27A with two prominate light and dark bands 2701 and 2700, that correspond to the planet 2104 entering the disk of the host star and leaving the disk of the host star, respectively.

Figure 27B:
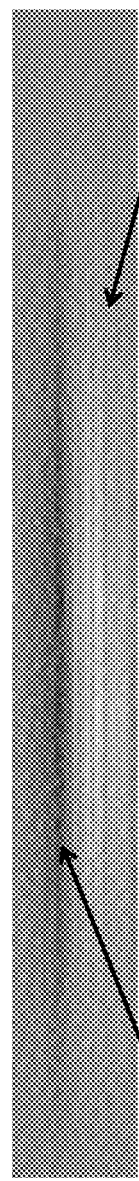
Figure 27C:
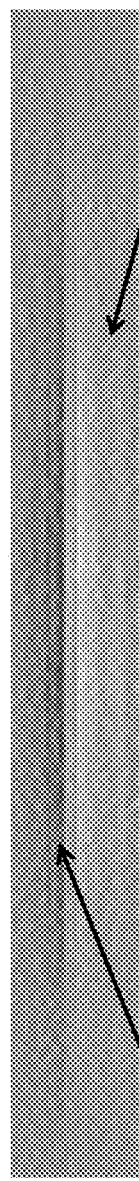
Figure 27D:
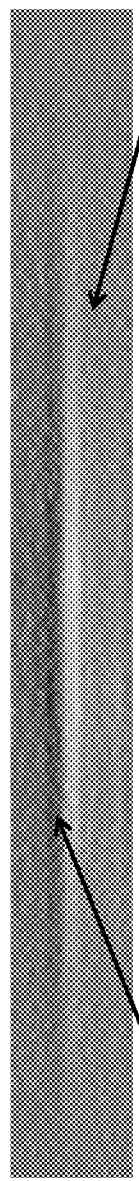

Similarly, FIG. 27B is an example result with the planet 2104 transiting the host star 2102 at 30 degrees, with respect to the font orientation in FIG. 21A; FIG. 27C is an example result with the planet 2104 transiting the host star 2102 at 60 degrees, with respect to the font orientation in FIG. 21A; and FIG. 27D is an example result with the planet 2104 transiting the host star 2102 at 30 degrees, with respect to the font orientation in FIG. 21A.

As is illustrated, the dark bands (e.g. 2701, 2703, 2705, 2707) that correspond to the planet 2104 entering the disk of the host star 2102 and the light bands (e.g. 2700, 2702, 2704, 2706) that correspond to the planet 2104 leaving the disk of the host star 2102 become thinner, and the position may change as the orientation of the blade (e.g. planet 2104) changes in relation to the targeting objects (e.g. host star 2102). In this way, the analysis at 2610 (FIG. 26) can analyze how imaging object orientation with respect to the blade changes. For example, comparing FIG. 27A (e.g. 0 degree, orthogonal blade) with FIG. 27C the dark band 2701 is broader than the dark band 2705. Since the planet transited at the same speed in FIGS. 27A and 27C, the broadness of the dark band is then not a result of planet more slowly crossing the cusp (e.g. edge) of the host star. Rather, the broadness of the dark band is due to the angle in which the matrix collapse process occurred in relation to transiting angle of the planet across the star. In other words, at the orthogonal angle the change caused by the transit is the greatest; however as the transit angle goes from 0 to 90 degrees, the output caused by the matrix collapse process lessens trigonometrically, the components of which may be calculated using cosines and/or sines. In this way, object alignment may be determined.

Figure 28:
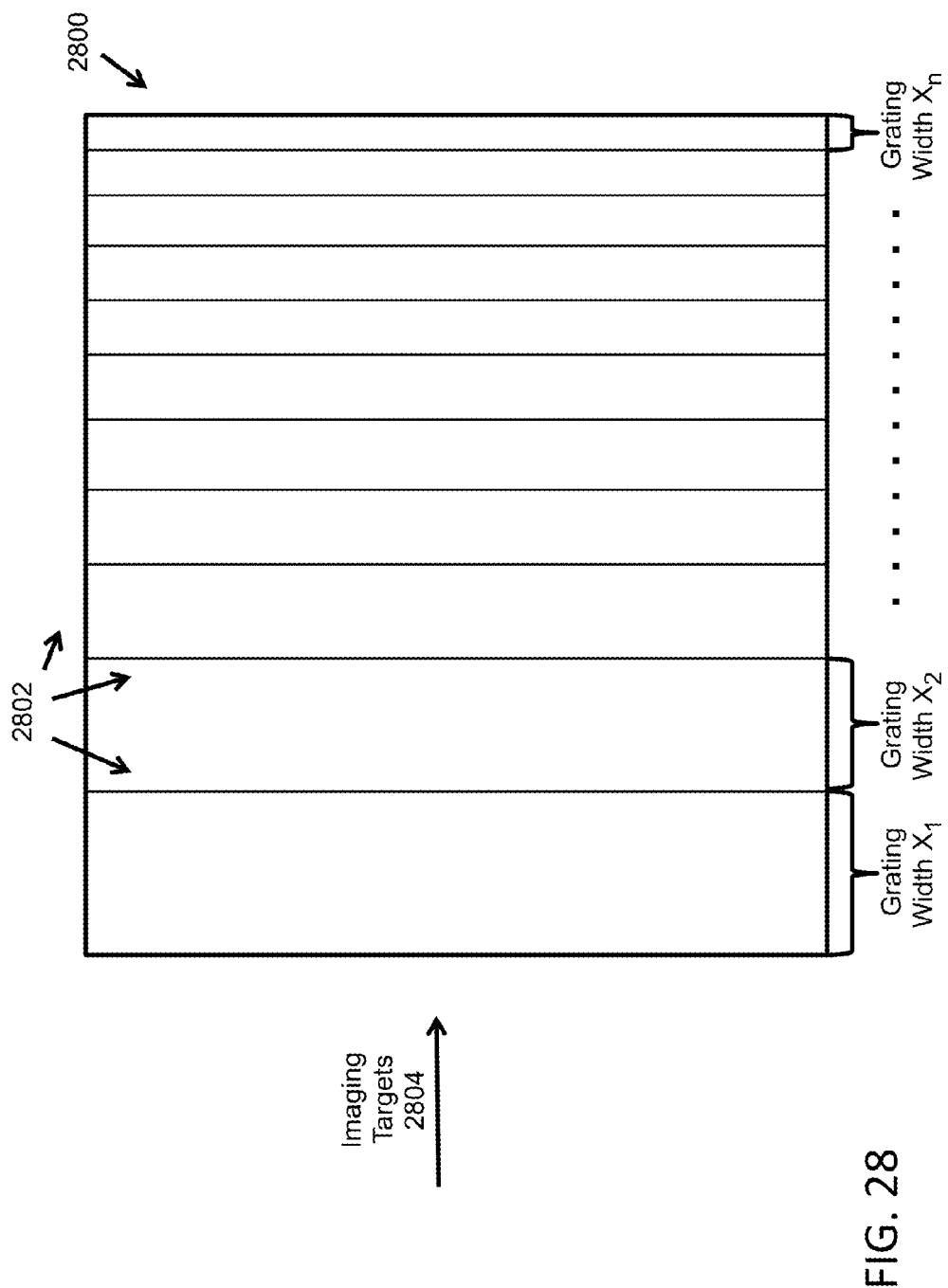
FIG. 28 illustrates a variable blade, as according to some embodiments.

FIG. 28 illustrates an example blade with varying characteristics, as according to some embodiments. There, the blade 2800 is illustrated as a diffraction grating with varying grating widths. In particular, the blade 2800 comprises gratings (e.g. grooves, slits) 2802 that become closer and closer to one another from left-to-right (with respect to the fonts in FIG. 28). That is, the width between the gratings (e.g. $X_1$) becomes smaller as $X_1$ goes to $X_n$.

As is known in the art, diffraction gratings cause incident light to diffract through gratings at angles proportional to the wavelength of light. Implementing the blade 2800 by itself or using labeling filters (see FIG. 1) results in image output effects that increase as the objects are increasingly obscured by the blade 2800. For instance, as imaging objects 2804 move behind the blade, the way light coming from the objects diffracts through the blade changes in proportion to the decreasing width between the grating. In some embodiments, the distance between the gratings is varied, as illustrated in FIG. 28. In some embodiments, the width of the grating slits is varied and the distance between the gratings is not varied. In some embodiments, other characteristics such as the amount by which light is filtered out through color filters or polarization increases or decreases laterally across the blade (e.g. in the same way the grating distances vary in FIG. 28). In this way, the blade may remain stationary and the objects may be allowed to move into the blade. This action will still result in changing image output that contain image information about the imaging. The results of the imaging sequence is then filtered and processed using the above methods (e.g. FIG. 16).

In some embodiments, the blade corresponds to light illumination that sweeps across the imaging objects. That is, referring to FIG. 23A, the imaging objects can be illuminated with a light (e.g. laser light) such that the entire grid 2300 is illuminated. Next the light may removed from the grid column by column, in a sweeping manner. That is, C10 is de-illuminated, then C9 is de-illuminated, etc., until the entire image is dark. The resulting images can be processed using the above approaches.

In some embodiments, the blade corresponds to an opaque or filter-able flowing object/blade (e.g. liquid) that flows across the surface of the imaging objects. As flowing blade flows across the imaging objects light from the imaging objects is blocked or filtered in proportion to the movement of the flowing blade across the imaging objects. One or more imaging frames may be captured and filtered to generate enhanced image results, using the approaches above (e.g. FIG. 16).

In some embodiments, the blade corresponds to a linear blade of light that sweeps the imaging objects. That is, for instance, the blade may correspond to a single column, e.g. "C10" in FIG. 23A, the illuminates the objects in a sweeping movement, e.g. from C10 to C1, illuminating column by column.

In some embodiments, the blade is placed at different points in the light path, such as between an objective lens (e.g. 120, FIG. 1) and the imaging device (e.g. 110, FIG. 1). In some embodiments, the aperture of the imaging device is increased to compensate for the size of the increments the blade can move forward. For example, if the blade is mounted on a liner actuator that moves forward in increments of 0.03 mm, the rate at which the imaging objects can be sampled (e.g. one frame per 0.03 mm movement of the blade) may be limited. As described above, generally, finer movements of the blade (or the faster frame rates using a continuous blade) result in higher resolutions in imaging outputs (e.g. FIG. 18B).

Thus, what is disclosed is an improved approach for generating higher resolution images using blades and light path convolutions.

Figure 29:
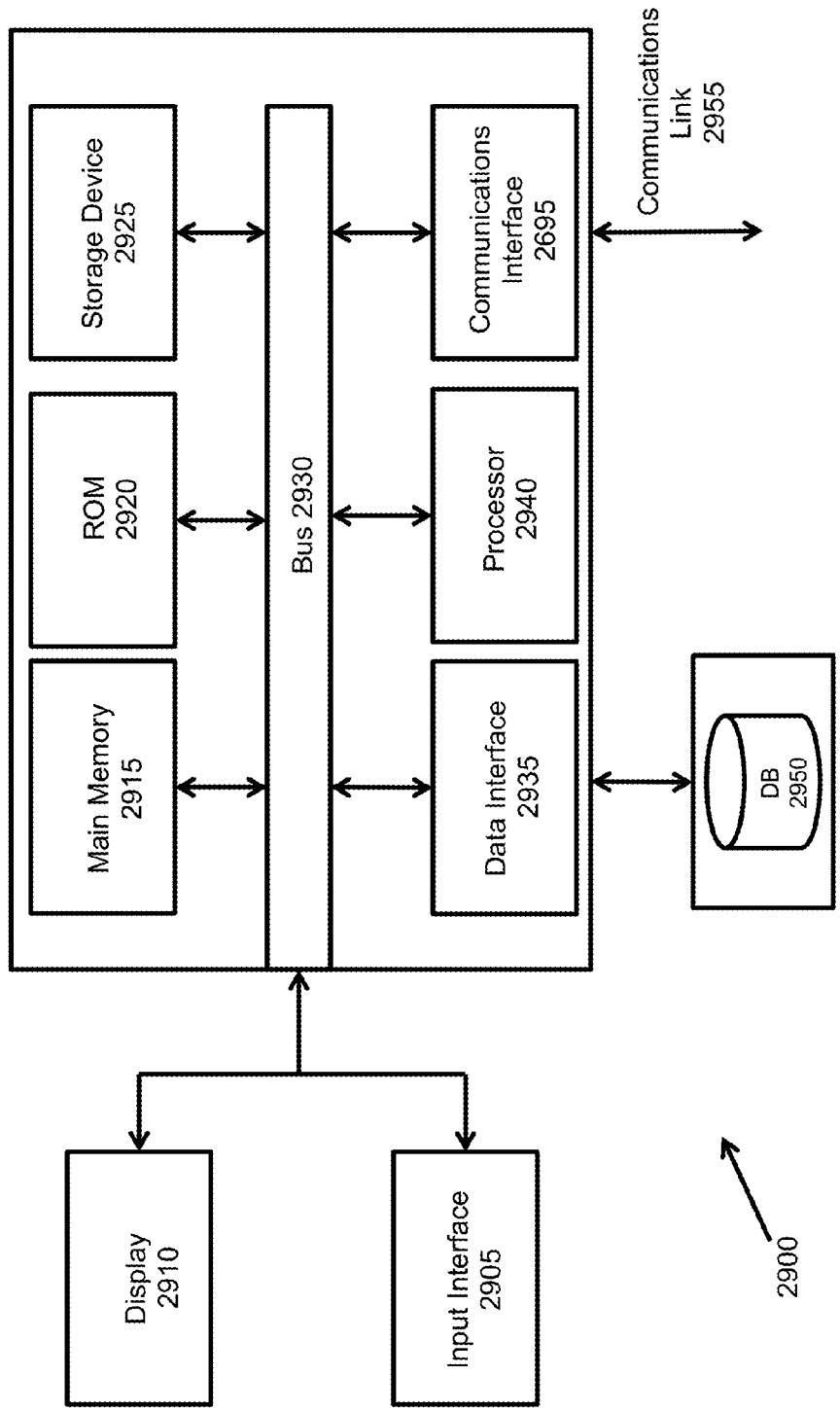
FIG. 29 shows an example system architecture.

FIG. 29 is a block diagram of an illustrative computing system 2900 suitable for implementing an embodiment of the present invention for performing intrusion detection. Computer system 2900 includes a bus 2906 or other communication mechanism for communicating information, which interconnects subsystems and devices, such as processor 2907, system memory 2908 (e.g., RAM), static storage device 2909 (e.g., ROM), disk drive 2910 (e.g., magnetic or optical), communication interface 2914 (e.g., modem or Ethernet card), display 2911 (e.g., CRT or LCD), input device 2912 (e.g., keyboard), and cursor control.

According to one embodiment of the invention, computer system 2900 performs specific operations by processor 2907 executing one or more sequences of one or more instructions contained in system memory 2908. Such instructions may be read into system memory 2908 from another computer readable/usable medium, such as static storage device 2909 or disk drive 2910. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 2907 for execution. Such a medium may take many forms, including but not limited to, non-volatile media and volatile media. Non-volatile media includes, for example, optical or magnetic disks, such as disk drive 2910. Volatile media includes dynamic memory, such as system memory 2908.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 2900. According to other embodiments of the invention, two or more computer systems 2900 coupled by communication link 2915 (e.g., LAN, PTSN, or wireless network) may perform the sequence of instructions required to practice the invention in coordination with one another.

Computer system 2900 may transmit and receive messages, data, and instructions, including program, i.e., application code, through communication link 2915 and communication interface 2914. Received program code may be executed by processor 2907 as it is received, and/or stored in disk drive 2910, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method comprising:
    generating, using an image capture device, convolved electromagnetic (EM) wave data by recording EM waves from one or more objects as the EM waves are increasingly blocked from the image capture device by a further object, the convolved EM wave data comprising-a multiple images aligned in a temporal axis;
    generating collapsed EM wave data from the convolved EM wave data by merging values from the multiple images along the temporal axis; and
    generating, using at least one processor of a machine, an image of the one or more objects by applying one or more derivative filters to the collapsed EM wave data.

2. The method of claim 1, wherein the EM waves are increasingly blocked by the further object in a direction with respect to the image capture device and the one or more derivative filters are applied to the collapsed EM wave data in the direction with respect to the image capture device.

3. The method of claim 2, wherein the direction is approximately perpendicular to a path between the image capture device and the one or more objects.

4. The method of claim 1, wherein the multiple images aligned in the temporal axis are a sequence of images generated at sequential points in time as the EM waves are increasingly blocked from reaching the image capture device by the further object.

5. The method of claim 1, wherein the one or more derivative filters includes one or more of: a horizontal derivative filter or a vertical derivative filter.

6. The method of claim 1, wherein each image is a matrix of elements; and wherein merging values from the multiple images along the temporal axis comprises:
    adding elements from the multiple images along the temporal axis.

7. The method of claim 1, further comprising:
    actuating the further object such that the further object increasingly blocks the EM waves from the one or more objects.

8. The method of claim 1, further comprising:
    rotating the convolved EM wave data using a tensor rotation operation.

9. The method of claim 1, wherein the further object is a blade.

10. The method of claim 1, wherein the image capture device is at least one of: a complementary metal-oxide-semiconductor (CMOS) image sensor or a charge-coupled device (CCD) image sensor.

11. The method of claim 1, wherein the multiple images depict the one or more objects at approximately the same position as the further object increasingly blocks EM waves from the image capture device.

12. The method of claim 1, wherein the further object increasingly blocks the EM waves from the one or more objects due to physical movement of the image capture device.

13. The method of claim 1, wherein at least one image of the multiple images depicts the one or more objects as a single object, and wherein the image generated by applying the one or more derivative filters depicts the one or more objects as a plurality of objects.

14. A system comprising:
    one or more processors of a machine; and
    a memory storing instructions that, when executed by the one or more processors, cause the machine to perform operations comprising:
        generating, using an image capture device, convolved electromagnetic (EM) wave data by recording EM waves from one or more objects as the EM waves are increasingly blocked from the image capture device by a further object, the convolved EM wave data comprising multiple images aligned in a temporal axis;
        generating collapsed EM wave data from the convolved EM wave data by merging values from the multiple images along the temporal axis; and
        generating an image of the one or more objects by applying one or more derivative filters to the collapsed EM wave data.

15. The system of claim 14, wherein the EM waves are increasingly blocked by the further object in a direction with respect to the image capture device and the one or more derivative filters are applied to the collapsed EM wave data in the direction with respect to the image capture device.

16. The system of claim 14, wherein the direction is approximately perpendicular to a path between the image capture device and the one or more objects.

17. The system of claim 14, wherein the multiple images aligned in the temporal axis are a sequence of images generated at sequential points in time as the EM waves are increasingly blocked from reaching the image capture device by the further object.

18. The system of claim 14, wherein the one or more derivative filters includes one or more of: a horizontal derivative filter or a vertical derivative filter.

19. The system of claim 14, wherein each image is a matrix of elements; and wherein merging values from the multiple images along the temporal axis comprises:
    adding elements from the multiple images along the temporal axis.

20. The system of claim 14, the operations further comprising:
    actuating the further object such that the further object increasingly blocks the EM waves from the one or more objects.

21. The system of claim 14, the operations further comprising:
    rotating the convolved EM wave data using a tensor rotation operation.

22. The system of claim 14, wherein the further object is a blade.

23. The system of claim 14, wherein the imaging sensor image capture device is at least one of: a complementary metal-oxide-semiconductor (CMOS) image sensor or a charge-coupled device (CCD) image sensor.

24. The system of claim 14, wherein the multiple images depict the one or more objects at approximately the same position as the further object increasingly blocks EM waves from the image capture device.

25. The system of claim 14, wherein the further object increasingly blocks the EM waves from the one or more objects due to physical movement of the image capture device.

26. The system of claim 14, wherein at least one image of the multiple images depicts the one or more objects as a single object, and wherein the image generated by applying the one or more derivative filters depicts the one or more objects as a plurality of objects.

27. A machine-readable storage medium embodying instructions that, when executed by a machine, cause the machine to perform operations comprising:
   generating, using an image capture device, convolved electromagnetic (EM) wave data by recording EM waves from one or more objects as the EM waves are increasingly blocked from the image capture device by a further object, the convolved EM wave data comprising multiple images aligned in a temporal axis;
   generating collapsed EM wave data from the convolved EM wave data by merging values from the multiple images along the temporal axis; and
   generating an image of the one or more objects by applying one or more derivative filters to the collapsed EM wave data.

28. The machine-readable storage medium of claim 27, wherein the EM waves are increasingly blocked by the further object in a direction with respect to the image capture device and the one or more derivative filters are applied to the collapsed EM wave data in the direction with respect to the image capture device.

29. The method machine-readable storage medium of claim 27, wherein the direction is approximately perpendicular to a path between the image capture device and the one or more objects.

30. The machine-readable storage medium of claim 27, wherein the multiple images aligned in the temporal axis are a sequence of images generated at sequential points in time as the EM waves are increasingly blocked from reaching the image capture device by the further object.

31. The machine-readable storage medium of claim 27, wherein the one or more derivative filters includes one or more of: a horizontal derivative filter or a vertical derivative filter.

32. The machine-readable storage medium of claim 27, wherein each image is a matrix of elements; and wherein merging values from the multiple images along the temporal axis comprises:
   combining elements from the multiple images along the temporal axis.

33. The machine-readable storage medium of claim 27, the operations further comprising:
   actuating the further object such that the further object increasingly blocks the EM waves from the one or more objects.

34. The machine-readable storage medium of claim 27, the operations further comprising:
   rotating the convolved EM wave data using a tensor rotation operation.

35. The machine-readable storage medium of claim 27, wherein the further object is a blade.

36. The machine-readable storage medium of claim 27, wherein the image capture device is at least one of: a complementary metal-oxide-semiconductor (CMOS) image sensor or a charge-coupled device (CCD) image sensor.

37. The machine-readable storage medium of claim 27, wherein the multiple images depict the one or more objects at approximately the same position as the further object increasingly blocks EM waves from the image capture device.

38. The machine-readable storage medium of claim 27, wherein the further object increasingly blocks the EM waves from the one or more objects due to physical movement of the image capture device.

39. The machine-readable storage medium of claim 27, wherein at least one image of the multiple images depicts the one or more objects as a single object, and wherein the image generated by applying the one or more derivative filters depicts the one or more objects as a plurality of objects.

* * * * *